United States Patent [19]

Levine

[11] 3,873,972

[45] Mar. 25, 1975

[54] ANALYTIC CHARACTER RECOGNITION SYSTEM

[76] Inventor: Theodore H. Levine, 8818 Fairfield St., Philadelphia, Pa. 19152

[22] Filed: Apr. 25, 1973

[21] Appl. No.: 354,385

Related U.S. Application Data

[63] Continuation-in-part of Ser. No. 194,414, Nov. 1, 1971, abandoned.

[52] U.S. Cl. ........................................ 340/146.3 AC

[51] Int. Cl. ............................................... G06k 9/12

[58] Field of Search ........... 340/146.3 AC, 146.3 Y, 340/146.3 T, 146.3 AG, 146.3 MA; 444/914, 930.21

[56] References Cited

UNITED STATES PATENTS

| | | | |
|---|---|---|---|
| 3,140,466 | 7/1964 | Greanias et al. | 340/146.3 AC |
| 3,165,718 | 1/1965 | Fleisher | 340/146.3 Y |
| 3,347,981 | 10/1967 | Kagan et al. | 340/146.3 H |
| 3,581,281 | 5/1971 | Martin et al. | 340/146.3 T |
| 3,581,281 | 5/1971 | Martin et al. | 340/146.3 T |
| 3,585,592 | 6/1971 | Kiji et al. | 340/146.3 AC |
| 3,588,821 | 6/1971 | Lasalle et al. | 340/146.3 AG |
| 3,609,686 | 9/1971 | Savory et al. | 340/146.3 T |
| 3,634,823 | 1/1972 | Dietrich et al. | 340/146.3 MA |

OTHER PUBLICATIONS

Teitelman, "Real Time Recognition of Hand-Drawn Characters," Proceedings–Fall Joint Computer Conference, 1964, pp. 559–575.

*Primary Examiner*—Gareth D. Shaw
*Assistant Examiner*—Leo H. Boudreau
*Attorney, Agent, or Firm*—Fidelman, Wolffe & Leitner

[57] ABSTRACT

A character recognition system employs analytic techniques to develop a set of codes representative of the geometry of a character by means of a two-dimensional matrix of digital video elements of single resolution size. Codes that are used identify types of segments and groups of segments in each row or column of the matrix, sequences of such segments and the durations and orientations of sequences. A learn mode is used to relate such codes to known characters, and a process mode is used to recognize unknown characters from previously learned codes.

11 Claims, 15 Drawing Figures

ANALYTIC CHARACTER RECOGNITION SYSTEM

This application is a continuation-in-part of Ser. No. 194,414, filed Nov. 1, 1971, now abandoned.

BACKGROUND OF THE INVENTION

This invention relates to automatic character recognition systems, and particularly to machine systems suitable for optical character recognition and employing analytic techniques.

In character recognition systems, it is customary to establish a video signal representation of the character as it is encompassed within a rectangle, and then to attempt a signal match of various regions or sub-regions of the video representation to a set of masks or templates. Such a system may be considered to be synthetic in nature because it involves a synthesis of masks or features or templates (i.e., patterns within sub-regions of the character rectangle). Such a mask matching system requires a great deal of human judgment in its design and in the choice of masks that compose the various characters. For a given cost, such a system is likely to be limited in the number of type fonts to which it is applicable. Thus, this system offers little opportunity for systemization and for the development of an approach that would tend to be universally applicable to a wide variety of type fonts, to different alphabets, to different printing forms, as well as to handwritten characters.

SUMMARY OF THE INVENTION

It is among the objects of this invention to provide a new and improved character recognition system.

Another object is to provide a character recognition system based upon analytic techniques.

Another object is to provide a new and improved character recognition system which is applicable to a variety of different type fonts and alphabets.

Another object is to provide a new and improved character recognition system which is adaptive in its nature so that type fonts and alphabets can be "learned" so as to develop a body of reference data with which unknown characters can be compared.

In accordance with an embodiment of this invention, a machine system for automatic character recognition is based upon an analysis of geometric forms that are contained within a rectangle bounding the character to be recognized; from this analysis, numeric codes are established corresponding to the geometric forms. That is, in the machine system of this invention, a two-dimensional array of elements of the specimen character is formed in which the elements are of a single resolution area size; these elements may be established by means of digital information signals. Within each row of the array, contiguous sequences of black elements are identified as segments. Codes are formed that identify the nature and number of the segments, and thereafter identify sequences of similar types of segments in successive rows. In this embodiment, the durations and orientations of sequences are also codified.

The codes of unknown specimen characters are compared with those of known reference characters to identify the specimen. This system may be operated in a "learn" mode and a "process" mode. In the learn mode, samples of known characters are presented to the recognition system, together with their identification as a particular alphabetic or numeric character.

In this learn mode, the geometric forms within the character rectangles are analyzed and coded, and the geometry codes are stored in machine-record format, together with an identification of the sample character that they represent, to develop the reference character data. In the process mode, the unknown specimen characters are analyzed in the same way as that used in the learn mode, and codes are similarly constructed. If the particular geometrical form of an unknown specimen has been previously analyzed during the learn mode, its codes (along with the reference character identifications) may be found in the machine storage, and if unique, the unknown specimen is correspondingly identified or recognized.

BRIEF DESCRIPTION OF THE DRAWING

The foregoing and other objects of this invention, the various features thereof, as well as the invention itself, may be more readily understood from the following description when read together with the accompanying drawing, in which.

In the drawing, corresponding parts are referenced throughout by similar numerals.

DESCRIPTION OF A PREFERRED EMBODIMENT

Figures 1, 2:
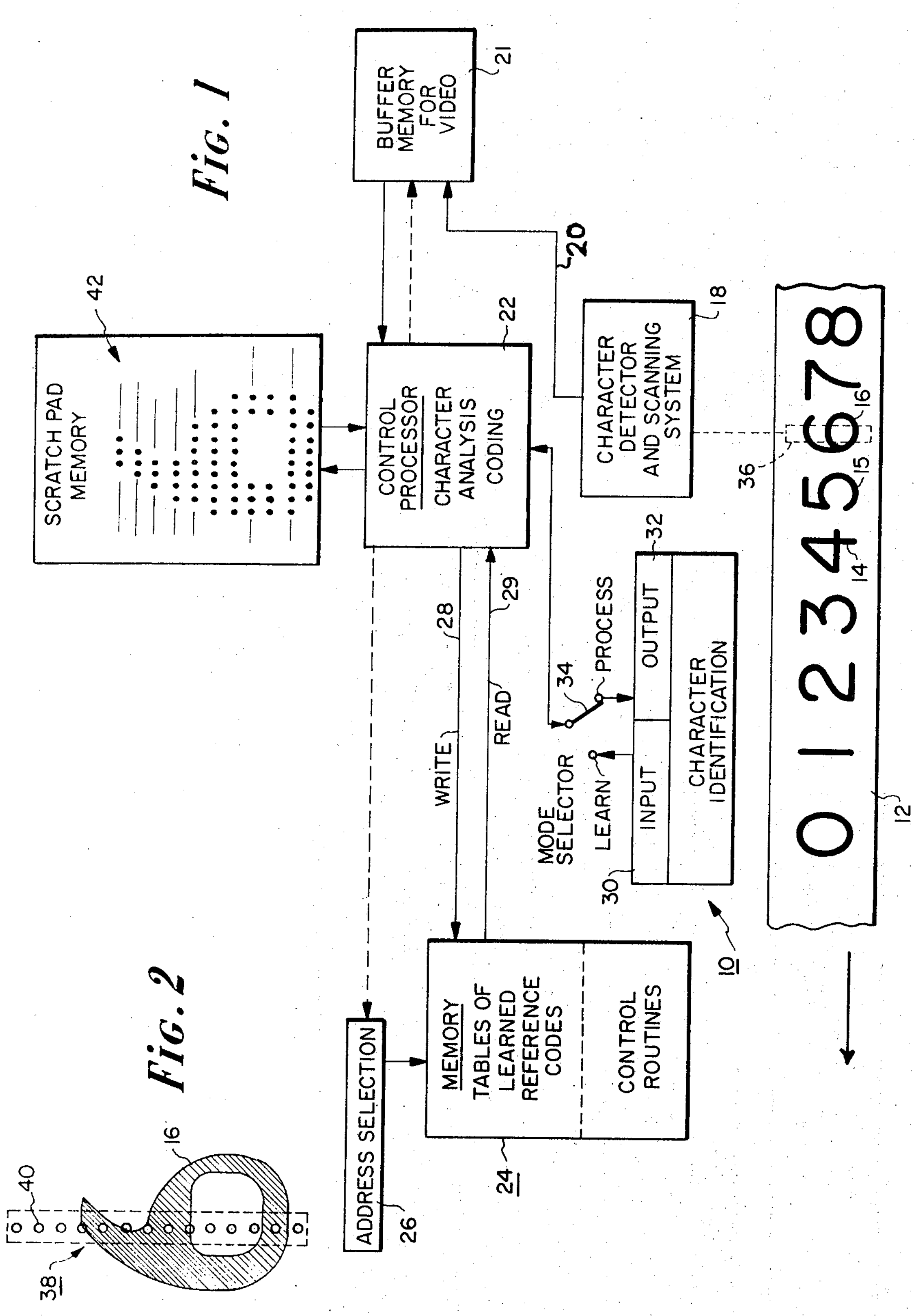
FIG. 1 is a schematic block diagram of an optical character recognition system embodying this invention.
FIG. 2 is a schematic representation of one form of optical detector device that may be used in the system of FIG. 1.

In the system shown generally as 10 embodying this invention, which is especially useful for optical character recognition or OCR, shown in FIG. 1, a document or other character bearing medium 12 conveys a sequence of characters 14, 15, 16 past a character detector system 18 which develops a set of signals (i.e., video signals in the case of OCR) representative of the successive characters. These video signals are established in electrical form on line 20 whence they are applied to a buffer memory 21 under the control of a central processor 22 for a data processing system or digital computer. The latter also includes a memory 24 having an address selector 26 whose operation is controlled by the processor 22. The processor supplies data signals for writing in the memory via write bus 28, and receives them from the memory via read bus 29. The buffer memory 21 may take the form of sets of registers for storing digital representations of the video signals of a series of characters that have been scanned by the detector system.

An input device 30, such as a keyboard unit (e.g., a typewriter) and an output device 32 (e.g., a printer, typewriter, or control device) are connected to the control processor 22 respectively to supply input signals thereto or to receive output signals therefrom. The processor 22 is connected via a selector switch 34 to terminals of the input device 30 and output device 32, with the switch 34 acting in the nature of a single-pole, double-throw switch. In one position of the switch, the system operates in the learn mode, whereby signals identifying the characters that are being read and detected by the system 18 are identified by an operator and entered into the system via the keyboard input 30. With the switch 34 in its other position, the character detected by the system 18 and processed by the control 22 for character analysis and codification identifies the character and produces a read-out (e.g., a machine-coded record on magnetic tape) of the identified or recognition character. Instead of or in addition to a read-out, the recognition process may lead to a control operation (e.g., a sorting operation of letters by zip codes in a post office).

The system of FIG. 1 may be used with various types of character systems, and it is of particular application for recognizing characters that may be imprinted on the document 12 and that are detected optically. Various form of video detection systems, and particularly video or optical detection, that are suitable for the system of FIG. 1, are well known in the art. See, for example, the patent application of R. T. Vernot, Ser. No. 173,822, filed Aug. 23, 1971 and assigned to the same assignee as the present application. In such a system, a portion of the document 12 is illuminated as indicated by the rectangle 36, which is greater in length than the characters to be read, and the document 12 is moved past the detector system 18 for scanning thereby. The detector system 18 supplies the light for the illumination rectangle 36 on the document and also includes a linear bank 38 of photocells (e.g., a bank of 48 or 64 photodiodes or phototransistors) which are arranged to detect a vertical slice of the character that appears under the illumination rectangle 36 (as indicated schematically in FIG. 2).

Figure 3:
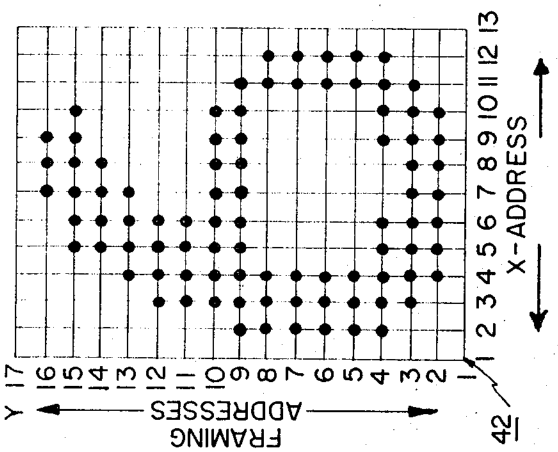
FIG. 3 is a graphical representation of the storage of a character in the system of FIG. 1.

In operation, the characters 14, 15 and 16 are scanned successively with the processing taking place one character at a time. The document 12 may be stepped mechanically or moved continuously, and with movement of the character, successive video slices of the character are formed by the bank of diodes 40 to develop signals representative of its geometry. The detector system 18 functions with the control 22 and the buffer memory 21 to establish in a section of that buffer a two-dimensional array of signals representative of the video detection of each chafacter. the control processor operates one at a time on the character signals stored in buffer 21, and for this purpose they are transferred to a scratch pad memory 42 from the buffer 21. In FIG. 3, the scratch pad memory 42 is illustrated schematically as containing in various elements of its rectangular matrix, digital signals representative of the numeral 6 that is detected. That is, some matrix elements contain binary bits (e.g., 1) representative of the numeral 6 (illustrated by large dots) and others of the memory elements of the array contain bits representative of the surrounding white surface of the document 12 (e.g., the bit 0), illustrated by the absence of a dot at the coordinate intersections. The signals developed in the photocells 40 are transferred a slice at a time in proper time relationship to the buffer 21 and in proper time relationship to the movement of the document 12, so that successive columns in the buffer 21 and, thereafter, in the matrix 42 contain the video information corresponding to successive slices that are contiguous of the character 16. In one form of the invention, the matrix elements define a document area (the height of which is determined by the photodiode dimension, and the width by the time of sampling) which is approximately 0.006 inch square. A threshold of signal value is set to establish the amount of black print that is to be represented by a 1-bit. The term "black" is used to refer to the printed character as contrasted to the document surface; the invention, of course, is not limited to any particular color or form of printing.

Systems and techniques for so establishing the character 16 as a matrix of digital information signals in a random access, two-dimensional array of memory are well known in the art. The linear bank of photocells 40 is but one scheme whereby this may be arranged, and it is not necessary that the document 12 be moved mechanically; various types of video scanning systems may be employed instead. For example, a flying spot scanner system may be employed to scan a raster over each character to develop the two-dimensional array of information signals in the memory matrix 42. Such a scanner may be controlled to move successively to the individual characters of the document 12. This system is not limited to any particular set of characters or character forms that may be scanned, nor to any particular arrangement of the characters on a document. The invention is applicable to both alphabetic and numeric characters, to different type fonts, as well as to different alphabets and numeral systems other than the conventional Roman alphabet and Arabic numeral system customarily employed in this country.

Figure 4:
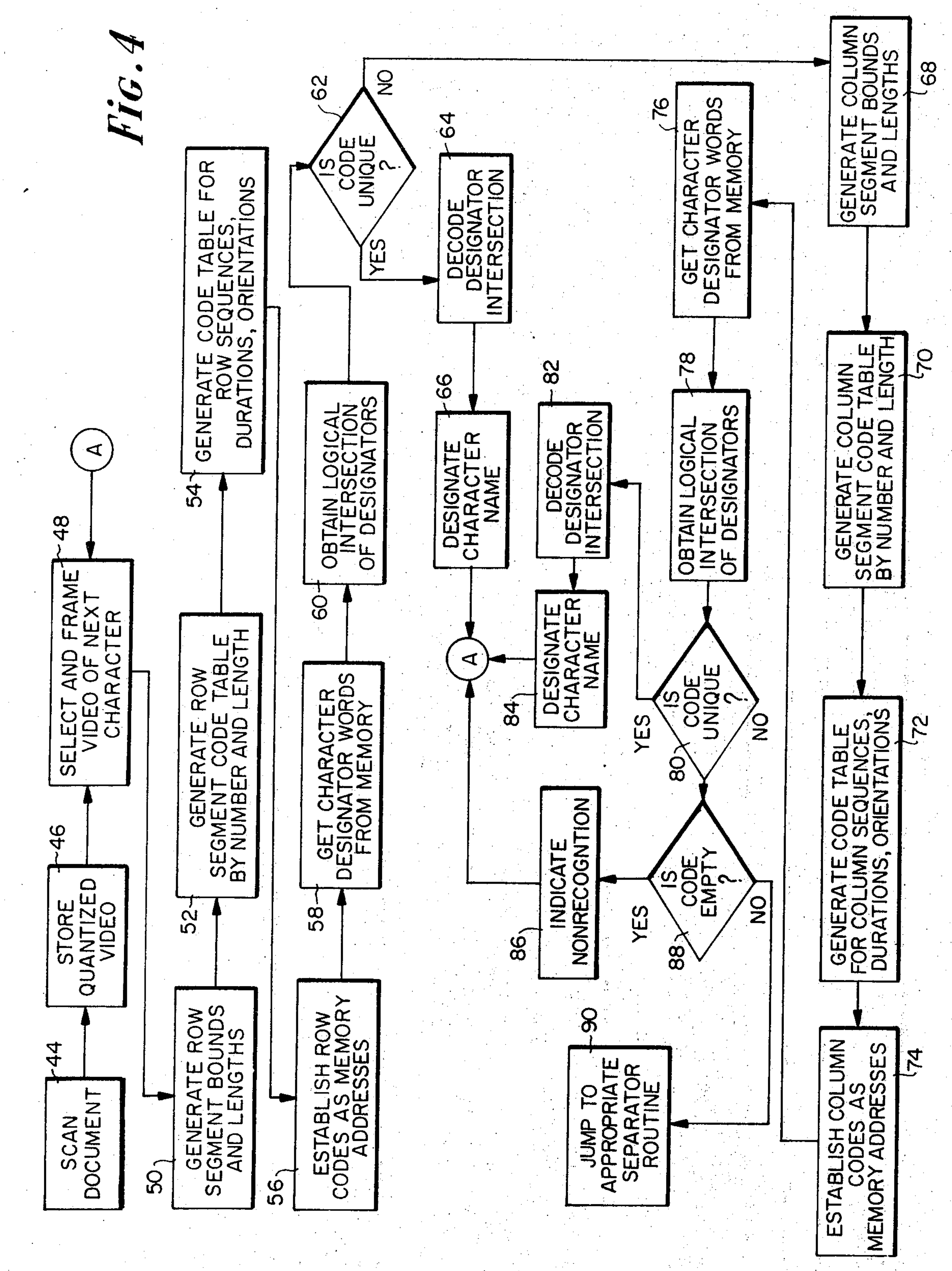
FIG. 4 is a schematic flow diagram of an analytic character recognition system and process used with the system of FIG. 1 and embodying this invention.

In the system flow diagram of FIG. 4, the initial operation is that of optically scanning the document represented by the process block 44, and which is coordinated in operation with the buffer memory 21 to perform the storage operation 46, which writes the quantized video of the print in a two-dimensional array similar to that illustrated in FIG. 3. For the system diagram of FIG. 4, it is assumed that a plurality of characters or the entire set of characters of document 12 are scanned and stored and thereafter the individual characters are processed for analysis. In practice, using a high-speed general-purpose computer memory, certain logic circuitry and processor, the two operations of scanning and analysis are performed somewhat independently and concurrently so that they overlap in time.

The next operation 48 is that of selecting and framing the video of the next character to be recognized, which operation 48 takes place after it is transferred to scratch pad memory 42 on completion of the storage of the video indicated by operation 46, or upon completion of the analysis of the previous character as indicated by the process-control element A which represents a transfer of control into operation 48. The selection and framing of a character may be performed by any suitable technique known in the art. For example, one technique that may be used is that of forming a silhouette of vertical and horizontal "views" of the character in the matrix 42. That is, the rectangle 36 of illumination of each character 16 covers a longer section of the document than that known to be occupied by the character to be detected. Likewise, the bank 38 of photocells 40 is correspondingly longer than the character 16; for example, this may be as much as three times as long as the character itself. A memory matrix 42 is employed as working storage into which the character video may be established as a two-dimensional array, and this array as indicated is larger than the character so that the character information is effectively an array of 1-bits surrounded by 0-bits. The silhouette operation to frame the character is first performed in one direction such as with the rows. All of the rows of the working area of the matrix 42 are successively read out and assembled in a register (e.g., the A-register of a general purpose computer). That is, all of the 1- and 0-bits having the first X-address in the matrix 42 are combined on a logical-OR basis into one cell of the register, the next X-address bits are again combined on an OR basis into the next cell of that register, and so on, with each group of bits having the same X-address going to the same register cell. That register then contains a sequence of 1-bits which are bracketed by a sequence of 0-bits to the left and a sequence of 0-bits to the right. The leftmost 1-bit in that register defines the left frame address of the character, and the rightmost 1-bit defines the right frame of the character (if there are any 1-bits disconnected from the main section of 1-bits by 0-bits, they may be assumed to be noise and discarded). In a similar fashion, the vertical silhouette is formed by combining on a logical-OR basis in the register all of the columns of bits. Those bits of each column having the same Y-address are combined in corresponding register cells. The end 1-bits define the top and bottom framing bits of that vertical silhouette, and therefore of the entire character. This procedure for framing the character does not form any part of the present invention. The framing addresses are stored and utilized throughout the analysis of the character and the horizontal silhouette serves as a parameter to define the width of the character, while the vertical silhouette is retained as a parameter to define the height of the character. Special logic circuitry may be employed in the processor 22 to perform the framing operation.

With the establishment of the X and Y framing addresses of the character, the video information relating to the entire character is formed within the framing rectangle and is quantized as 1- and 0-bits in elemental areas and treated as though wholly black or wholly white information in each elemental area corresponding to a resolution element of the detector system (i.e., a diode 40). In a known manner, the detector system establishes a signal threshold whereby the signal produced by a photodiode 40 must correspond to a certain amount of black in the associated elemental area of the document in order for that area to be identified as a 1-bit. The character matrix between the X and Y framing addresses consists of horizontal slices or rows formed as one resolution element thick and equal to the character width in the row's length. Each such row contains a combination of 1- and 0-bits corresponding to the black and white segments in that row (or it may be formed entirely of 1-bits corresponding to a full black line for that row). This analysis may be extended in the vertical direction to form vertical slices or columns of one resolution element wide and having a height equal to the character height. This mode of analysis is discussed further hereinafter.

Starting with the row analysis of the character (FIG. 4), the initial process operation consists of the process 50 which is "Generate Row Segment Bounds And Lengths." A segment is defined as a continuous sequence of black elements represented by 1-bits. The data determined by process 50 is that of the beginning and end X-addreses of each segment in each row and thereby the length of each segment. In analyzing a row, the initial 1-bit starting from the left determines the left-bound of a segment, and the last 1-bit of a continuing sequence of 1-bits followed by a 0-bit is the right-bound of that segment. The difference between the X-addresses of the left and right bounds of a segment determines the segment's length. Each segment, if it is an intermediate segment, is identified by having 0-bits on each side of it, and if it is an end segment, by having a 0-bit on one side of it and a bit corresponding to the framing address on the other side.

In the example illustrated in the matrix 42 of FIG. 1, the lowest segment of the character, that of the row of address Y-2, is recognized as having a left-bound that starts at address X-4 and a right-bound at address X-10; its length is therefore seven, which corresponds to the successive seven 1-bits of that segment. In the next row at address Y-3, the left-bound is at X-3 and the right-bound is at X-11, forming a horizontal sequence of 1-bits for a segment length of nine. In the row of Y-4, the left-bound is at X-2, the right-bound of the first segment is at X-6, the next left-bound is at X-9, and its right-bound is at X-12. Thus, two segments are identified in row Y-4. In each of the next four rows, two segments are identified in a similar fashion. Thereafter, the next rows in Y-9 and Y-10 each contain a single segment and of different lengths; in Y-9 and Y-10 the segments are long, and in Y-11 to Y-16, they are short.

Thereafter, process 52, "Generate Row Segment Code Table By Number And Length," is performed. Two characteristics of the segments that have been found useful in analyzing a wide variety of different type fonts for both alphabetic and numeric characters are (a) the number of segments and (b) the length of the segments. The data processor system is operated to establish machine readable records and machine signals corresponding to the categories of these segments. In addition, codes in the form of combinatorial signals of a digital form are used to establish the information in machine form. One form of code for classifying the segments that has been found of general application for a wide variety of print fonts (both of machine print and of hand print) is the following:

0: a row with a single short segment;

1: a row with any number of segments but in which the longest segment qualifies as a "long" (e.g., greater than one-half the character width);

2: a row with two short segments;

3: a row with three or more short segments.

From experience it has been found that very little information is lost if no distinction is made between three or more than three segments. However, this is partially an arbitrary choice in the design of the analytic control system and can be varied for given cases. With regard to row segment length, experience has also indicated that a distinction need only be made between "long" (greater than some arbitrary width such as one-half the character width) and "short" segments (less than that criterion). However, it may be for some type fonts or some other alphabetic or character systems that a partition into short, medium and long segments may be more effective, and this partition in fact has been found useful in connection with the column analysis to be explained hereinafter. The analysis is performed independently of the absolute character dimensions as much as possible, and accordingly, the dimensions of each segment are related to the overall dimensions of the character itself by using the parameter of the character width as a basis for comparison with each row segment. That is, in this row analysis and codifying process 52, each segment is compared with one-half of the character width and if it is equal to or greater than that, it is identified as a long segment; otherwise, it is identified as short.

From the information obtained thus far, the rowsegment code table (see Table I) is generated and established in locations of the memory with a code for each row. In Table I herein, the row addresses are indicated for convenience by reference to the Y-addresses of the character 6 of FIG. 3, rather than to the machine addresses of the memory that would be utilized in the actual system. In addition, code names are set forth to assist the reader in identifying the codes that are established in the Table.

TABLE I

ROW-SEGMENT CODES

| Row | Code | Code Name |
|---|---|---|
| Y-2 | 1 | Long Segment |
| Y-3 | 1 | Long Segment |
| Y-4 | 2 | Two Short Segments |
| Y-5 | 2 | Two Short Segments |
| Y-6 | 2 | Two Short Segments |
| Y-7 | 2 | Two Short Segments |
| Y-8 | 2 | Two Short Segments |
| Y-9 | 1 | Long Segment |
| Y-10 | 1 | Long Segment |
| Y-11 | 0 | Short Single Segment |
| Y-12 | 0 | Short Single Segment |
| Y-13 | 0 | Short Single Segment |
| Y-14 | 0 | Short Single Segment |
| Y-15 | 1 | Long Segment |
| Y-16 | 0 | Short Single Segment |

Upon completion of the row-segment code table, the next process 54 is performed: "Generate Code Table For Row Sequences, Durations And Orientations." The analysis of the processor 22 proceeds to identify sequences of rows having the same segment type or code. Thus, in the preceding Table I for row-segment codes, the rows at addresses Y-2 and Y-3 are both code-1, forming a sequence of two "long segment" rows. Rows Y-4 through Y-8 form a sequence of code-2 rows having "two short segments" and the sequence has five such rows. Rows Y-9 and Y-10 are of code-1 and form a sequence of duration two, corresponding to two "long segment" rows. Rows Y-11 through Y-14 are of code 0, and are of duration four. Row Y-15 is a single row of code 1, and forms a sequence of duration one. Y-16 is a single row of code-0, and forms a sequence of duration one.

The codes for these sequences (ignoring for the moment the durations of the sequences) may be set down as follows:

1 2 1 0 1 0

The code system is employed in practice for establishing information relating to sustained sequences; that is, sequences having two or more rows of the same code type. In addition, a single row whose largest segment qualifies as "long" is treated as though sustained, while any isolated single row that does not contain a long segment is considered to be "unsustained." Whenever a sustained sequence is followed by an unsustained sequence, the duration of the sustained sequence is incremented by one, and the unsustained sequence is dropped. Thus the process 54 establishes the information of the following table of revised row sequence codes, in which the corresponding revised durations are set forth below the associated code digits:

1 2 1 0 1

2 5 2 4 2

It has been found that the precise values of sequence durations may be replaced by relative durations, with the character height providing the basis for comparison. That is, the row durations are coded as "long sequences" represented by 1-bits and "short sequences" represented by 0-bits. A suitable design criterion for short segment sequences of code types 0, 2 or 3 is that it is a "long sequence" if its duration is one-third or more the height of the character. A row sequence of long segments is considered to be of long duration if it is three or more. Thus, for the example of the character 6 illustrated in FIG. 1, having a character height of 15 (and one-third of 15 being 5), the following row-duration codes may be assigned in the previous example:

| | |
|---|---|
| 1 2 1 0 1 | Row Sequence Code |
| 2 5 2 4 2 | Row Durations |
| 0 1 0 0 0 | Row Duration Code |

A sequence orientation code is also utilized since it has been found that significant information characterizing the geometry of a character is contained in the orientation of sequences of small row segments. For example, in the character Z, a diagonal stroke (or small segment sequence) starts at the bottom on the left of the character and ends on the right at the top of the character. The character S has a small segment sequence which starts at the right near the bottom and ends on the left at the top. The letter L has a small sequence which starts on the left near the bottom and continues on the left to the top. Analytic codes are established that are independent of absolute dimensions by setting up sections of the character width in which the various bounds of the segment may lie. In one form of the invention, the codes are established so that if any section of the small segment lies in the left third of the character width, it is considered to be left oriented for purposes of the orientation codification; if not, it is then determined if any section of the small segment lies in the center third of the character width, whereupon it is treated as center oriented; and if not, then a segment is in the right third of the character width and is treated as right oriented. In the following criteria for the orientation code, the orientation of the lowermost segment of a sequence is compared to that of the uppermost segment of that small segment sequence:

0 : left to left

1 : left to center

2 : left to right

3 : center to left

4 : center to center

5 : center to right

6 : right to left

7 : right to center 8 : right to right

In the example of the character 6 in FIG. 1, the orientation code for the small segment row sequence is "1" for a small segment sequence that starts at address Y-11 in the left third of the character width and continues to Y-14 where it is in the center third of the character width. That is, this small segment sequence is from left to center.

In summary, process 54 develops a code table (see Table II) which contains three codes: (1) a row sequence (2) a duration code for the row sequences, (3) an orientation code for the row sequences of small single segments (if any). The results of this row analysis and codification for the character 6 in FIG. 1 is shown in Table II:

TABLE II

| | | | | | |
|---|---|---|---|---|---|
| 1 | 2 | 1 | 0 | 1 | Row Sequence Code |
| 0 | 1 | 0 | 0 | 0 | Duration Code |
| — | — | — | 1 | — | Orientation Code |

The orientation code is used only for sequences of single small segments, as shown in the above example. If more than one such sequence appears, then a separate such code is supplied for each such sequence.

With the completion of the row sequence code table (Table II) of process 54, the machine performs the next process 56, "Establish Row Codes As Memory Addresses." The row sequence codes of Table II are representative of a particular character, and the association of such codes with their characters is stored in the main randum access memory 24 of the computer machine. Because of the many possible aberrations in printed characters and the random and varied effects in the video processing and detection, the codes that might be obtained can be greatly proliferated, which would result in storage requirements that would be undesirably large and processing time that might also be undesirably large.

The storage system that has been found to be useful for dealing with the large number of codes that may be associated with each of the characters, coming about as a result of the large number of variations that may occur for each character, is one based upon using the sequence codes of Table II for establishing the memory addresses. That is, the system makes use of a computer word stored at a particular address, where the computer word identifies all of the characters associated with a code, and the address identifies the particular geometry code. For example, a ten-bit word has a bit position for each of the numerics 0 to 9, and if the value of a bit is 1, the code is "true" for that associated numeric, as follows:

| Bit Position | 9 8 7 6 5 4 3 2 1 0 |
|---|---|
| | 0 0 0 1 0 0 0 0 0 0 |

which word represents the condition of a code that is true for the character 6 and only that character.

The memory addresses are based upon three criteria:

a. The number of sequences in the sequence code; for example, a hand print 1 would have a single sequence; a U might have two sequences; an 0 three sequences, and so on, with the example of 6 in FIG. 3 having five sequences, and with various other characters having more; as many as eight sequences have been found useful.

b. The particular one of the sequences of the multisequence code that is being addressed; that is, whether the first, second, third, etc.

c. The particular code (i.e., 0, 1, 2 or 3) that applies to any particular sequence.

In the example of the numeral 6 of FIG. 3, and its Table II codes, there is a series of base addresses $B_{5j}$ for a character with the row geometry of five sequences; the same base address applies to every other row geometry of five sequences. The base address for the first row sequence is $B_{50}$ and it is the address for the code-0 when applied to that first row sequence. The address $B_{50} + 1$ is the address for the first row sequence having the code-1; the address $B_{50} + 2$ is the address for the first row sequence having the code-2; and the address $B_{50} + 3$ is the address for the first row sequence for the code-3. In a similar fashion, there is a base address $B_{51}$ for the second row sequence, and $B_{51}$ is used for code-0, Bhd 51 + 1 for code 1, and so on; a base address $B_{52}$ and three intermediate addresses for the third row sequences having codes from 0 to 3; a base address $B_{53}$ and three intermediate addresses for the fourth row sequences having codes from 0 to 3; and the base address $B_{54}$ and three intermediate addresses for the fifth row sequence having codes from 0 to 3. The base address may be any suitable actual memory address from which the other addresses are readily derived in the manner indicated.

In practice, $B_{ij}$ is used for the base address of the $i$ sequence (where i is the total number of sequences, for example from 1 to 8) and $j$ identifies a particular sequence of the group as in this example of five sequences of the row type. In the particular example of the numeral 6 coding set forth in Table II, the memory addresses for the five sequence codes are $B_{50} + 1$; $B_{51} + 2$; $B_{52} + 1$; $B_{53} + 0$; and $B_{54} + 1$, corresponding to the codes 1, 2, 1, 0, 1 for those five sequences.

If we examine the contents of memory address $B_{50} + 1$, we expect to find the following character designator word:

| Bit Position | 9 8 7 6 5 4 3 2 1 0 |
|---|---|
| | 1 1 0 1 1 0 1 0 0 0 |

That is, in bit positions 3, 5, 6, 8 and 9, there are 1-bits, and in the other positions there are 0-bits. This storage representation indicates that characters 3, 5, 6, 8 and 9 (assuming that each has a five-sequence geometry) has a large segment sequence (code-1) for its bottom row. The other characters (0, 1, 2, 4 and 7) either have geometries that do not result in five-sequence code, or they do not have their first or bottom row sequence of the type represented by code-1.

For handling the duration code of Table II, another base address is provided for each class of row sequences (e.g., $D_{50}$ for the five-sequence class of the row type applicable to the character 6 illustration). The duration code, as a five-bit member (for the five-row sequence class) calls for 32 possible addresses corresponding to that number of possible code combinations. Alternatively, and preferably, the addressing system used for the row-sequence codes is employed and a separate additional base address is provided for each of the row-sequence durations. That is, five additional base addresses ($D_{51}$, $D_{52}$, $D_{53}$, $D_{54}$, $D_{55}$) are used for the five durations of a five-sequence class. The base address corresponds to the code-0 duration; and the next intermediate address corresponds to code-1 duration, which intermediate address is obtained by adding 1 to the associated base address.

For handling the orientation codes developed in Table II, preferably a base address P is used for all orientation codes without regard to the number of sequences, which also applies to an orientation code-0 for that sequence. In addition, eight intermediate addresses are used for each row sequence to handle the codes 1 to 8. Provision may be made for only three or four small-segment sequences without regard to the actual number of row sequences, since generally a character may have at most two such sequences. The existence of a small sequence is indicated by code-0 for the row sequence code, which is recognized and utilized as a pre-condition for establishing memory addresses for the orientation codes. Thus, in the example of character 6 and the codes of Table II, the orientation code applies only to the fourth sequence, and the address for that code-1 is P + 1.

With the memory addressing system described above, it has been found possible to set up a memory system using about 500 designator words for a character coding system involving a maximum of seven or eight sequences. Though there is in principle no limit to the number of sequences that may be used, seven or eight have been found suitable for many machine print type fonts. The actual number of codes that such a coding system makes possible is in the millions or tens of millions, most of which would not be used. Thus, this memory addressing system permits the use of practical size memories to deal with the codes that are actually developed in practice.

After the row codes have been established as memory addresses, the operation steps to process 58, "Get Character Designator Words From The Memory." Each of the memory addresses established by process 56 in accordance with the row codes is used to get a corresponding character designator word from the memory. This set of designator words represents (by the various 1-bits therein) all of the characters that incorporate any one or more of the row codes generated by process 54. An operation on these data is performed by the next process, "Obtain Logical Intersection of Character Designators." That is, all of the corresponding bit positions of the designator-word registers have their outputs tested together for logical intersection. One technique for this, using a general purpose computer, is to employ the AND instruction thereof, whereby a logical AND is performed in the A-register thereof on the corresponding bits of the first two designator words, thereafter on the result thereof with the next such word, and so on. This process is repeated for each of the designator words for each row sequence, duration and orientation code.

Thereafter, decision process 62 determines if but a single bit position of the resulting intersection used in the A-register is a 1-bit. If it is, control is directed to the next process 64, "Decode Designator Intersection," and this process establishes the particular character from the bit position of the designator word containing the unique 1-bit. The following process 66 produces an output which designates the name or symbol of that character, or produces a particular control operation associated with it. Thereafter, via control A, the operation returns to the initial process of 48, "Selecting And Framing Video For Next Character," to repeat the entire operation described above for that next character.

If the result of the row analysis is not found by process 62 to lead to a single designated character, then the column analysis is initiated by way of process 68, "Generate Column Segment Bounds," which operation is similar to that of process 50 except that the segments in the columns are analyzed to obtain the upper and lower bounds thereof, and thereby their lengths.

Thereafter, process 70 is performed to "Generate The Column Segment Code Table By Number And Length." The operation of this process 70 is similar to that of process 52, except that a modified code has been found to be more appropriate for machine print of the Arabic numerics and English alphabetics. That is, the column codes 0, 1, 2 and 3 have the same descriptions as those codes do for the rows, except that a large column segment is defined as one which is three-quarters the column height, or more. In addition, codes 4 and 5 are employed for a column which contains one or more segments, the largest of which qualifies as "intermediate" and its center is in the lower half of the character height (code 4) or its center is in the upper half of the character height (code 5). The term "intermediate"is used for lengths that are one-half up to but not including three-quarters of the character height. Other relative sizes may also be used for the designations "intermediate" or "large" for segments.

In the example of the character 6 illustrated in FIG. 3, we see that the first column on the left at address X-4 is a short segment (less than one-half the character height), while the second column segment at address X-5 is an intermediate segment (i.e., slightly more than one-half the character height). The center of this intermediate segment is in the lower half of the rectangle, and the segment is a code-4. The column segments assume the code forms shown in Table III:

TABLE III

| Column | Code |
|---|---|
| X-2 | 0 |
| X-3 | 4 |
| X-4 | 1 |
| X-5 | 2 |
| X-6 | 2 |
| X-7 | 3 |
| X-8 | 3 |
| X-9 | 3 |
| X-10 | 3 |
| X-11 | 0 |
| X-12 | 0 |

Thereafter, the operation continues with process 72, "Generate Code Table For Column Sequences, Durations and Orientations." This operation is similar to the previously described operation for the row-sequence code table. It it seen that the segments set forth in Table III take the form of the following code sequences:

0 4 1 2 3 0

Since the first short column segment is unsustained, while the next two are intermediate and long, respectively, the short unsustained sequence is dropped and the intermediate and long are retained to produce the following sequence code with corresponding durations indicated therebelow:

4 1 2 3 0

1 1 2 4 2

All of these sequences are short except for the code-3 sequence, so that the duration code becomes 0 0 0 1 0.

A sequence orientation code is also used for the column sequences. This code is similar to the short segment sequence orientation code for rows, except that the columns are treated as having segments oriented lower, center or upper (as contrasted to left, center or right in the rows) and the character height parameter is used to determine in which third thereof the center of the segment is located. With the segment center in the lower third, it is lower oriented; in the center third it is center oriented; and in the upper third it is upper oriented. The column orientation code is as follows:

0 : Lower to lower
1 : Lower to center
2 : Lower to upper
3 : Center to lower
4 : Center to center
5 : Center to upper
6 : Upper to lower
7 : Upper to center
8 : Upper to upper In the example of character 6 shown in the matrix of FIG. 3, the short segment sequence of columns X-11 and X-12 both have their centers in the lower third of the character height, so that its orientation code is 0. Thus, the column sequence code table is established in a manner similar to that described above for the row sequences, and for the example of character 6 shown in FIG. 3, the codes are those set forth in Table IV:

TABLE IV

| | | | | |
|---|---|---|---|---|
| 4 | 1 | 2 | 3 | 0 |
| 0 | 0 | 0 | 1 | 0 |
| — | — | — | — | 0 |

Thereafter, process 74, "Establish Column Codes As Memory Addresses," and process 76, "Get Character Designator Words From Memory" operate in a fashion similar to that described above for the row processes 56 and 58, except that the operation is on the column codes rather than the row codes. Process 78 obtains the logical intersection of the designator words by ANDing the designators of similar bit positions. Decision 80 determines if the result of the AND operation is that of designating a single character; if so, process 82 decodes the designated character, and process 84 produces print-out of the name or symbol of the character, and the operation is returned to the process 48 for the next character. If decision 80 determines that it is not a single character, the next operation 86 may be simply that of producing an output display or print-out indicating non-recognition. Alternatively, as indicated in FIG. 4, another decision 88 may be employed to test whether or not there was an absence of coding for the particular row and column sequences, and if so, to indicate non-recognition by process 86. If the result of decision 88 indicates that there is multiple coding, then the operation goes to an appropriate separator routine 90, to see if it is possible to analyze on a more refined basis to identify the character.

One example of a set of characters which may be difficult to discriminate between by means of the above described coding system is that of the two characters D and O. That is, for some type fonts, both the row and column coding would be the same for these two alphabetic characters. As a consequence, when either character is read during the "process" mode, a multiple coding would exist and would be identified by the decision 88. This latter decision would indicate not only that multiple coding existed, but also the nature of the multiple coding, and a particular routine would be available in the system at a known address in the memory 24 to perform the necessary detailed analysis for discrimination between the two characters D and O. For example, in the case of these two alphabetic characters, the distinction between them may be in the rounded corners for the O on the left hand side, as contrasted to the relatively rectangular corners for the D.

The separation is obtained by examining in detail the nature of the matrix of video in those two corners of a specimen character which is so identified as being either D or O. For example, the difference between the left framing address of each character and the left edge of the top row segment is obtained and this difference (which is a measure of the empty corner space) is repeated for the succeeding few rows, and the differences are added cumulatively. Since the corner space is a measure of the curvature, if the difference is above a certain threshold value the curved O is identified and that character is so recognized by the separator routine; if the sum of these differences is below a second threshold, it is identified as a D; and if between the two thresholds, the result is presented as a non-recognition.

The use of separator routines makes it possible to use relatively simple codes of the type described above, which require relatively minimal quantities of storage for the learned reference characters and permit relatively rapid analysis of most of the character geometries. For the relatively small number of ambiguous character situations that may exist for any particular type font, the separator routines can be individually designed and software or computer-program architecture used for the machine system to discriminate between the ambiguous situations and precisely identify the character. Thus the separator routine technique is a desirable one for precision identification in potentially ambiguous situations, and lends itself to modification and adaptation in the field as ambiguities may arise in the character recognition.

Figure 5:
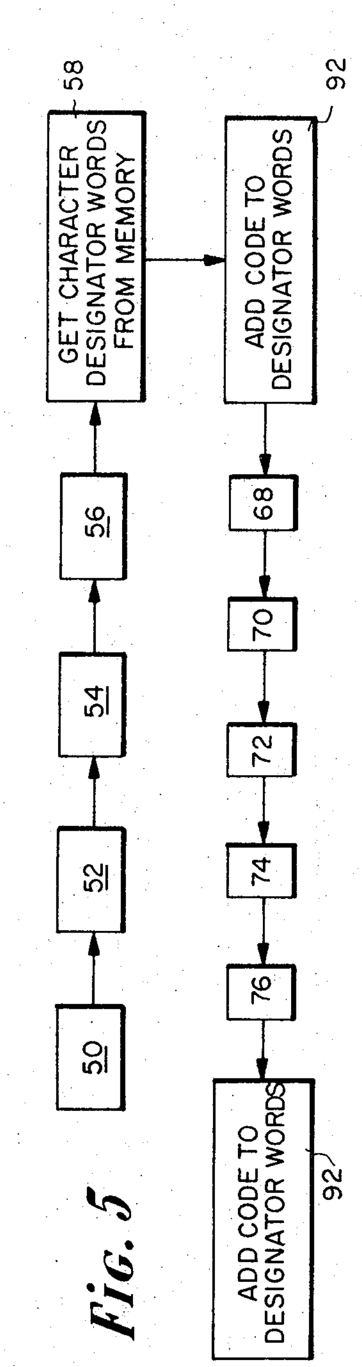
FIG. 5 is a schematic block and flow diagram of a modification of the analytic character recognition system of FIG. 4 for operation in a learn mode.

As indicated in FIG. 5, the operation of the "learn" mode is generally the same as that for the "process" mode. Except for the operations in the row analysis following operation 58, when the designator words are obtained from the memory and established in the A-register, the next operation 92 is that of inserting in the designator words at the appropriate bit or character positions those having a 1-bit content. This operation may be readily performed with a computer by a logical OR operation on the contents of the A-register successively with the corresponding contents of the designator words. Following this analysis and insertion of codes for the rows, the next operation is that corresponding to the processes 68–76 in the manner described above for the columns, which is followed by the operation 94 for inserting the column bits into the proper designator words and returning them to the storage. Upon completion of this operation, the next character has its video selected and framed, and the process is repeated.

In practice, during the learn mode a wide variety of examples of each character to be recognized is supplied to the machine and identified for it. The machine may be supplied with thousands of examples of each character and, from the variations in tolerance of the positioning of the character within the character detection system, variations in the video processing (i.e., a quantization error), as well as from the variations in the printing of the different examples of each character, a substantial body of reference data is established for the character coding in both the row and column examples. It has been found in practice that by an initial learn process of this type the overwhelming majority of cases of a type font and its alphabetic-numeric characters are "learned" by the machine, so that most recognition tasks of specimen characters can be readily performed. As ambiguities of the multiple coding type arise, as well as other non-recognition situations, the machine operator may provide the machine with the reference data of these situations, or may develop separator routines as would be appropriate to deal with these cases.

The character recognition system of this invention, shown in FIGS. 1, 3 and 4, may be constructed in various ways. In one form, a general-purpose digital computer is used for the control processor 22 and memory 24, with a software system for the control logic for directing the operation of the processor, which control logic is described above in connection with the process blocks 50 through 90 of FIG. 4 (and blocks 50 through 92 of FIG. 5) and the associated operation of FIG. 3. This computer-program form of a control logic has the advantage of providing a system which lends itself to modification, enhancement and revision with use, and with change in the system requirements.

The following describes one form of this invention: Block 50 operates on the memory addresses of the bits stored in the memory matrix 42. Successive bits of each slice are compared to identify each transition from a 0 to a 1-bit, and to the numerical coordinate of that 0 to 1 transition, which identifies the left bound of each segment. The right bound of each segment is identified by the transition from a 1 to a 0-bit, which is likewise identified by its numerical coordinate. The segment lengths are established numerically by taking the difference between the two coordinates or by counting the 1 bits between the transitions of a segment. The number of segments in each slice (row or column) is determined by counting the number of left bound transitions from 0 to 1 (or the right hand transitions).

The operations of block 52 develop the Row Segment Code Table (Table I) as follows: Initially the longest segment of the slice is identified by comparing lengths of two segments to choose the longer; the length of that longer slice is compared with that of the next segment, again to choose the longer, and so on. The longest segment so chosen is then compared with a certain parameter (e.g., half the character width, which is determined from the difference between the two framing X-addresses) to determine whether it is a "long" or a "short" segment. If it is a long segment, the Slice Code is 1; if it is a short segment, and the only segment, the Slice Code is 0; if there are two short segments, the Slice Code is 2; and if there are three or more short segments, the Slice Code is 3.

The operations of block 54 perform the next numerical analysis on the data of the row slices developed thus far. The Slice Codes of successive slices are compared to determine whether they are the same or different. A Sequence Code is used to identify the sequence of Slice Codes that make up a character. The Sequence Code is established by setting down a sequence of the Slice Codes without contiguous duplication; that is, where successive Slice Codes are the same, only one is maintained in the Sequence Code, and the subsequent ones of the series are dropped for this purpose. Also, if a Slice Code is not followed by the same code in a succeeding row, it is dropped and not used in the Sequence Code, except if the Slice Code is 1 for a slice having a long segment, in which case it is retained. The operation to develop the Sequence Code consists of comparing successive Slice Codes and retaining the series of Slice Codes under the above rules to form the Sequence Code.

The operations of block 54 also identify the duration of each Slice Code comprising the Sequence Code by a count which is maintained of successive duplicate Slice Codes which form a sequence. Thus, for each sequence that forms a part of the Sequence Code, there is a numerical duration of that sequence established. These sequence durations are compared with the aforementioned preset parameters to identify whether the sequence is "long" or "short." Thereby a duration code is assigned to each element of the Sequence Code so that an overall Row Duration Code is established which corresponds to the Row Sequence Code, element by element.

The operations of block 54 also determine the orientation of small segment sequences, those of code 0; for example, under the aforementioned criteria, the left bound of each segment is compared with one-third of the character width. If less than one-third, the segment is designated as "left." If greater than one-third but less than two-thirds, the segment is designated as "center," and otherwise as "right." This orientation designation of the single segment of the first slice and of the last slice of the sequence is combined in accordance with a prearranged code established, for example, in a look-up table. An Orientation Code is established for each single small segment sequence. By successively testing each sequence position of the Row Sequence Code for a code value 0, the small, single segment sequences are located. When the sequence position has a code value 0, the left bounds of segments of the first and last slice of the sequence are established and combined in accordance with the pre-arranged code, as described above, and placed in the corresponding position of the Orientation Code.

The operations of block 56 establish memory addresses for the row codes. A look-up table for these addresses is provided as explained above. That is, different sub-tables within that look-up table contain base addresses $B_{ij}$ associated with Sequence Codes having (i) numbers of sequences. Within each $i^{th}$ sub-table the addresses are arranged by the particular order (j) of the sequence within the Sequence Code and in a further breakdown, by the code value itself. The operation of establishing memory addresses consists of obtaining the base address $B_{io}$, where the 0 represents the first sequence in the Sequence Code, and adding thereto the code value of the first sequence. The resulting number is a memory address containing a Character Designator Word for that code value of the first sequence of a Sequence Code containing (i) sequences.

The operations of block 58 fetch each Character Designator Word (i.e., the contents of) at each memory address established by block 56. Block 60 combines all such Designator Words on a logical AND basis to obtain the logical intersection.

The operations of block 56 are repeated for each sequence of the Sequence Code, where $j$ changes successively, and the code value of the $j^{th}$ sequence is added to $B_{ij}$. Blocks 58 and 60 repeat their operations for each such address obtained by block 56. The same procedures used for obtaining memory addresses for the Sequence Codes may be used for the Duration Code and the Orientation Code, except that, as described above, a different base address $D_{ij}$ is used for the Duration Code, and a base address $P_{ij}$ is used for the Orientation Code, where $i$ is the number of small sequences, and $j$ its position. It has been found that the Duration Code may be used directly as a numerical address for looking up the memory address of the Character Designator Word. Test 62 determines whether the logical intersection of block 60 results in a word containing a single 1-bit. If it does, block 64 determines the bit position of that 1-bit, which identifies the character, and block 66 designates that character by printing it out. If the test 62 shows that the code is not unique, operations similar to those noted above for the row slices are repeated in blocks 68–78 for the column slices, with minor variations. The logical intersection formed by block 78 is the combined intersection of the Character Designator Words for the rows and columns (i.e., it builds on the result of block 60).

Blocks 68–84 are the same as blocks 50–66, respectively. However, block 70 may be modified to deal with column code generation, that is, different comparison criteria may be used, namely, a long column segment is one in which the segment length is three-fourths or more of the character height. In addition, an intermediate column segment is one in which the length is between one-half and three-fourths the character height. Additional codes 4 and 5 are employed to identify criteria relating to the center of the intermediate segment. This center of the intermediate segment is determined by taking the sum of the left bound and the right bound coordinates and dividing by two. The center of the intermediate segment is then compared with half the character height, and if it is in the lower half of the character the code is 4, and if in the upper half of the character the code is 5.

Block 90 for separator routines may be used if the result of decision 88 indicates multiple coding, i.e., nonrecognition due to more than one character being designated. In a small percentage of cases, such multiple coding occurs, and it has been found that a separator routine can discriminate therebetween. An example of a separator routine for distinguishing between D and O is set forth above.

Another form of the invention is based upon the use of control circuits for much of the control logic that is employed. In addition, for the separator routines of process 90, which form an important facility of this invention as described above, the amount of logic required is so extensive that a computer-program embodiment is there also used, since a logic-circuit embodiment would be prohibitively elaborate and expensive with the present state of development of the art. It will be apparent to one skilled in the art, from the above description of the processes 50 through 88 and 92, how to implement each portion thereof by means of a computer-program embodiment or a logic-circuit form. In addition, various engineering considerations may determine that some parts or functions of the control logic are to be performed by circuitry or "hard wire" and other parts by computer programs or "soft wire." One example of the preferred use of software is for the separator routines, which are better performed by software, especially if they are to be developed for individual applications and different type fonts and print quality, and therefore subject to revision and modification. Some of the logic control for the code generation has been performed by logic circuitry for greater speed; other parts involving complex decisions which are in number have been performed by software to gain flexibility and versatility. Generally, where the coding functions are simple, repetitive but large in number (e.g., the segment coding in rows and columns), hardware logic is likely to be preferred, especially since much the same circuitry can be used in large measure for both rows and columns.

The coding system of this invention may take a number of different forms, which will be apparent to those skilled in the art from the above description. As also indicated above, the column coding may take a different form from the row coding. The row and column coding may be essentially independent, as described above, or they may be used conjointly, so that the codes of the column coding are combined on a logical AND basis with those of the rows if the row coding does not produce a recognition. Such combined column and row coding may be advantageous in certain situations. In addition, the operation 60 of obtaining the logical intersection of the designator words may be performed after a certain minimum number (less than all) of the codes is developed and their associated descriptor words obtained. The test 62 to determine if the resulting code combination is unique is thereupon performed. If not unique, the next row code is established, its designator word obtained and combined with the previous intersection on the same logical AND basis. This result is again tested for uniqueness, and the processing repeated until a unique code is found, or the codes are all processed and the result is a multiple code.

Figure 6:
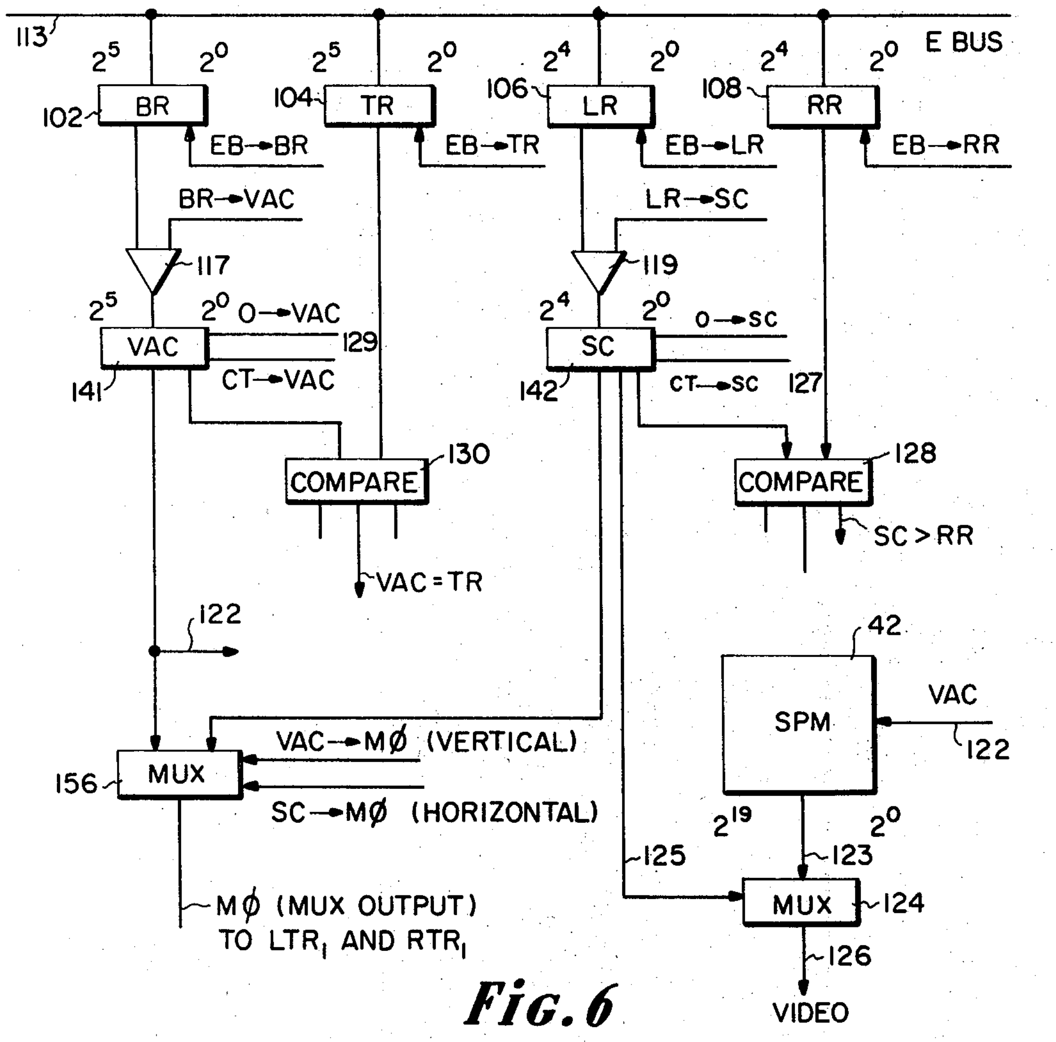
FIGS. 6–9 are schematic diagrams of logic.

Another embodiment of this invention, described in connection with FIGS. 6 et seq., incorporates hardward logic circuits for those parts of the recognition system used to develop the row and column segment data and the associated Slice Codes. This part of the system is called Slice Description Work (SDW) logic. Software (computer programs) and a general purpose computer comprise the apparatus used for the remainder of the recognition system and overall executive control.

The SDW logic operates in response to softward commands, and determines the Slice Code Words (SDW) for the isolated video in the scratch pad memory 42 (FIG. 3) based on preset parameters and then stores them in the computer memory 24 (FIG. 1), using a communications channel of the computer 22. Block diagrams of this logic are shown in FIGS. 6–9.

Figure 10:
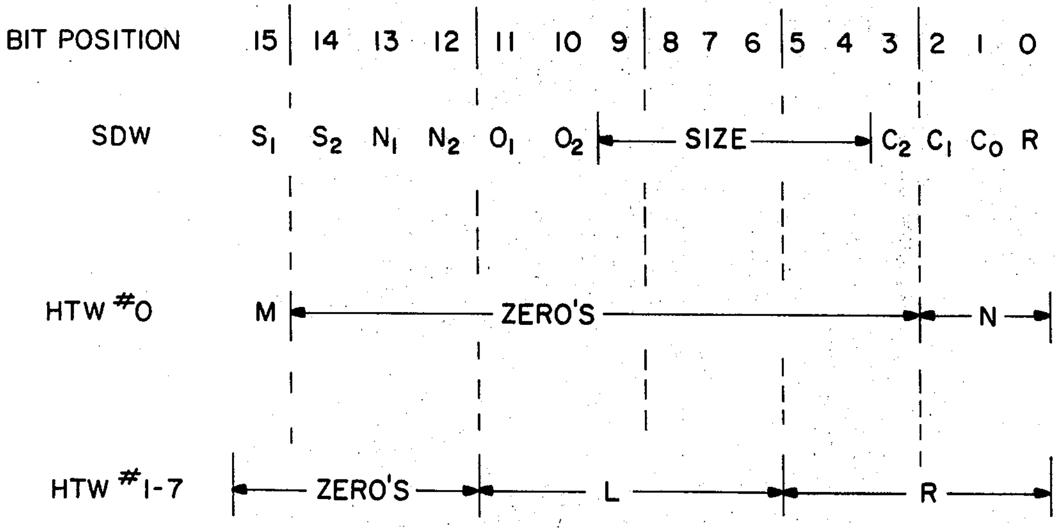
FIG. 10 is a diagram of code formats.
Figure 7:
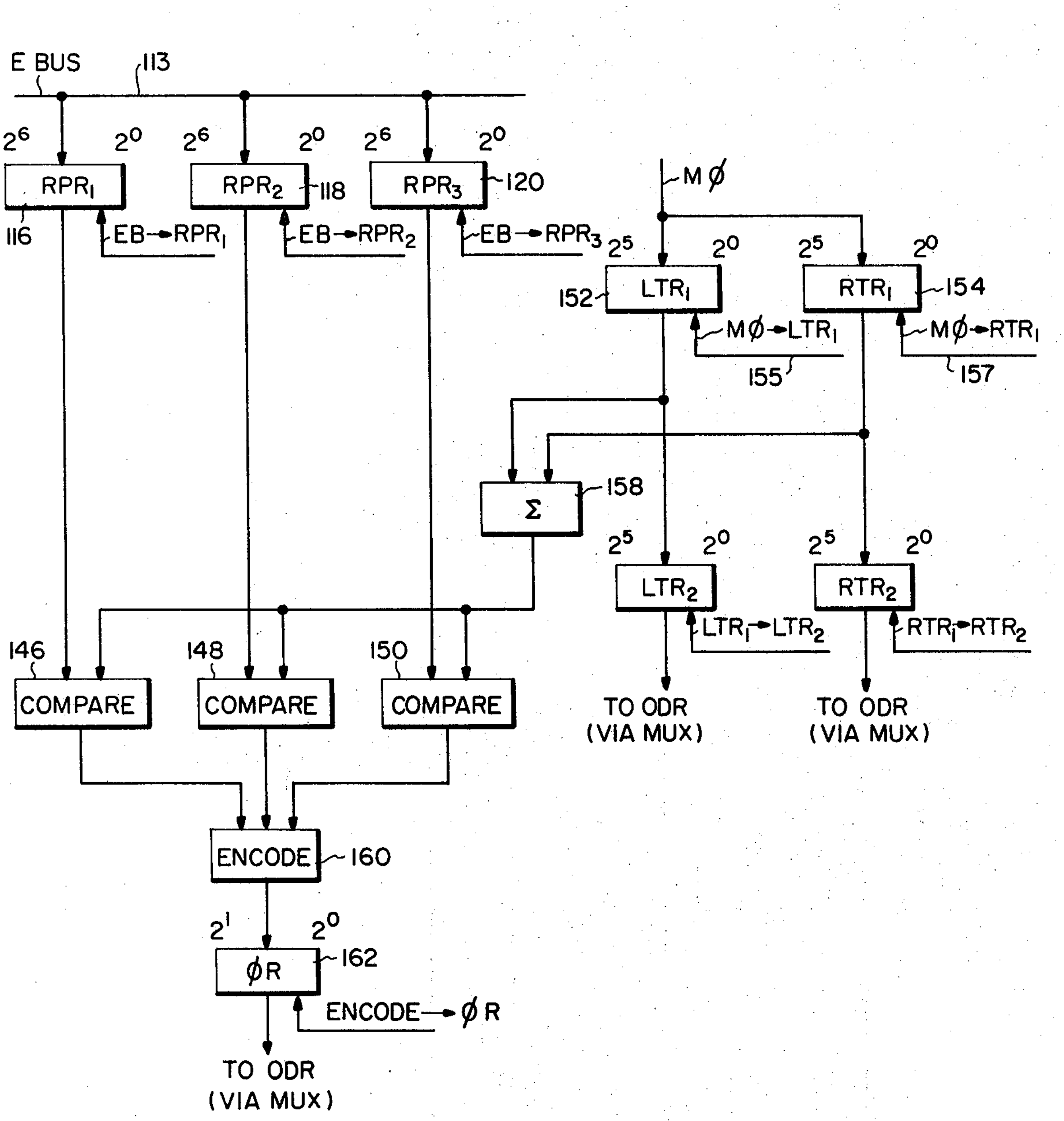
Figure 8:
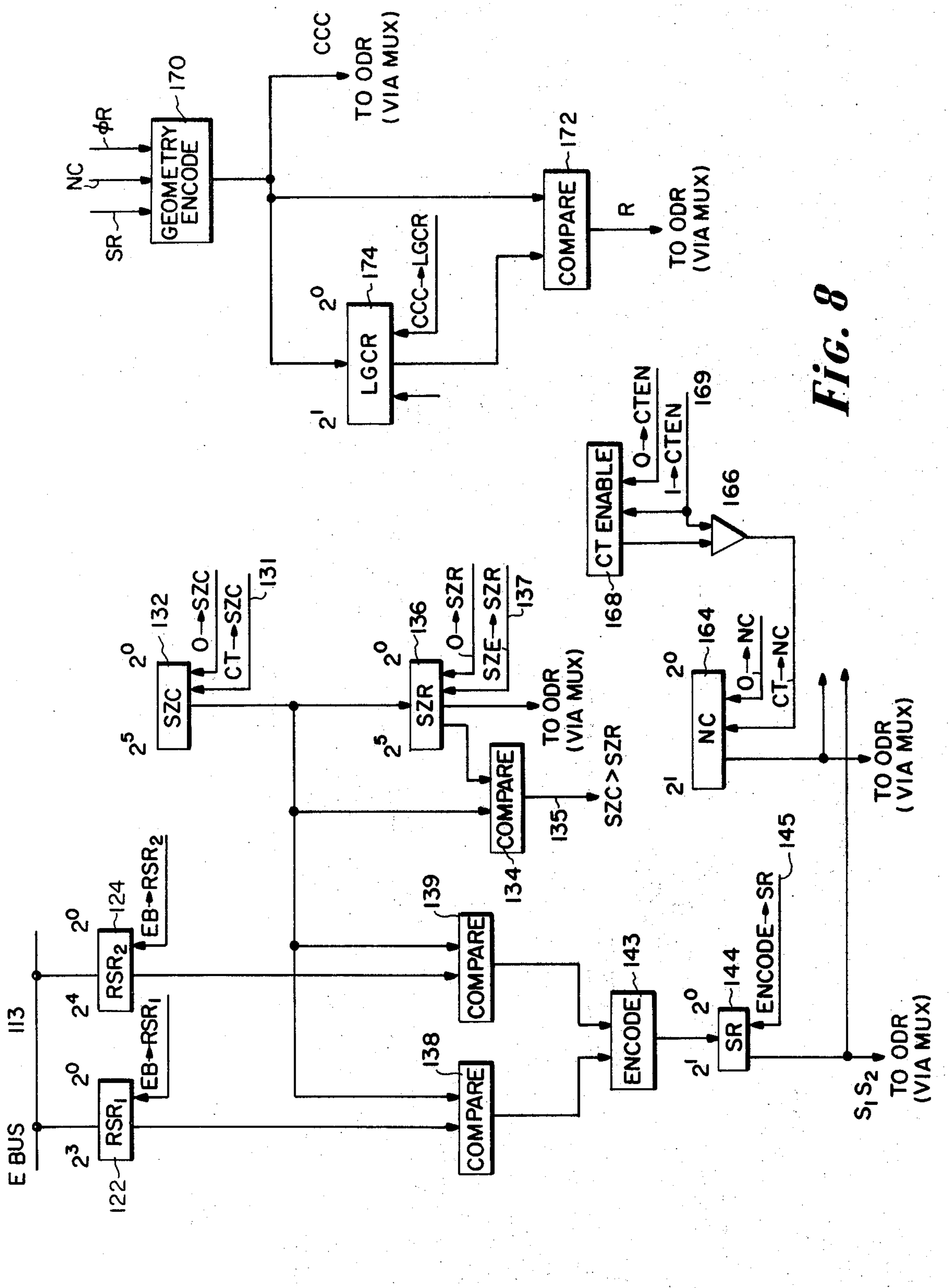
Figure 9:
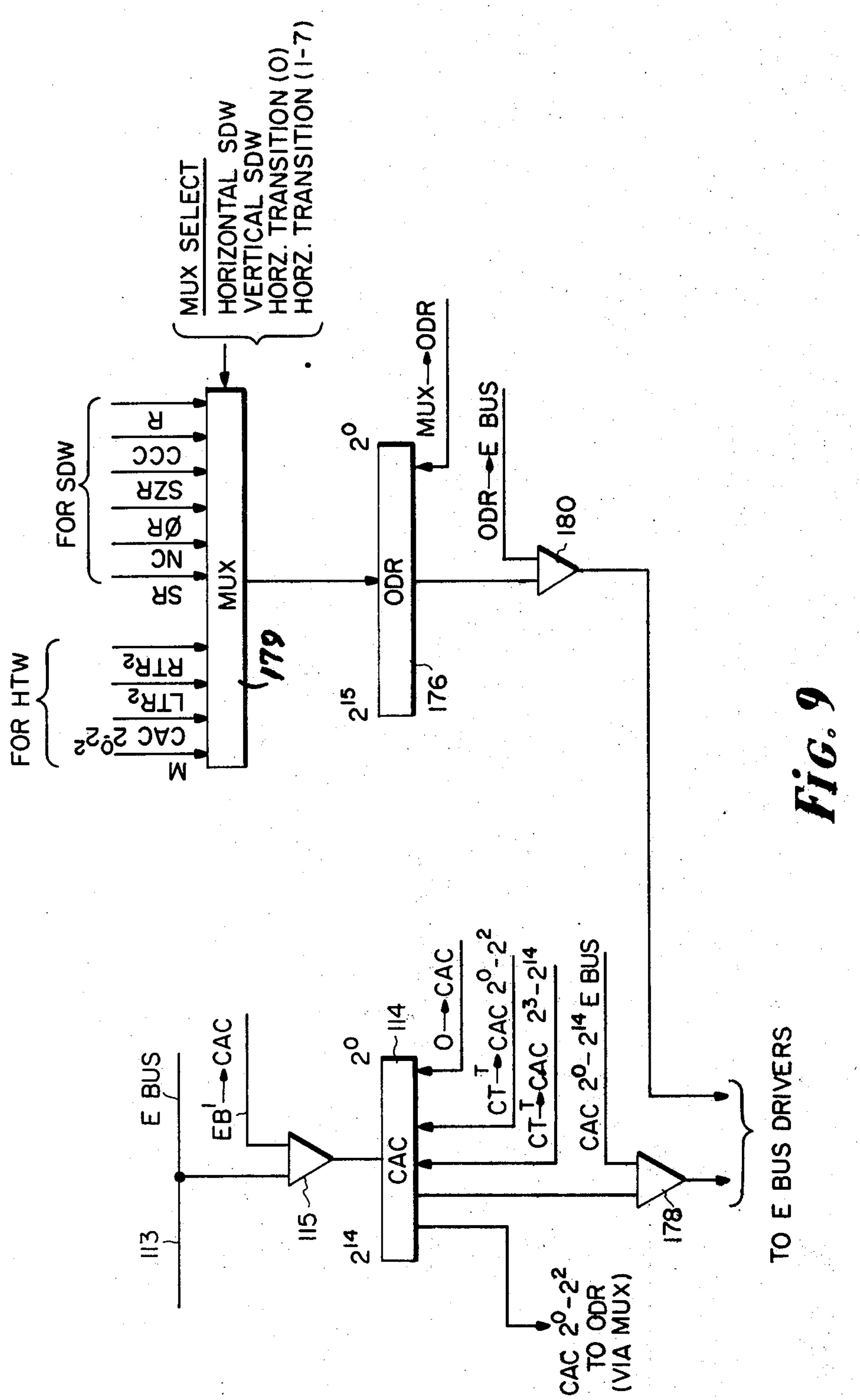

Before initiating the SDW process, a character has been framed, as described above, in the scratch pad memory 42 and its height, width, vertical and horizontal boundaries have been stored in the computer memory 24 (FIG. 1). recognition parameters such as size references (small, medium, large) and position references (left, center, right or bottom, center, top) are also stored in the computer memory. In addition, an area of computer memory 24 is reserved to receive the SDW words when they are encoded. In preparation for extracting the code words, these constants or parameters are transferred to hardware storage registers using an appropriate instruction set. Following this transfer, the software control may request the SDW logic to supply to the computer memory either of two basic types of code words: 1. Slice Description Words (SDW) may be formed for both horizontal and vertical slices. One code word (FIG. 10) is generated for each slice examined and defines its bit pattern (FIG. 10). 2. Horizontal Transitions are code words that define the segments found in horizontal slices; a slice by slice examination takes place, with a separate word for each segment in a slice, as well as a work conveying the number N of segments in the slice.

The SDW in this embodiment (which generally employs an actual notation) is a 16-bit word describing a given slice, horizontal or vertical, and has its format shown in FIG. 10A:

1. $S_1S_2$ is a 2-bit code which designates the size of the largest segment in the slice; 00 is for small, 01 for medium, and 10 for a large segment.
2. $N_1N_2$ is a 2-bit code designating the number of segments in the slice; 00 is for one, 01 for two, 10 for three, and 11 for more than three segments.
3. $O_1O_2$ is a 2-bit code which designates the orientation of the largest segment in the slice with respect to the rest of the pattern; 00 is for left or bottom, 01 for left center or bottom center, 10 for right center or top center, 11 for right or top.
4. Bits 4 through 9 contain the length of the largest segment in the slice.
5. $C_2C_1C_0$ is a 3-bit geometery code obtained by encoding in a condensed form the size, number and orientation codes as follows:

TABLE V

| SDW | | | | | | Description | Slice | | |
|---|---|---|---|---|---|---|---|---|---|
| $S_1$ | $S_2$ | $N_1$ | $N_2$ | $O_1$ | $O_2$ | | $C_2$ | $C_1$ | $C_0$ |
| 0 | 0 | 0 | 0 | X | X | One Small Segment | 0 | 0 | 0 |
| 0 | 0 | 0 | 1 | X | X | Two Small Segments | 0 | 0 | 1 |
| 0 | 0 | 1 | X | X | X | Three or More Small Segments | 0 | 1 | 0 |
| 1 | 0 | X | X | X | X | Contains Large Segment | 0 | 1 | 1 |
| | | | | | | Largest Segment is Medium and | | | |
| 0 | 1 | X | X | 0 | X | (1) Bottom or left oriented | 1 | 0 | 0 |
| 0 | 1 | X | X | 1 | X | (2) Top or Right Oriented | 1 | 0 | 1 |

The SDW logic in FIGS. 6–9 is concerned with scratch pad memory access and comparison and encoding logic. In addition, conventional decode and control logic converts the software commands to control bits and boundary constants or parameters and stores these parameters in the appropriate registers.

In this embodiment, the scratch pad memory 42 (FIGS. 3 and 6) is made up of 20 columns and 64 rows, the character limits in which are stored in four boundary registers 102, 104, 106, 108, respectively identified as reference registers for bottom (BR), top (TR), left (LR) and right (RR) references. Each horizontal slice is examined one bit at a time starting at the left reference and ending at the right reference. In the same manner, examination of a vertical slice begins at the bottom reference and ends at the top reference. The reference registers BR, TR, LR, RR are flip-flop registers; BR and TR are 6-bit registers (as may be seen from the convention followed in the drawing) that store the vertical position of the bottom and top slice or bit, respectively, that is to be examined. LR and RR respectively store the horizontal position of the leftmost and rightmost bit or slice to be accessed.

This SDW hardware logic, including these reference registers, is connected to the general purpose computer via an E bus 113 (of 16 parallel lines) and SDW logic operates with the general purpose computer as one of the peripherals thereof. A suitable intercommunication system for it is well known and described in the Computer Handbook No. 113–A, August 1971, for the Varian model 620/f (e.g., Sec. 11, Input/Output System); this handbook is generally applicable to this specific embodiment hereinafter described, and that computer is a part of the system.

A computer address counter (CAC) 114, of 15 bits, receives from the E bus 113 via gate 115 the lowest address in the main computer memory at which the SDW's (starting with the first) will be stored successively as each SDW's processing is completed in the hardware logic and the SDW transmitted to the computer memory. CAC 114 is incremented each time an SDW is transmitted, so that it then stores the address for the next SDW to be stores in the main computer memory. The gate 115 represents 15 gates for parallel signal transfers. Other gates and lines in the drawing similarly represent parallel signal configurations.

Also from the E bus, reference position registers (RPR) 116, 118, 120 (FIG. 7) receive respectively the left (or bottom) center and right (or top) reference positions (7 bits) that serve to identify the orientation code boundaries for development of the orientation codes. Reference size registers (RSR) 122 and 124 (FIG. 8) also receive parameters (4 and 5 bits) from the E bus corresponding to the boundaries for determining small, medium and large, which are compared with the actual size data supplied by a size counter (SZC) 132 to develop the corresponding three sizes of the size code. All of the reference registers are gated at the proper times to accept their respective parameter data words from the E bus by individual control signals (shown at the registers) which are themselves generated by a decoder (not shown) after it identifies the instruction words on the E bus that precedes each particular data word to be stored in a reference register. Each register is identified by a different 16-bit instruction word (9 bits of instruction and 7 of data) that comes from the computer; the 7 bits of data are the reference parameter which is stored in the register itself. Suitable techniques for this purpose are described in the aforementioned handbook.

To initiate operation in the SDW hardware logic, the computer transmits an instruction which directs the SDW logic to extract horizontal or vertical SDW's or one to extract horizontal transition words. Depending upon which of these instructions are received by the hardware logic, a decoder sets up appropriate flip-flops to control the subsequent sequence of operation. After the reference parameters are transmitted and the instruction issued, initially, for all of these modes of operation, the contents of BR and LR are transferred by respective groups of gates 117 and 119 to a vertical address counter (VAC) 141 and a horizontal address (or shift) counter (SC)142. The vertical address in VAC establishes via line 122 the row slice that is read from the scratch pad memory 42 and supplied as 20 bits in parallel via lines 123 to a multiplexer 124. The latter also receives via lines 125 the horizontal address from SC, and is thereby controlled to pass one bit at a time, which is the "video" from the input slice, as the horizontal address count is stepped from the left reference to the right, or the vertical address count is stepped from bottom to top. Thus on video line 126 there is a single bit which is a 0 or a 1 at any instant, for white or black on the character. The particular bit of the row slice that is supplied on line 126 is specified by the output of SC on line 125, which defines the switching control for the multiplexer 124 and thereby the particular bit of the 20 bits of the input slice that is passed to the video line 126. When operating in the vertical SDW mode, the horizontal address in the SC counter 142 establishes the particular vertical slice which is being scanned, and the successive stepping of the vertical address in VAC counter 141 determines the bit of that vertical slice which passes out onto the video line 126.

At the beginning of the horizontal SDW process, the setting of VAC is the bottom reference and SC contains the left reference. Thus, the leftmost bit in the bottom slice is enabled to the SDW logic. After this first bit has been passed and examined, the SC counter is stepped (by an asynchronous timing signal CT on line 127) to enable passage of the second bit in the slice through MUx 124. This process continues until the number in the SC counter is one greater than the right reference. This latter condition indicates the end of a slice is detected by comparator 128 to initiate an incrementing signal CT on line 129 for the VAC counter, and gate 117 is again enabled to pass the left reference from LR into the SC counter. The stepping process repeats, and the next slice is examined in the same way. This process is continute until the count in the VAC counter is equal to the top reference (as detected by compare 130) and the horizontal address is greater than the right reference (detected by compare 128). This set of conditions indicates that the rightmost bit in the top slice has been examined and the complete horizontal SDW process is ended. During a vertical SDW process, the bits in successive vertical slices are similarly accessed to pass the video bit by bit. However, the vertical address counter VAC is incremented for each bit and the shift counter SC is incremented only once for each vertical slice. At the end of each slice, the contents of BR are transferred to VAC.

The codes that made up the SDW are formed dynamically while the video bits are being accessed. All of the codes are being generated at the same time, in parallel:

Size Code Generation uses the parameters stored in the reference size registers, namely, the small and medium size references. As the video bits pass to line 126, a count signal Ct is generated for each black video bit on line 131, to step the size counter (SZC) 132, once for each black bit. When the first white bit following a black bit is detected (e.g., by passing the white bit through a gate enabled by a flip-flop set by the previous black bit), the number in SZC is compared (by compare 134) to the number in the size register (SZR) 136. If the number in SZC is greater than the number in SZR, a signal on line 135 indicates that the current segment size in SZC is the largest yet encountered in the slice. Upon detecting this condition, a control signal on line 137 enables SZR, and that new size count is transferred into the size register 136 from SZC. The size count is continually compared (by compares 138 and 139) to the reference values stored in the reference size registers ($RSR_1$ and $RSR_2$) 122 and 124. Encoder 143 operates in accordance with the S $_1S_2$ code on the outputs of compares 138, 139. Concurrently with the transfer signal on line 137 for transfer of the size count to SCR, a signal on line 145 transfers the $S_1S_2$ code from encoder 143 to the size code register 144 for storage. Therefore, the size register 136 and size code register 144 are regularly updated to contain the size and code for the largest complete segment detected in the slice.

Orientation Code Generation operates with the small, medium and large reference values stored in the three reference position registers (RPR) 116, 118, 120. These values are twice the true value for ease of comparison (in compares 146, 148, 150) with the sum of the left and right boundaries of the segment being examined. These 0 to 1 and 1 to 0 boundaries are stored in registers ($LTR_1$ and $RTR_1$) 152 and 154, respectively. The latter receive, via MUX 156, the horizontal transition address from SC during horizontal SDW (or the vertical address from VAC during vertical SDW) as controlled by signals on lines 155 and 157, respectively, generated by the left and right (or bottom and top) transitions. Adder 158 continually sums these segment boundaries, the sum is compared to the references, and the comparisons encoded by encoder 160 in accordance with the orientation code to generate $0_1$ $0_2$. This code is stored in the orientation register (OR) 162 by a signal developed at the end of the largest segment yet encountered, as described above.

Number Code Generation takes place in the number counter (NC) 164 (FIG. 8) which is stepped by signals passed by a gate 166, which in turn is enabled by a set flip-flop 168. A first 0 to 1 transition signal on line 169 sets the flip-flop, and succeeding ones are passed by the gate to NC. Thus, counter NC is incremented as each segment following the first is encountered to form the code $N_1N_2$ for the number of segments. The NN code 00 is for one segment, 01 is for two, 10 for three, and 11 for more than three, whereupon NC ceases counting.

The Geometry Code $C_1C_2C_3$ of the entire slice is generated by encoder 170, which operates according to the truth table of Table V above, with the contents of SR, NC and OR. This occurs when the entire slice has been examined, and the other codes SS, NN and 00 have been finally generated. Thereupon CCC is compared (by compare 172) to the previous geometry code word in register LGCR 174, and the proper repeat bit (R) is generated to indicate whether the new CCC is the same or different. Then the entire 16-bit word is transferred to the output data register (ODR) 176 through the multiplexer 178 (FIG. 9) since the output of compare 128 indicates the completion of the slice. Also, the current CCC is then stored in LGCR for comparison with the CCC of the next SDW. The portion of the inputs to MUX 178 that are transferred to ODR is controlled by a MUX Select in accordance with whether the logic is operating in the SDW or HTW mode, and which part thereof. At this time the computer address counter (CAC) 114 contains the address of the memory location at which the SDW should be stored via the E Bus 113, using the direct memory access channel described in the aforementioned handbook. Gates 178 pass the memory address from CAC to the E Bus drivers and thereafter gates 180 similarly pass the SDW from ODR. Thereby, the computer memory 24 stores each SDW in successive memory locations starting with a first address set by the computer for the first SDW. After the SDW process terminates (marked by the combined outputs of compares 128 and 130) and the last word is transmitted on the E Bus, the SDW logic is dormant. Generally, a horizontal SDW is followed by the computer sending an instruction for the processing of a vertical SDW, and the processing proceeds in a manner similar to that described above and with the above-noted differences.

The Horizontal Transition Word (HTW) is also a 16-bit code word (FIG. 10) used in the separator routines, and at least two HTW's and as many as eight, are required to describe a given horizontal slice. The first HTW indicates the number of segments in the slice by the value of N up to seven (and if more than seven, by setting the M bit to 1). The succeeding HTW's contain the positions of the beginnings and ends of each of these segments. In the first horizontal transition word, only four bits are used. Bit No. 15 (M) is zero unless there are more than seven segments in the row. Bits 14 through 3 are not used. Bits 2 through 0 contain N. The seven following HTW's contain two six-bit words denoting the position of the bits at the left (L) and right (R) bounds in each segment. This form of information extraction from the character being examined supplies the bounds off any desired black and white section of a character for detailed analysis in special circumstances.

The HTW's No. 1 to No. 7 are developed for each segment of a slice and the left and right segment bounds (horizontal addresses) that make up each word are respectively obtained from $LTR_1$ and $RTR_1$. These SC counts are transferred to these registers on the transitions from 9 → 1 and 1 → 0, respectively, and thereafter to the registers $LTR_2$ and $RTR_2$, from where they are transferred to the ODR 176, via MUX 178, for composing the HTW to be sent out on the E Bus. The transitions may be detected by a flip-flop which is set and reset following 1 and 0-bits, respectively, and whose two outputs respectively enable two gates that also receive the video and timing signals and that respectively drive control lines 155 and 157. When the video is a 1-bit and the flip-flop is reset, the left transition gate is enabled and line 155 is driven; and when a 0-bit with the flip-flop set, line 157 is driven. In addition, a first transition flip-flop is also used to enable the left transition gate and is set at the beginning of each slice analysis and reset after the first 1-bit at the left bound of the first segment.

The segment count N (or M) for HTW No. 0 is established by memory address counter CAC (FIG. 9) in the lowest 3 bits. The base memory address for storage of HTW No. 0 is in the fourth to fourteenth bits, and the lowest 3 bits are all zeroes. HTW No. 1 is stored in that base address plus 1; HTW No. 2 in the base address plus 2, and so on. Thus, the lowest 3 bits contain a segment count which is used for N, and a carry from the third CAC bit indicates a segment count of more than 7, and is used to set M to 1. HTW No. 0 is composed when the segment count is completed after the entire slice has been analyzed, and it is stored at the base address in the third to fourteenth CAC bits.

If horizontal transitions are desired for only a portion of the isolated character, the top and bottom references are reset by appropriate computer commands to the desired bounds via the E Bus prior to issuance of a commant to extract Horizontal Transition Words.

A number of flip-flops are used in the control circuits, in addition to those shown in the drawing; both cross-coupled gates and D-type edge-triggered flip-flops are used. The functions of these control flip-flops include the following: When a word is available in ODR, a flip-flop makes a request to the computer to initiate a cycle-stealing, direct-memory access transfer. A flip-flop prevents an operation complete until the data transfer is accomplished, and another prevents the output data register from being altered before the data transfer. In the SDW operation, a flip-flop is set by a decode of the output to SDW instruction, such as SET BR, which indicates that the following data word is to be decoded as SDW control data. A transition complete flip-flop indicates the end of a segment during the HTW transition process, and permits initialization of a data transfer. A largest yet flip-flop indicates that the segment just counted is the largest encountered to control transfers of SZC to SZR. A start flip-flop enables clearing certain control registers, counters and flip-flops at the beginning of each process, and the 0-control lines in the drawing refer to the signals developed accordingly. A toggle flip-flop indicates that video has been present and is used to detect segment endings. An extract SDW flip-flop is set by the corresponding computer command and indicates the extract SDW mode, and an extract HTW flip-flop is similarly set and indicates the extract horizontal transition mode. A vertical flip-flop, when set, indicates a vertical analysis in progress, and when in the zero state, a horizontal analysis. An end SDW flip-flop indicates that a data word is available from ODR for transfer to the computer memory. An end flip-flop is set when the SDW process is completed to indicate the idle state.

Three timings control the SDW logic. Timing 1 is used to clear counters and to set start coordinates, and is entered when the instruction to initiate the SDW process is decoded and again as each slice is completed. It is used to initialize counters and control flip-flops. For example, the bottom reference must be replaced in the vertical address counter before examining each vertical slice.

Timing 2 is used to detect video, check transfer conditions, encode SDW and count counters (when exiting this timing). During timing 2 the state of the video bit currently selected by the horizontal and vertical address counters is monitored. If it is a black bit, the size counter is incremented. If it is a white bit and the preceding bit was black and the number in the size counter is greater than the number in the size register, the SDW is encoded. During this time the conditions to stop processing the slice and to stop the SDW operation are checked and control flip-flops are set. The position counters are counted at the end of this timing.

Timins 3 is used to initiate data transfer (if the conditions are satisfied), wait until data is accepted and check end conditions. Timing 3 controls transfer of the 16-bit SDW to the output data register, initiates the transfer request to the Variah 620 *f*–100 computer and, when the direct memory access channel is available and the data is transferred, selects the next timing state. If no SDW is available and the end conditions have not been satisfied (if the slice is not complete), timing 2 is re-entered and the next bit is processed. If a word is available, the transfer is initiated and timing 1 is entered to establish the start coordinates for the next slice. If end conditions are detected, the idle state is entered.

Figures 11, 13:
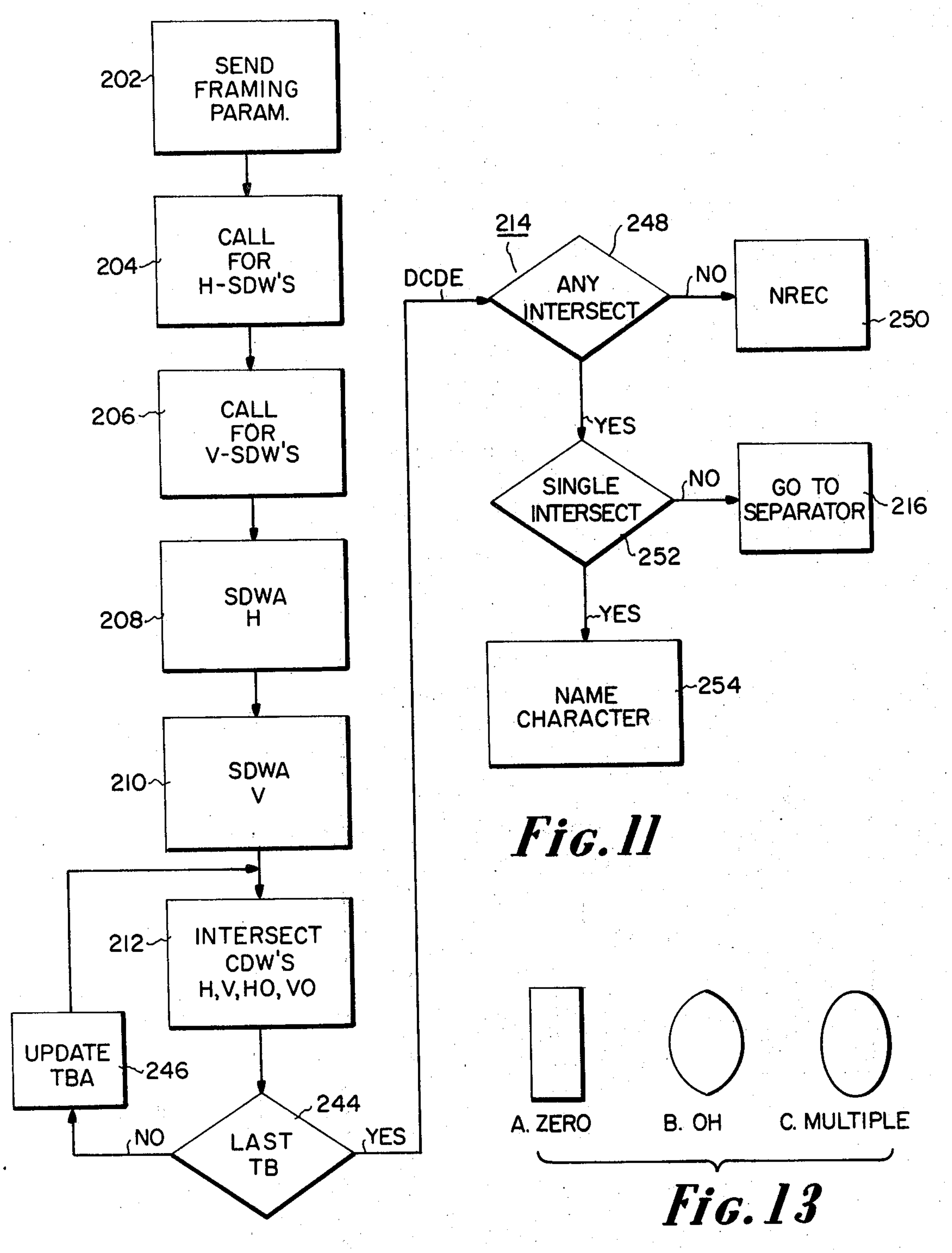
FIG. 11 is a schematic flow diagram of programs.
FIG. 13 is a simplified illustration of character shapes.

The overall programming flow diagram for the software portion of the recognition process is shown in FIG. 11 for the specific system embodying this invention. Control passes to the adaptive analytic recognition routine after the character is framed (i.e., the top, bottom, left edge and right edge of the character are defined). The first portion of an executive routine 202 for the recognition process is to initiate the SDW process by sending to the hardware logic the appropriate reference parameters, e.g., for the BR, TR, LR and RR. The executive routine instructs the hardware logic to generate and transfer to the computer memory the SDW's for each horizontal and vertical slice of the character being analyzed. Upon receipt of these parameters and the SDW instructions for the horizontal SDW's, the hardware logic operates as described above to generate and transfer them to the computer memory. A similar operation for the vertical SDW's thereafter follows. At that time, the information contained in the computer memory is sufficient for the computer to proceed with the slice descriptive word analysis (SDWA) for both the horizontal and the vertical slices. The recognition routines of SDWA condense the information in the SDW's to form sequence description codes which constitute a description of the general shape of the character.

The Recognition Executive Subroutine (EX) directs the flow of control (see the flowchart of FIG. 11) in the recognition process once a character has been framed and its boundary values have been stored away. The first step in EX is to initialize for the generation of the SDW's. This is done by transmitting (step 202, FIG. 11) to the SDW's logic via the E Bus (FIG. 6) the top, bottom, left and right boundary values. Thereafter, EX calls for (step 204) the horizontal SDW's by sending to the SDW hardware logic the horizontal size parameters (i.e., the reference constants that specify the small, medium and large segments); by calculating (in a subroutine G), from the framing values and preset proportions, the horizontal orientation parameters (i.e., the reference constants that specify the bounds for left, right and center); and by sending the latter to the SDW logic. For this transmission, these parameters are encoded with the identifying instructions. EX then sends an extract-SDW command and thereby directs the SDW logic to generate the horizontal SDW's. When this SDW process is complete, the same operations for the vertical SDW's (step 206) are performed.

EX then initializes the system (e.g., by setting the needed pointers) for the SDWA (Slice Description Word Analysis) subroutine before starting the SDWA operation (step 208), which condenses the horizontal SDW's into horizontal sequence and orientation codes. Thereafter, EX directs SDWA to do the same process for the vertical SDW's (step 210). Control then passes, in order, to the intersection 212, decode 214 and separator 216 sections of EX.

The Slice Description Word Analysis (SDWA) is a subroutine which condenses the extensive segment data of the SDW's (horizontal or vertical) into a set of sequence codes and a set of orientation codes. SDWA stores the sequence and orientation codes in separate work tables. For each sequence code that is stored away SDWA also stores the address of the first SDW of that sequence in an additional work table. The addresses are used to compute the duration of each small segment sequence.

The Sequence Codes are based on sustained sequences of slices of the same geometry and use the segment size and number of segments in each slice. Sequence of small single segments or short, medium and long duration, respectively, carry codes 0, 1 and 2; small double segments of these durations carry codes 6, 7 and 8, respectively; small many segments of these durations carry codes 9, 10 and 11. Large segment sequences carry code 3, and sequences of medium segments oriented left (lower for verticals) or right (upper) carry codes 4 and 5. The Orientation Codes for sustained sequences of single small segments are 0, 1, 2 for L-L, L-C, L-R; 3, 4, 5 for C-L, C-C, C-R; and 6, 7, 8 for R-L, R-C, R-R (where L, C, R are left (lower), center and right (upper), respectively.

The major steps in SDWA are as follows:

1. Initialize for first SDW.
2. Extract the slice code CCC from the next SDW.
3. Drop unsustained slice codes, that is a slice code is sustained if it is the code for a large segment, or if the slice code is the same as the slice code in the next SDW.
4. Store the slice code and SDW address in work tables.
5. If the specimen includes a sequence of small segments, then compute the duration of that sequence and convert the slice code to sequence code.
6. If a sequence of single small segments, then compute the orientation of the sequence and store in work table.
7. Repeat steps 2 through 6 until the end of SDW table is reached. These steps are performed for horizontal slices and then for vertical, which also follows steps 1 through 7.

Figure 12A:
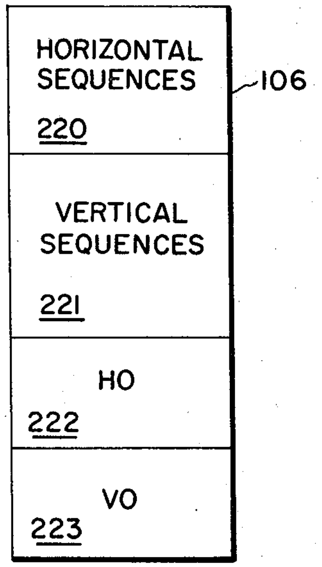
FIGS. 12A–12C are schematic diagrams of stored recognition tables, all used in a specific embodiment of this invention.
Figure 12B:
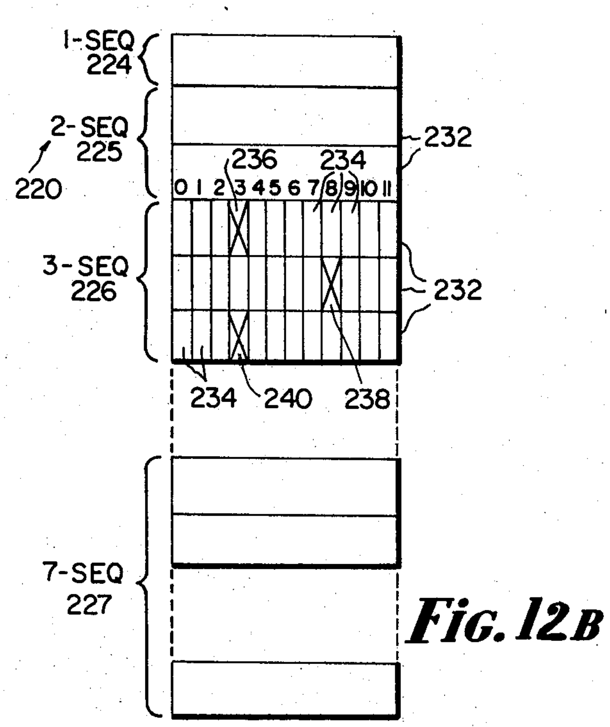

The Intersect 212 and DCDE 214 sections of the recognition process are based on lookup tables in the computer memory that contain character designate informatin in the form of Character Designate Words (CDW). They are expandable from a character set size of 16 (1 recognition table) to a maximum size of 48 characters (3 recognition tables, each having 16 characters). Each recognition table is broken into four major tables, 220–223 (FIG. 12), each of which contains different character designate information. The tables are designated for horizontal sequences H, vertical sequences V, horizontal orientations HO, and vertical orientationss VO. Each sequence table 220, 221 is in turn broken down into seven sub-tables 224–227 that are associated with characters having respectively, 1, 2, 3 . . . 7 sequences. One sub-table 224 (FIG. 12B) stores information for characters having a single sequence; sub-table 225 is for 2-sequence characters, sub-table 226 for 3-sequence characters, and so on, with subtable 227 for 7-sequence characters. Similarly each orientation table 222, 223 is broken down into three sub-tables for up to three orientation codes.

Each sub-table (except the single sequence one, 224) is in turn broken down into from two to seven sub-sub-tables 232, one for each sequence. The sub-sub-tables 232 are of a fixed size which is determined by the number of different sequence or orientation codes that are allowable, and have one memory location or word for each different code. Each such location is called and contains a CDW 234. Sequence sub-sub-tables 232 occupy 12 memory locations (each for a CDW) for the 12 and 9 different allowable sequence and orientation codes in this embodiment, which uses about 1,000 CDW's for a recognition table. Each sub-sub-table is arranged in the order in which the sequence codes occur in a group of sequences. For example, a square zero zero may be described by the horizontal sequence codes of 3, 8, 3 (large segments, double small segments, large segments). Consequently, the horizontal sequence table 220 would contain the character zero in at least the sub-table 226 of 3 sequences (e.g., in CDW's 236, 238, 240, counting from the left or 0 in FIG. 12B.

Figure 12C:
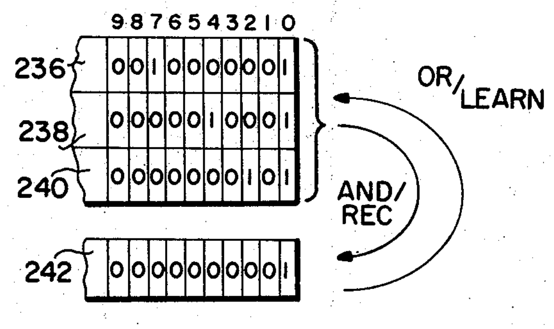

Each CDW of 16 bits specifies that a certain character (or characters) possesses the sequence or orientation feature of the associated code. The bit positions in the CDW correspond to and identify the characters, and when a bit is set, its corresponding character possesses the feature. For example bit No. 2 would correspond to a 2, and bit No. 8 corresponds to an 8. If a 2 and an 8 both possessed the same sequence or orientation feature, the CDW associated with the sequence identifying that feature would have both bit No. 2 and bit No. 8 set, as in this example: 0000000100000100 (counting from right, beginning with bit No. 0). As shown in FIG. 12C, for the square-zero example, noted above, the CDW's 236, 238 and 240 each contain a 1-bit in the No. 0 bit position, as well as in other positions for characters that have the same feature.

The Intersect Routine (INIT) 212 of EX uses the sequence and orientation codes to look up in memory recognition tables the stored CDW's that identify characters that have been found to have sequence codes that match those of the current character to be recognized and thereby complete the latter's identification. The identification is accomplished by AND-ing the appropriate table entries together. The appropriate table entries are found by first determining which sub-table is to be used, based on the number of sequences. In that table, for each code following in the order of the codes, the corresponding sub-sub-table 222 is used, and then the value of the sequence code itself is used to compute which CDW in the sub-sub-table is the appropriate one. The Intersect Routine intersects the CDW's for the horizontal sequence codes first. It keeps a cumulative intersection result as it next intersects the CDW's for the vertical sequence codes and then those for the orientation codes HO and VO. For some characters, there are no orientation codes, whereupon the orientation intersection process is bypassed.

For each recognition table, a separate intersection with the CDW's produces a Character Designate Intersection Code Word (CDIW) 242. Therefore, the entire intersection process produces 1, 2, or 3 CDIW's, one for each recognition table. The CDIW's of the three tables are stored in the memory locations set aside for this purpose, and designated in the program as W1, W2 and W3, respectively. Where there are more than one such table used for the character font, a test 244 determines whether the CDW's of each table have been intersected to develop the associated CDIW, and if not, the step 246 updates the pointers for the next table and for the memory locations for the CDIW's and the Intersect step 212 is repeated for that next table.

In the example illustrated in FIG. 12C for the combination of sequence codes 3, 8, 3 (no orientation codes), INIT locates the 3-sequence sub-table 226, extracts successively the CDW's 236, 238 and 240 and intersects them as it does. This forms CDIW 242 which identifies the numeric character zero from the No. 0 bit position containing the 1-bit.

The major steps in I are as follows:

1. Initialize for the intersection of the codes with a recognition table.
2. Intersect for the horizontal sequence codes.
3. Intersect for the vertical sequence codes.
4. Intersect for the horizontal orientation codes, if any.
5. Intersect for the vertical orientation codes, if any.
6. Repeat steps 1 through 5 for each recognition table (where numerics only are to be recognized, one recognition table is sufficient; alphabetics require additional such tables).

The steps involved in each of the intersection processes in 2–5 above are as follows:

a. Determine which of the sub-tables 224–227 is to be used from the number of sequence (or orientation) codes.

b. For each sequence code use a different sub-sub-table 232.

c. Use the value of each sequence code to select from the sub-sub-table the corresponding CDW and intersect it with the previously selected CDW's.

d. Repeat b and c until all sequence codes have been used.

The Decode Routine (DCDE 214 looks at the three CDIW's 242 produced by the intersections for three tables and determines (step 248) the type of intersection that has resulted from combining the sequence and orientation codes with the recognition tables. If the result of the intersection is null, i.e., no character in the tables has exhibited the characteristics exhibited by the character currently being recognized, control is passed to a non-recognition routine (NREC) 250. NREC places a symbol such as slash( / ) to represent an undefined character in a buffer and prepare for the operator to enter the character from the keyboard. If the operator makes such an entry, it is inserted in the buffer in place of the slash. NREC provides one of the exits from EX.

If the result of the intersection is non-null, i.e., at least one character in the tables has exhibited the characteristics exhibited by the character currently being recognized, the character code for the first such character is computed, where special codes, such as ASC II, are employed. Once the character code has been computed, it can be determined, 252, if the intersection is singular or multiple. For singular intersection, the character code is stored in the input buffer which, in effect, names 254 the character, and EX is exited.

In the example illustrated in FIG. 12C for the combination of sequence codes 3, 8, 3 (for which there are no orientation codes), INIT locates the 3-sequence table 226. It then extracts successively the first CDW 236 and intersects it, the second CDW 238 and intersects it, and similarly the third CDW 240. This process forms the CDIW 242, and DCDE identifies the numeric character zero from the only bit position containing a 1-bit, namely, that for zero.

For multiple recognition, a separator routine 216 is used to determine which of the possible characters really is the character currently being recognized. To facilitate the coding of the separators, the code for the first possible character is used to compute the address of the separator routine.

For example, separator routines have been written for a 0-6 multiple, a 0-9 multiple and a 3-9 multiple. When a character has been recognized with a nonsingular result, the first character of the multiple, say 0 in the 0-6 example, is used to look up an address in a table of separator addresses. The value in the table will be the address of the 0-6 separator routine.

It is up to the separator routine to determine which multiple can be processed by separator routines. A separator jump-address table is used to supply the address of a routine for 0-multiples, which determines which multiple occurred; i.e., a 0-6 multiple or a 0-9 multiple for the current character. The separator routine then transfers control to the appropriate routine for discriminating between the two characters of the multiple, say, between a 0 and a 6.

These separator routines are individually designed for a particular font, and generally it is only machine experience with the font that identifies the ambiguous multiples. In addition, it has been found, unambiguous multiples sometimes occur. That is, for example, a printed 8 may have the same code as a 3 as a result of codes of many 3's and many 8's having been learned. However, experience may show that the 3-8 multiple for that particular code and font occurs only for 8's; therefore, the 8 is always named for that multiple, and a separator routine is not needed.

Experience has shown that ambiguous multiples occur in a very small percentage of cases. However, there is a need for very high reliability in machine recognition, and the separator routines have been used successfully to achieve such reliability. These routines utilize horizontal transition code words (HTW's) generated by the SDW logic. In summary, a typical separator routine determines which characters are multiples (the first is already known) and pass control to a routine which separates the multiples or stores a character for an unambiguous multiple. For multiples that occur very rarely, a separator routine may not be available, so control passes to the non-recognition routine (NREC). Initializing for the separator routines is done by transmitting boundary parameters to SDW logic, initializing counters and pointers, and by telling the SDW logic to generate the HTW's. Upon storage of the latter, analysis of the HTW's may be performed by integrating an area or measuring a critical distance or calculating an average distance in or around part of the character image. The operations involve the counting of bits or subtracting between the transitions or boundaries of segments. The area or distance is then compared against known values for the two possible characters to identify the specimen.

An example of a separator routine is one that discriminates between the numeric zero and the alphabetic O. An ideal zero (FIG. 13A) in a particular font is rectangular with straight vertical sides. An ideal alphabetic O is rounded not square, with much shorter top and bottom row segments and similar differences in the left and right column segments. These differences in the ideal characters produce different codes. However, due to degraded characters, such as that of FIG. 13C, multiples result that call for this separator routine.

The difference in the structure between a zero and an Oh provides the key to the separator. The Oh has a relatively large area between the outside of the character image and the inside of an imaginary rectangle around the character, while the zero has avery small area outside of its character image. The zero-oh separator integrates the area between the left edge of the characer image and the imaginary rectangular frame on the left. The limits of the integration are the top and bottom references of the character.

With a character to be recognized of the image shown in FIG. 13C, the recognition process initially generates the SDW's and then analyzes them by SDWA, as described above. The sequence and orientation codes are intersected with the CDW tables, and the result is decoded as non-singular (i.e., a multiple). Since the first character is a zero, control passes to the first section of the zero separators, which determines that it is a zero-oh multiple, and in turn passes control to the zero-oh separator, as opposed to a zero-eight separator for a zero-eight multiple.

The second section of the separator initializes any necessary pointers and counters, as well as the SDW logic, by transmitting the boundary parameters to it and directing it to generate the HTW's that are used in the saparator analysis.

The final section of the separator performs the integration using the HTW data by summing the area for each slice between its left edge and the left framing boundary (that is, by summing the left transition addresses of the first segments of successive slices). It then tests the summed area against two known values (one an upper limit for zeroes, and the other a lower limit for oh's but larger than the zero upper limit) to determine if it is identifiable and to see which character it is. If the character can be identified, then its code is stored in the buffer and EX will be exited, but if the summed area lies between the two limits, non-recognition is indicated.

A multiple of zero-eight arises due to such degradation of the center crossbar in the 8 that it is broken and is coded as two small segments, similar to the zero. The separator analysis examines the center region of slices in the character and obtains a measure of the smallest gap between the two sides by subtracting the right edge of the first segment from the left edge of the second for successive slices (supplied by the HTW's). If the measure of that gap is greater than a first value, a zero is indicated; if smaller than a second, lower value, an eight is indicated; and if between the two values, the character cannot be named reliably, and non-recognition is indicated.

A multiple of three-nine arises with character degradation due to a break in the left edge of the upper closed box of the nine just above the center horizontal stroke, and in the three, due to a downward hook at the left end of the upper horizontal stroke. The separator measures the area between the left edge of the first segment of successive slices (supplied by the HTW's) in the upper half of the character in the region just above the center horizontal stroke. The area is compared against a single value, and is smaller for the nine.

The building of the recognition tables 220–223 is performed by the LEARN process. Large numbers of documents are used that contain the characters in the font to be "learned" and in the rnge of ideal and degraded forms in which unknown characters to be recognized under actual operating conditions. These documents are run through the machine with the LEARN process until the recognition tables contain the data needed for recognizing the font of characters in the range of forms in which they actually occur.

LEARN is run with a large amount of operator-machine interaction. The LEARN program resides in the computer memory with a system program and with the recognition program. The system program feeds the documents and captures (i.e., extracts the digital video of) the characters on them. The recognition program generates the sequence and orientation codes for each character as described above.

LEARN is entered from the recognition program after the generated codes have been intersected with the recognition tables but prior to decoding of the Character Designate Intersection Words (CDIW's). LEARN then takes over and decodes the CDIW's and checks to see if the character has already been "learned," that is, if the character is recognized and named). If it has, then LEARN is exited. If it has not, then LEARN waits for the operator to make a decision on whether to learn the character or not.

When LEARN is entered from the recognition process, it checks the CDIW's to see if the particular character set up in a buffer has been learned for (i.e., is recognized by) the codes generated by the recognition process. If the character has not been learned for those codes, then the operator is asked by the LEARN program what to do next.

The operator can decide to learn the character, decide not to learn it, or can request additional information about the character before he makes a decision. The additional information thatcan be obtained takes several forms: recognition codes, an image of the character, or the SDW's for the character. The various options available to the operator in this specific embodiment are listed below.

If the operator decides to learn the character, then the bit corresponding to the character is OR'ed into the recognition tables corresponding to the codes for the specimen character. This OR process is an inverted form of the AND process used in the intersection to establish the CDIW 242 (FIG. 12C). By way of example, assume that the CDW words 236, 238, 240 did not contain a 1-bit in their bit No. 0 positions, or that at least one of those CDW's did not. Consequently, the CDIW 242 produced by intersection would contain all 0-bits, and there would be a non-recognition. To initiate learning of this character, the operator then identifies the character as a zero by a keyboard entry, a 1-bit is inserted in the bit No. 0 position of word 242 (or a similar memory word) and that word is combined on a union or logical-OR basis with the CDW's 236, 238 and 240. The only change resulting in those CDW's is that any 0-bit existing in the bit No. 0 positions is replaced by a 1-bit. From then on, the 3-sequence CDW's for the sequence code of 3-8-3 intersect recognizes a zero character.

Bits corresponding to characters are determined by the ASCII code for the character. The smallest ASCII code in the tables is 260. The largest is 337. This allows for a 48 character set. ASCII 260 corresponds to bit 0. ASCII 277 corresponds to bit 15 and ASCII 337 corresponds to bit 47. If a character is to be leanred not as its own ASCII code but for some second character, then the ASCII code for the second character is the ASC II code that the buffer has to be initialized with.

In the Process-LEARN phase of LEARN, if the sequence and orientation codes generated by recognition have been learned for any character, not just the one in the buffer, then the character is considered learned and LEARN is exited. If a character has not been learned, then the operator uses the P option (noted below) to name the specimen character and then follows with additional options. The major difference between Process-Learn and LEARN is that LEARN always permits use of the Y option (noted below) to enable the operator to name the specimen, even if it was recognized and another character named. Thus, if the specific character set up in the buffer is not recognized, the operator is still able to use the other options. This mode permits the learning of multiples, while Process-LEARN does not. The learning of multiples, together with the use of separator routines, reduces the chances of subsitutions of the wrong character during actual operation.

The LEARN options in one embodiment using a teletypewriter display and keyboard are as follows:

B. For visual analysis, print the SDW breakdown for the current character (i.e., the SDW and its components) in separate fields.

I. Print the image of the character from scratch pad memory 42 (such as is shown in FIG. 5).

N. Do not learn character in question.

P. Process-learn character in question. Program types PROC LRN= the user then types the character that corresponds to the ASC II code that is to be learned for the current character.

R. Start the recognition process over for the current character.

T. Print sequence and orientation codes for the current character.

Y. Learn the current character.

Z. Ignore the entire document, exit to the system control program to feed another document.

The flow of the LEARN process, following the code geneation in the Recognition process, is via the alternative paths of LEARN or Process-LEARN. In either of these cases, in the absence of recognition, a display of the character data is provided and the operator is enabled by choice of option to complete the learning, where appropriate.

Other modifications and variations of this invention will be apparent from the above description. It will be seen from the above description that a new and improved character recognition system has been provided which is based upon machine processing of an analytic and systematic type. The machine system is adaptive in its nature so that type fonts and alphabets can be "learned," which enables the development of a body of reference data against which unknown characters are compared. In this way, the system is applicable to a variety of different type fonts and alphabets.

Following hereafter are computer programs that have been used in a specific embodiment of the automatic character recognition system of this invention. These programs include the Executive, Recognition, Separator and LEARN Routines discussed above. The programs are in an assembler language for the Varian **620*f*** described in the aforementioned handbook.

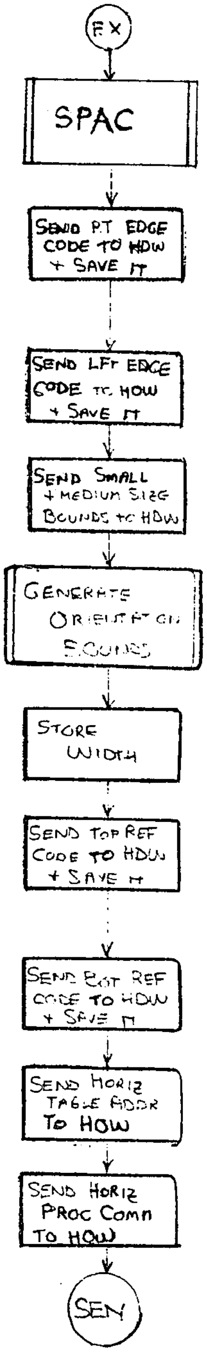

```
EX   ENTR

       JMPM* SPAC    Go detect spaces

     LDB  RE         Get right edge code
     DECR 021        Save it for orientation rtn.

     ORAI 041400     Mask and send code
     OAR 057           to recognition logic

     LDA LE          Get left edge code
     STA LL          Save it for orientation rtn
     ORAI 041000     Mask and send code
     OAR 057           to recognition logic
     OME 057,SH      Send small size bound to rec. logic
     OME 057,MH      Send medium size bound to rec. logic

     JMPM G          Go generate orientation parameters

     STX W           Store width (computed in G)

     LDB TREF        Get top reference code
     DECR 021        Save it for orientation rtn

     ORAI 040400     Mask and send code
     OAR 057           to recognition logic

     LDA BREF        Get bottom reference code
     STA LL          Save it for orientation rtn
     ORAI 040000     Mask and send code
     OAR               to recognition logic

     OME 057,HTAD Send horizontal table address to logic

     OME 057,HCP     Send horizontal process command to logic
```

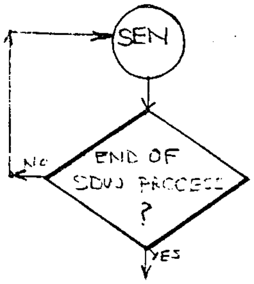

```
SEN SEN 072, DNE  Wait for end of horiz. SDW process
    NDP
    JMP SEN
```

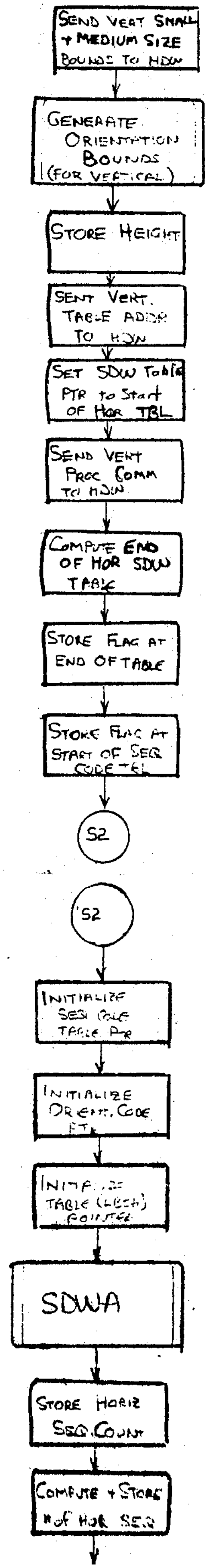

```
DNE OME 057,SV      Send vert. small size bound to logic
    OME 057, MV     Send vert. medium size bound to logic

    JMPM G          Go generate vert. orient. bounds

    STX  H          Save height of character

    OME  057,VTAD   Send vertical table addr to logic

    LDX HTSA        Set SDE table ptr to start of horiz
                      table

    OME  057,VPC    Send vertical process command to
                      recognition logic

    INCR 041        Compute end of SDW table
    ADD  H
    TAB             Temporarily store it in BR
    MERG 0301       Set flag(-1) in AR
    STA 0,2         Store -1 at end of SDW table

    STA 0100        Store -1 at start of sequence code ta
                    table

    LDBI 0100       Set sequence code table pointer to start
                      of horizontal seq. code tbl.

    LDAI OCTH       Intialize orientation code table pointer
    STA  OCPT

    LDAI LBSH       Intialize duration parameter table
    STA  P            pointer for horizontal

      JMPM SDWA     Perform SDWA for horiz slices
JSWDA BES  0        The jump location may change for
                      handprint in a dualfont mode

    LDA   SC        Store horizontal sequence ptr
    STA   HSC

    SUBI 0100       Compute and store number of horizonta
    STA  NHS          sequences

    LDA  OCPT       Store horizontal orientation ptr
    STA  HOCP
```

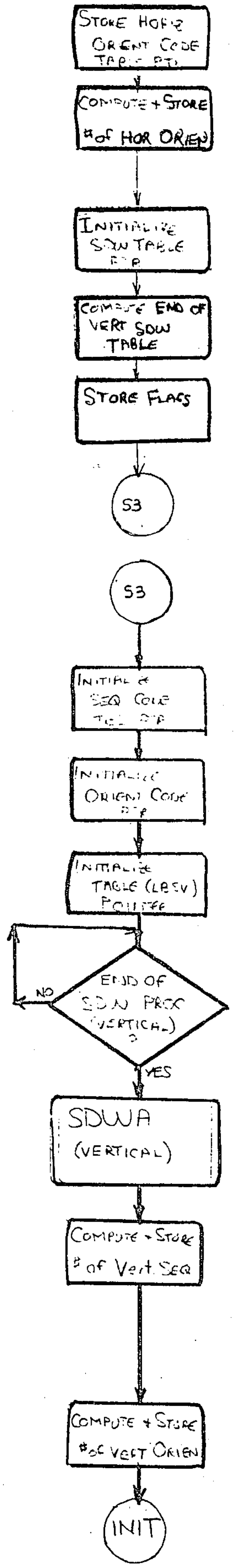

```
          SUBI OCTH     Compute and store number of horizontal
          STA  NHOS       orientations

* INITIALIZE FOR COLUMN (SDW) ANALYSIS.

          LDA  VTSA
          DECR 014      Set SDW tbl pointer to start vert SDW
                          table

          ADD  W        Compute end of SDW table
          TAB           Temporarily store it in BR

          MERG 0301     Set AR = Flag(-1)
          STA  0,2      Set flag at end of vert SDW table
          STA  0130     Set flag at start of vert seq code table

          LDB  c130     Set sequence code table pointer to start
                          of vertical seq code table

          LDAI OCTV     Initialize orientation code table pointer
          STA  OCPT

          LDA  LBSV     Initialize duration parameter table ptr
          STA  P          for vertical

          SEN  072,VDNE Wait for end of vertical SDW process
          NOP
          JMP  *-3

VDNE      JMPM SDWA     Perform SDWA for vertical slices

          LDA  SC       Compute and store number of vertical
          SUBI 0130       sequences
          STA  NVS

          LDA  OCPT     Compute and store number of vertical orie
          SUBI OCTV       orientations
          STA  NVOS
```

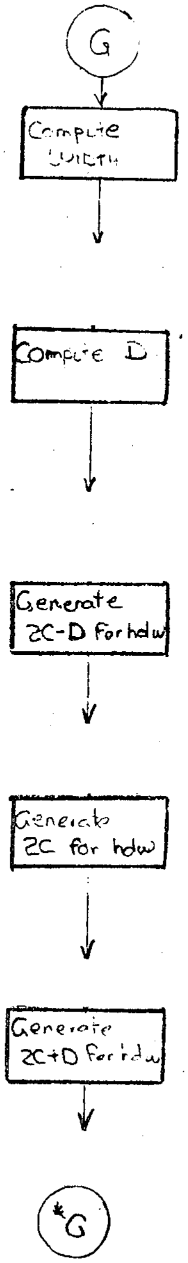

```
G ENTR          Generate orientation bounds

  TBA           Compute Width(Height) =RE-LE
  SUB   LL
  TAX           Store Width(Height)


  ADD   C5      Set D=(W+5)/4
  ASRA  2
  STA   D       D is used to determine rt or lpt or center


  TBA           C refers to the center of the character
  ADD   LL      2C =RE+LE
  SUB   D       Compute 2C-D
  ADDI  020000  Mask in HDW code
  OAR   057     Send to hardware


  ADD   D       Compute 2C
  ADD   C400    Mask in hdw code
  OAR   057     Send to hardware


  ADD   D       Compute 2C+D
  ADD  C400     Mask in hdw code
  OAR   057     Send to hardware


 JMP*G          Exit from G routine


                The three orientation bounds are sent to
                  hardware with codes
                    020000, 020400, 021000

                Entrance register values

                  BR Right (or top) edge

                Exit register values

                  XR Width(height) of character
```

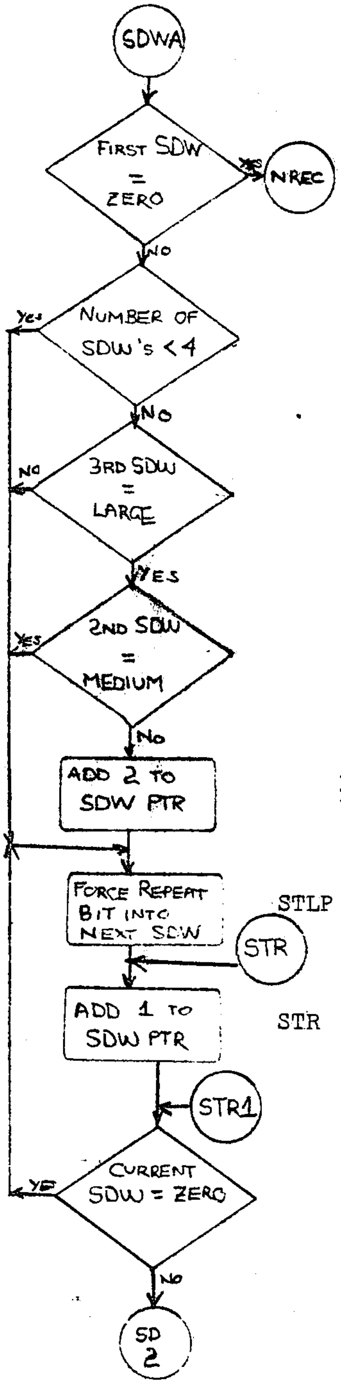

```
SDWA ENTR
     LDA 1,1        If first SDW is Zero then
     JAZ NREC       there is no character. Treat
                    as a NON-REC.

     LDA W          If less than 4 slices (SDW's)
     SUB C4         then skip truncation tests.
     JAN STLP

     LDA 3,1        If third slice is large then
     JAP STLP       continue truncation test
                    otherwise process all SDW's.

     LDA 2,1        If second slice is medium then
     BT  14,STLP    process all SDW's.
                    If second slice is large then
                    ignore its duration and truncate
                    If second slice is small then
                    treat it as a smudge and trun-
                    cate.

     IXR            XR now points to 2nd SDW
     IXR            First 2 SDW's will be ignored
                    This ends processing of top
                    truncation

STLP LDA 1,1        Force repeat bit in next SDW to
     ORA C 1        1. ie. Cause that SDW to be the
     STA 1,1        first one in a sequence

STR  IXR            Increment SDW table pointer

     LDA 0,1        Load next slice
     JAZ STLP       If the slice is zero then
                    ignore it.
```

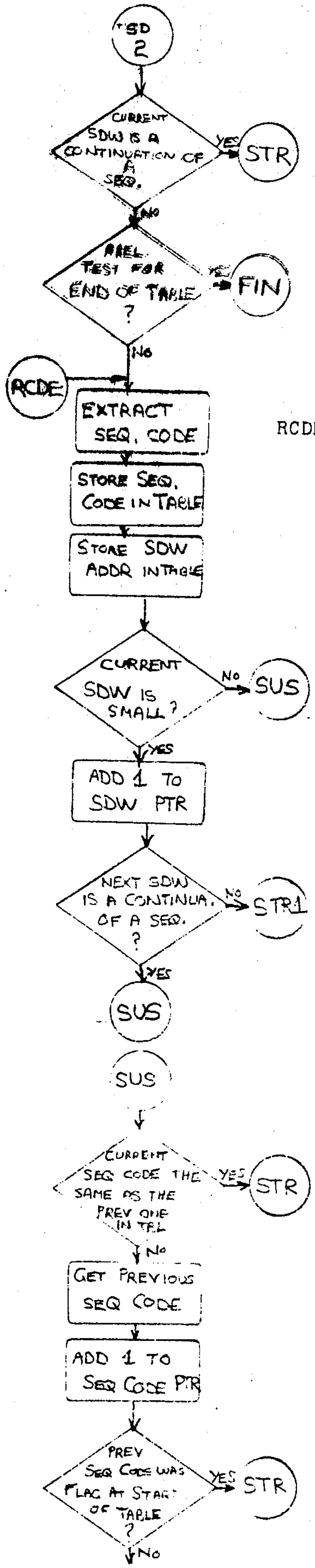

```
       BT   040,STR      If repeat bit (Bit 0 of SDW) is
                         zero then stop processing this
                         slice

       BT   011,FIN      This is a preliminary test for the
                         end of the SDW table.
                         If the high order size bit is off
                         (0) then continue processing
                         otherwise go see if the end of the
                         table flag was read.

RCDE   LSRA 1            Extract sequence code from SDW
       ANA  C7

       STA  1,2          Store sequence code in table

       STX  015,2        Store SDW ADDR in table.(i.e. the
                         start address of a new seq. is
                         stored.

                         Now test for a sustained sequence.
                         Large & Medium segments are always
                         sustained.
       LDA  0,1          If largest segment in current SDW is
       BT   017,SUS      large or medium, then go process as
       BT   016,SUS      a sustained sequence

       IXR               Increment SDW table pointer

       LDA  0,1
       BT   0,STR + 2    If repeat bit in next SDW is a 1
                         (new seq.) then ignore current
                         SDW as being unsustained.

                         New Sequence Sustained At This Point

SUS    LDA  1,2          Test new seq. code vs. last seq. code
       SUB  0,2          If they are the same then ignore new
       JAZ  STR          one & do not increment BR.

       LDA  0,2          Get previous sequence code

       IBR               Increment sequence code tbl Pointer

       IAR
       JAZ  STR          If previous seq. code was the flag (-)
                         at the start of the table then jump
                         back to get next SDW
```

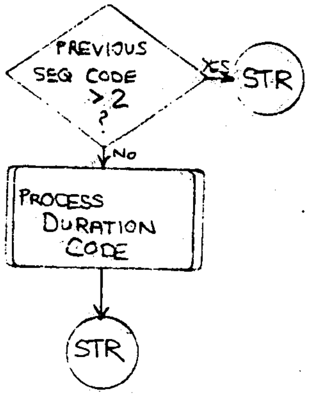

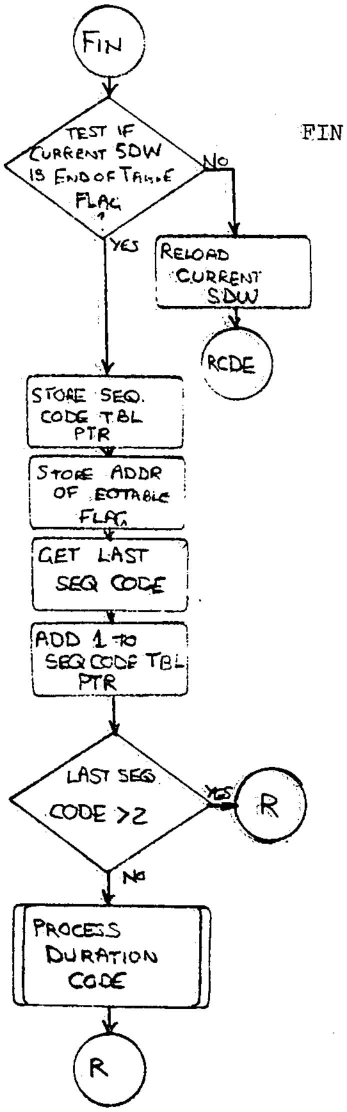

```
        SUB  C4       If previous seq. code >2 then jump
                      back to get next SDW.

        JANM PDC      Otherwise
                      Process duration of code

        JMP  STR      Jump back to get next SDW

FIN     IAR           If current SDW = -1 (end of table
        JAZ  FIN2      flag) then there are no more SDW's
                       for this character, go finish up
                       SDWA. Otherwise there was a very
                       large segment.

        LDA  0,1      Reload Current SDW

        JMP  RCDE     Go continue processing SDW

        STB  SC       Store Seq. code table pointer

        STX  015,2    Store addr of end of table flag at
                      end of seq. code addresses.

        LDA  0,2      Get last sequence code

        IBR           Increment sequence code table
                      pointer

        SUB  C3       If last seq. code > 2 then go to
                      TRNK otherwise

        JANM PDC      Process duration code of last
                      sequence
```

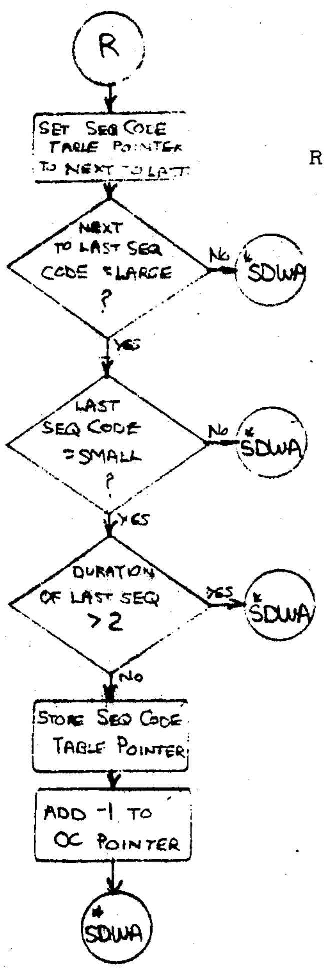

```
R       DBR          Set seq. code table pointer to point
        DBR          to next to last sequence code in the
                     table.

        LDA 0,2      If next to last seq.not large then
        SUB C3       exit else attempt truncation for
        JANZ* SDWA   top of character.

        LDA 1,2      If last seq. code is not short small
        JANZ* SDWA    then do not truncate & exit from
                      SDWA RTN.

        TXA          If duration of last seq.(short small)
        SUB 015,2     more than 2 then do not truncate &
        SUB C3        exit from SDWA RTN
        JAP*SDWA
                      Otherwise truncate last seq. code
                      This is done by changing stored end
                      of table pointer
        STB SC       Store end of seq. code table pointer

        LDA OCPT     Decrement OCPT
        DAR
        STA OCPT

        JMP*SDWA     Exit from SDWA routine
```

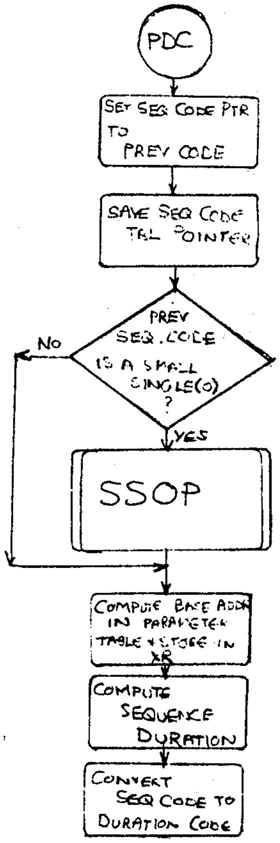

```
PDC     ENTR         Process Duration code

        DBR          Set seq. code table ptr to point to
                     prev entry in table

        STB TP       Temporarily save seq. code table ptr

        LDA 0,2
        JAZM SSOP    If previous seq. code = zero (Small
                      single) then perform special routine
                      to handle orientation

        ADD P        Add base addr of parameter table to
        TAX           previous seq. code & store result in
                      X index register.
        LDA 015,2    Load addr of 1st SDW for current seq.
                     code.
        SUB 014,2    Subtract addr of 1st SDW for previous
                     seq. code.
                     The 2 above steps compute the duration
                     of the previous sequence
```

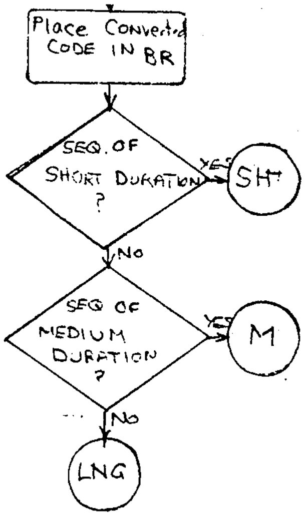

| | |
|---|---|
| LDB 6,1 | Convert short segment codes (0,1,2) to applicable seq. code (0,6,11) and place result in BR |
| SUB 0,1<br>JAN SHT | If previous seq. of short duration go process as such. |
| SUB 3,1<br>JAN M | If previous seq. of medium duration go process as such incr. converted code once)<br>If previous seq of long duration then incr. converted code twice |

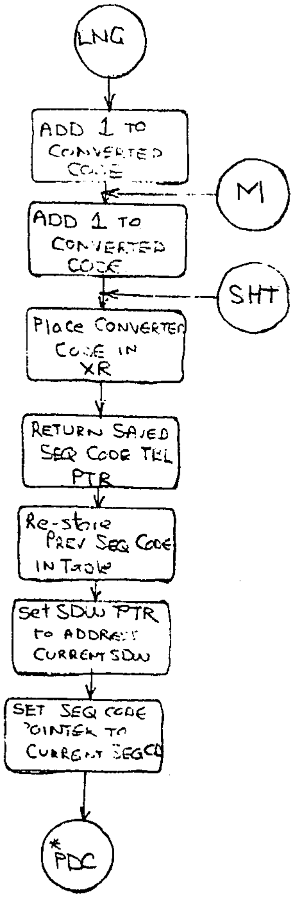

| | |
|---|---|
| LNG IBR | Convert seq. code to long (including next instruction) |
| M IBR | Convert seq. code to medium |
| SHT TBX | Save converted prev seq. code |
| LDB TP | Return seq. code table pointer to BR |
| STX 0,2 | Re-store Prev. Seq. Code |
| LDX 015,2 | Set SDW table pointer to point to last SDW processed (current SDW) |
| IBR | Set seq. code table pointer to point to current seq. code |
| JMP* PDC | Exit from PDC routine |

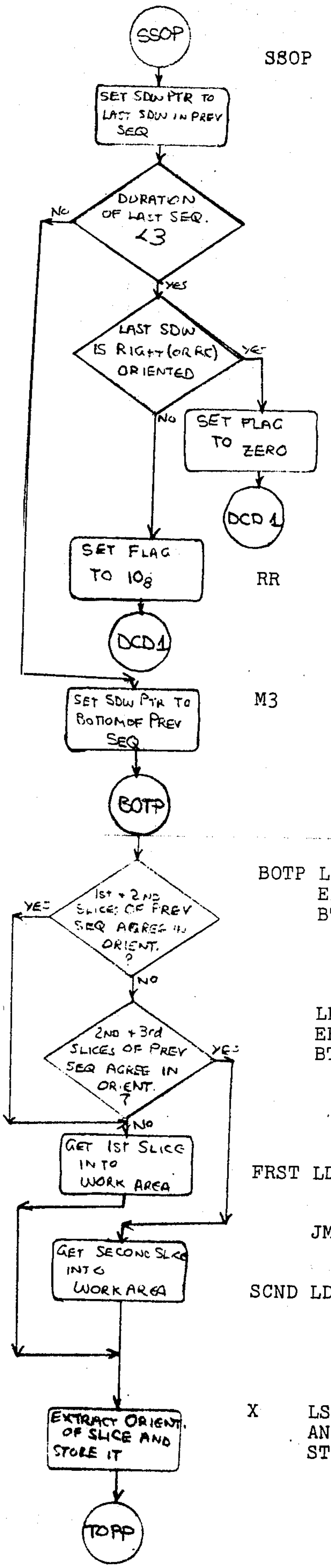

Small Segment Orientation Process

```
SSOP  ENTR

      LDX 015,2     Set SDW table ptr to point to last
      DXR           SDW of previous sequence

      LDA 015,2     If the duration of the last seq. is
      SUB 014,2     3 or more then go process it as a
      SUB C3        long one Otherwise use last SDW in
      JAP M3        Prev Seq

      LDA 0,1       Slice and assign orientation on a
      BT  11,RR     left or right basis only.
                    If last SDW is right or right center
                     then process as such
      TZA           Otherwise set flag (In AR) to zero

      JMP DCD+6     And go store it away

RR    LDA C8        Set flag (In AR) to 10(8)

      JMP DCD+6     And go store it away

M3    LDX 014,2     The previous seq. is of duration of
                    at least 3. Determine orientation of
                    bottom of sequence first. Set SDW
                    table ptr to point to start of
                    prev seq.

BOTP LDA  0,1       If first & second slices agree in
     ERA  1,1       orientation (right or left) then
     BT   43,FRST    go use first slice. This test is
                     done by using an exclusive.
                     Or and testing high order orienta-
                     tion bit for zero (the same)

     LDA  1,1       If second & 3rd slices agree in
     ERA  2,1        orientation then go use second
     BT   43,SCND    slice. Otherwise first & 3rd
                     must agree so use first.

FRST LDA  0,1       Load first slice into AR

     JMP  X         Go process slice orientation

SCND LDA  1,1       Load second slice into AR
                    (Go process slice orientation)

X    LSRA 10        Extract orientation code of bottom
     ANA  C3        of seq. (From slice in AR) and
     STA  TR        store it temporarily
```

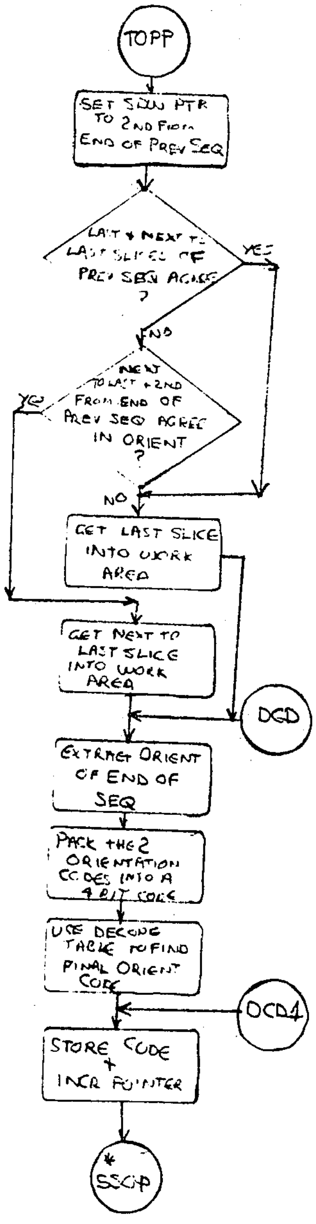

```
TOPP LDX   015,2        Process orientation of end (Top) of
                        Seq.
     DXR                Set SDW table pointer to point at 2nd
     LDA   0,1          from end of prev. seq.
     DXR                (Add -3 to current SDW PTR)
     BT    0,TOPP+2
     LDA   2,1          If last & next to last (NTL) slices
     ERA   1,1          agree in orientation then use last
     BT    43,FST       slice.

     LDA   1,1          If NTL & Second from last slices agree
     ERA   0,1          in orientation then use NTL slice
     BT    43,SND       otherwise use last slice

FST  LDA   2,1          Use last slice, load it into AR

     JMP   DCD          Go process slice orientation

SND  LDA   1,1          Use NTL slice, load it into AR

DCD  ANA   MSK          Extract the orientation code of top
     LSRA  8            of seq (from slice in AR)

     ORA   TR           Pack top & bottom codes into 1 four
                        bit code

     TAX                Use decode table to find final orient.
     LDAE  LTL,1        code of seq.

     STA*  OCPT         Store orientation code
     INR   OCPT         Increment PTR
     TZA                Clear AR
     JMP*  SSOP         Exit from SSOP RTN.
```

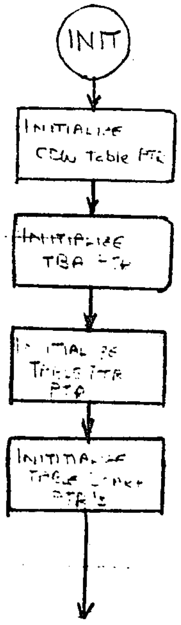

```
     LDAI  W1           Get address of first CDW and store in
     STA   W0             CDW table pointer

     LDBI  TBA1         Get address of pointer to first set of
                          tables
     STB   TBA          Store it in TBA

     LDB   0,2          Initialize BR to point to pointers for the
                          first set of tables

I    LDA   0,2          Place start address of the 4 intersection
     STA   RDWI+1         tables into appropiate location in the
     LDA   1,2            four intersection sections
     STA   CDWI+1
     LDA   2,2
     STA   HORI+1
     LDA   3,2
     STA   VORI+1
```

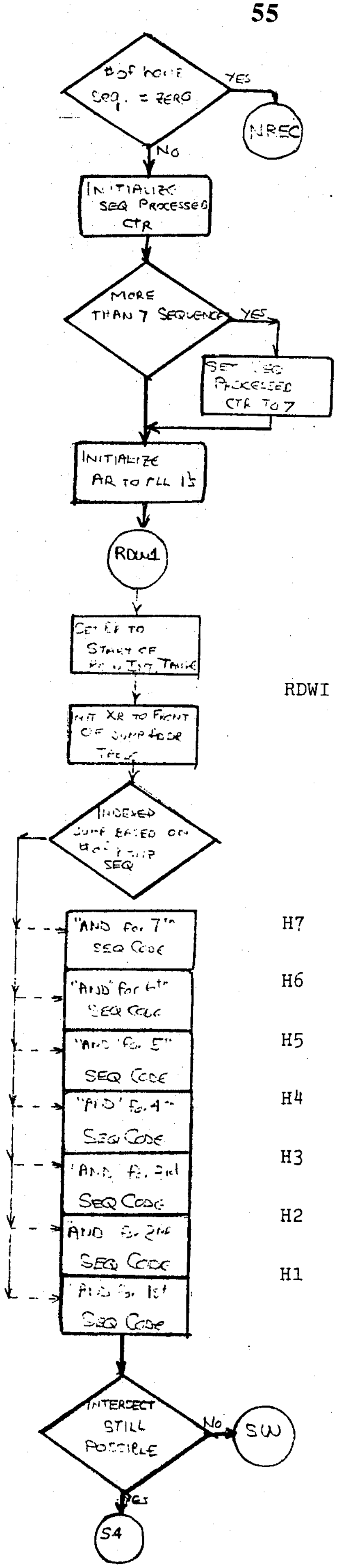

```
          LDA  NHS       If # of horizontal sequences = zero then
          JAZ  NREC        treat character as non-rec

          TAX            Initialize sequences processed counter to
                           the number of horizontal seq.

          SUB  CB        If NHS > 7 then set seq processed ctr to 7
          XAP  LDX7

          MERG 0301      Initialize AR to all 1's (-1)
                           ie. all characters are possible

RDWI      LDBE 0,1       Set BR to point to starting address of
                           row intersection table

          LDXE JAH-1,1   Set XR to front jump address table

          IJMP 0,1       Jump to process seq codes- based on
                           the # of codes

H7        LDX  0107      Get 7th sequence code
          MERG 064       Sum XR&BR by ORing into XR
          ANA  0110,1    Get code intersection for 7th seq.
H6        LDX  0106
          MERG 064
          ANA  074,1
H5        LDX  0105
          MERG 064
          ANA  060,1
H4        LDX  0104
          MERG 064
          ANA  044,1
H3        LDX  0103
          MERG 064
          ANA  103,1
H2        LDX  0102
          MERG 064
          ANA  014,1
H1        LDX  0101      Get 1st sequence code
          MERG 064       Sum XR&BR by ORing into XR
          ANA  0,1       Get code intersection for 1st seq.

          JAZ  SW        If intersect still possible(AR≠0) then
                           continue else go process as not this CDW
```

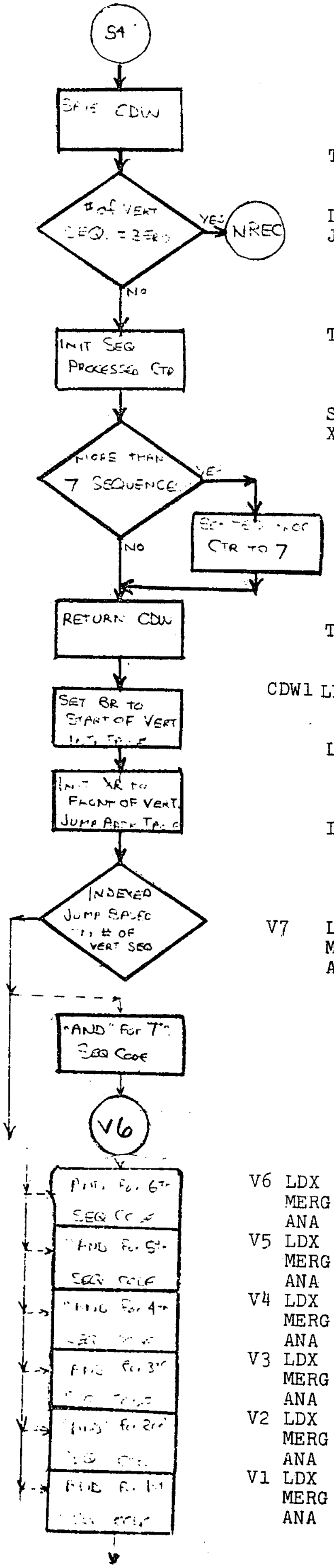

```
           TAB              Temporarily save current CDW

           LDA  NVS         If # of vertical sequences = zero then
           JAZ  NREC          treat character as non-rec

           TAX              Initialize sequences processed counter
                              to the number of vertical sequences

           SUB  C8          If NVS >7 then set seq processed ctr to 7
           XAP  LDX7

           TBA              Return current CDW

     CDW1  LDBE 0,1         Begin vertical sequence code intersection
                            Set BR to point to starting address of
                              column intersection table
           LDXE JAV-1,1     Set XR to front of(vertical) jump
                              address table

           IJMP 0,1         Jump to process vertical seq codes-based
                              on the number of codes

     V7    LDX  0137        Get 7th vertical seq code
           MERG 064         Sum XR&BR by ORing into XR
           ANA  0110,1      Get code intersection for 7th seq.

V6 LDX  0136
   MERG 064
   ANA  074,1
V5 LDX  0135
   MERG 064
   ANA  060,1
V4 LDX  0134
   MERG 064
   ANA  094,1
V3 LDX  0133
   MERG 064
   ANA  030,1
V2 LDX  0132
   MERG 064
   ANA  014,1
V1 LDX  0131      Get 1st vert seq code
   MERG 064       Sum XR&BR by ORing into XR
   ANA  0,1       Get code intersection for 1st seq
```

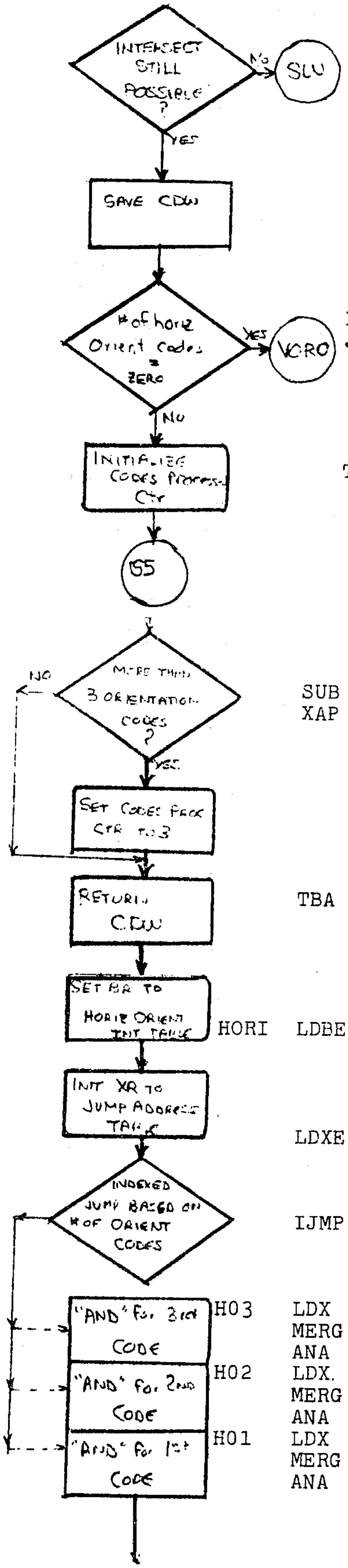

```
      JAZ   SW          If intersection still possible(AR≠0) then
                          continue else go process as not this CDW

      TAB               Temporarily save current CDW

      LDA   NHOS        If # of horizontal orientation codes = zero
      JAZ   VORO          then go process vert. orientation codes

      TAX               Initialize orientations processed counter
                          to the number of horizontal orientation

      SUB   .C3         If # of horizontal orientation codes > 3
      XAP   LDX3          then set codes processed counter to 3

      TBA               Return current CDW

HORI  LDBE  0,1         Set BR to point to starting address of
                          horizontal orientation intersection
                          table

      LDXE  JORH-1,1    Initialize XR to front of(Hor Orient) jump
                          address table

      IJMP  0,1         Jump to process horiz. orientation codes
                          based on the number of codes

H03   LDX   OCTH+2      Get 3rd horiz. orientation code
      MERG  064         Sum XR&BR by ORing into XR
      ANA   022,1       Get code intersection from 3rd orient.
H02   LDX.  OCTH+1
      MERG  064
      ANA   011,1
H01   LDX   OCTH        Get 1st horizontal orientation code
      MERG  064         Sum XR&BR by ORing into XR
      ANA   0,1         Get code intersection from 1st orientation

      JAZ   SW          If intersection still possible(AR≠0) then
                          continue else process as not this CDW
```

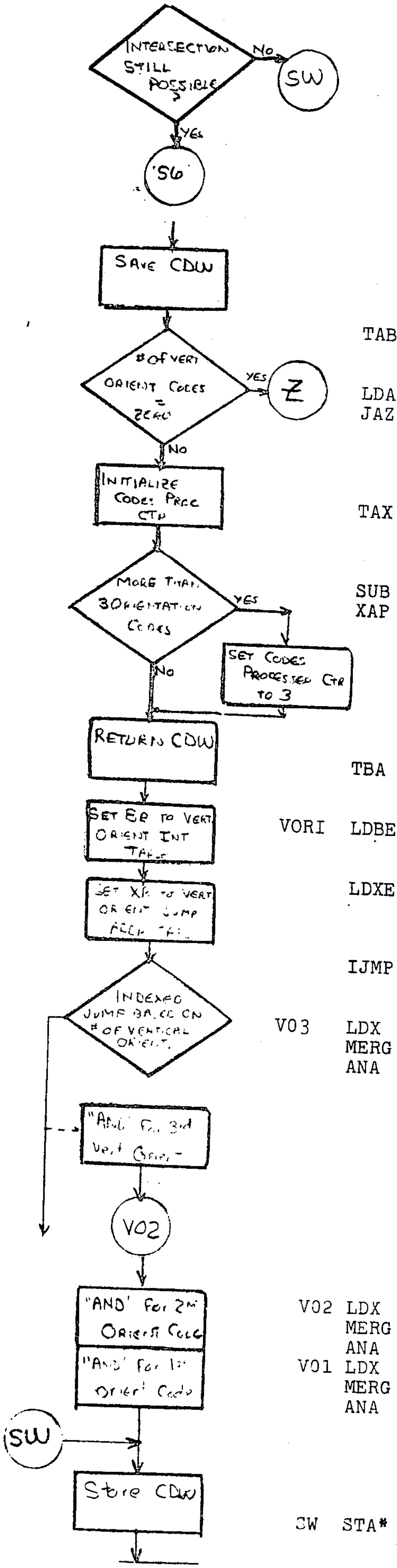

```
          TAB               Temporarily save current CDW

          LDA  NVOS         If #of vertical orientations = zero then
          JAZ  Z              finish up this pass

          TAX               Initialize codes processed counter

          SUB  C3           If more than 3 orientation codes then set
          XAP  LDX3           ctr to 3

          TBA               Return current CDW

VORI      LDBE 0,1          Set BR to first address in vertical orien-
                              tation intersection table

          LDXE JORV-1,1Set XR to front of jump address table

          IJMP 0,1          Jump to process vertical orientation codes

V03       LDX  OCTV+2       Process 3rd Orientation code
          MERG 064
          ANA  022,1

V02       LDX  OCTV+1
          MERG 064
          ANA  011,1
V01       LDX  OCTV         Process 1st vertical orientation code
          MERG 064
          ANA  0,1

SW        STA* WO           Store current CDW in table
```

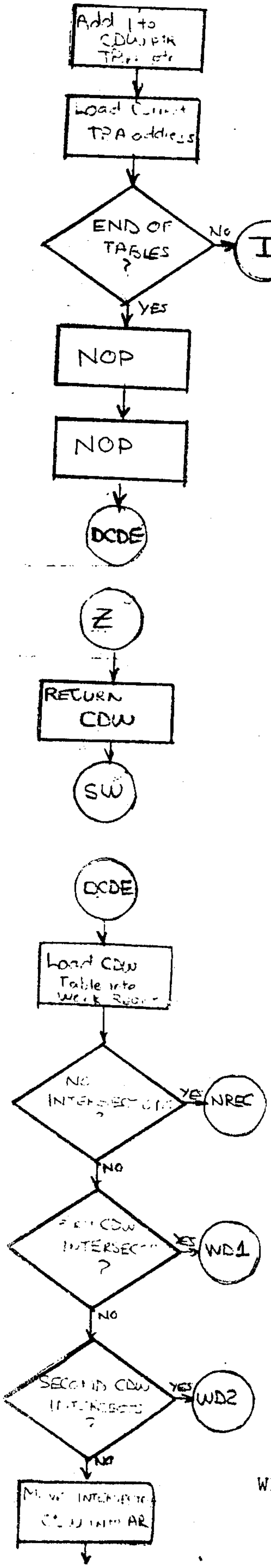

```
         INR   WO        Increment CDW table pointer
         INR   TBA       Increment master table pointer

         LDB*  TBA       Load address of current table pointers

         JBNZ  I         If end of tables (all passes completed)
                           then continue else go intersect some
                           more

         NOP             JSS1 LRN

         NOP

Z        TBA             Return CDW
         JMP   SW        Go finish this pass

DCDE     LDXI  W1        Place CDW table-all 3 words into
         LDA   0,1         registers for decoding
         LDB   1,1
         LDX   @,1

         JIF   070,NREC  If no intersection(all words =zero)
                         go process as non-rec

         JANZ  WD1       If first CDW >zero then start decode with
                           it

         JBNZ  WD2       If second CDW >zero then start decode
                           with it else start with 3rd CDW.

WD3      TXA             Move CDW(3rd) into AR

         LDX   C320      Initialize character code counter to
```

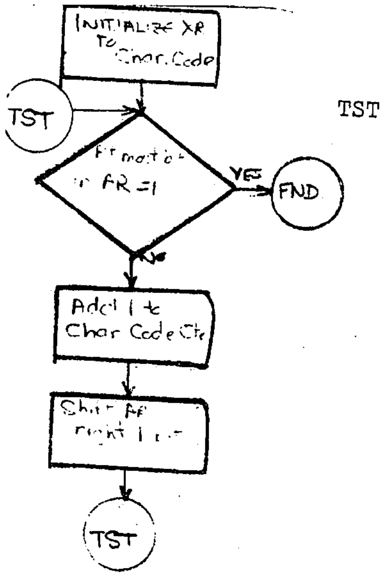

```
                 3rd CDW character

TST  BT   0,FND  If right most bit in AR =1 then that is
                   the character found, else go set up
                   for next bit

     IXR         Set character code counter to next
                   character

     LSRA 1      Get next bit to test in CDW that's >0

     JMP  TST    Go test next bit
```

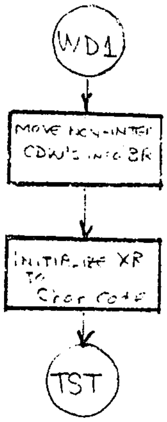

```
WD1 MERG 062     Move non-intersected CDW's into BR

    LDX  C260    Initialize character code counter to 1st
                   CDW character

    JMP  TST     Go test
```

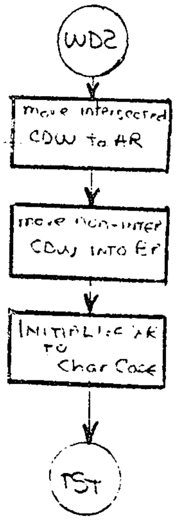

```
WD2 TBA          Move intersected CDW to AR

    TXB          Move non-intersected CDW to BR

    LDX  C300    Initialize character code counter to 2nd
                   CDW character

    JMP  TST     Go test
```

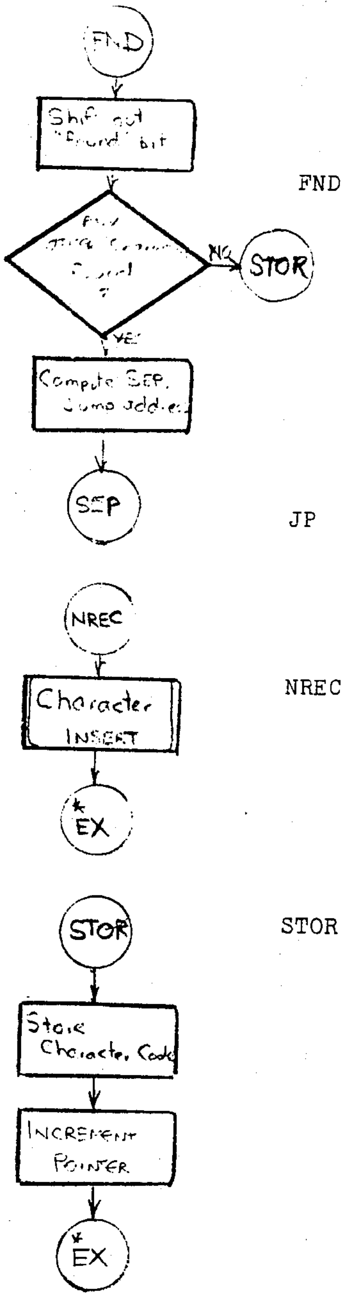

```
FND   LSRA,1            Remove bit of character found

      JIF 030,STOR      If no other characters intersected
                          store away character code

      TXA               Otherwise compute address of separa-
      ADD   JACN          tor routine

      STA   JP+1
JP    JMP   0           Jump to separator

NREC JMPM CHRI          Perform CHRI routine LDXI 0257

      JMP* EX           Exit from EX          NOP

STOR STX* CNT1          Store character code of intersected
                          character

      INR CNT1          Increment buffer pointer

      JMP*EX            Exit from EX
```

```
                        ****   PART 1 OF ZERO SEPERATORS
                        ****
                        ****   USED TO DETERMINE WHIHC CHARACTERS MULTIPLED WITH 0
004000  010173   ZERO  ,  LDA  ,W1        TEST FOR ZERO-EIGHT MULT
004001  006410         ,  BT   ,8,SP08    IF SO GO TO ZERO-EIGHT SEPERATOR
004002  013750
004003  010174         ,  LDA  ,W2        TEST FOR ZERO-OH MULTIPLE
004004  006417         ,  BT   ,15,SP00   IF SO GO TO TO ZERO-OH SEPERATOR
004005  004010 R
004006  001000         ,  JMP  ,NREC      GO TO NON-REC IF A DIFFERENT MULTPLE
004007  015241
```

```
                         ****    PART 2 = THE INITIALIZATION FOR ZERO-OH SEPERATOR
004010  014062   SP00  ,  LDA  ,TAREA     SEND TRANSITION INPUT ADDRESS TO
004011  006110         ,  ORAI ,0100000   TO THE RECOGNITION LOGIC
004012  100000
004013  103157         ,  OAR  ,057
004014  010166         ,  LDA  ,W         SET RIGHT BOUNDRY TO BE HALFWAY INTO
004015  004301         ,  ASRA ,1         THE CHARACTER
004016  120721         ,  ADD  ,LE
004017  006110         ,  ORAI ,041400    FORM CONTROL WORD TO SEND TO SDW LGC
004020  041400
004021  103157         ,  OAR  ,057
004022  006010         ,  LDAI ,03000
004023  003000
004024  103157         ,  OAR  ,057       SEND CONTROL WORD TO GENERATE TRANS
004025  005001         ,  TZA  ,          INITIALIZE AREA TO ZERO
004026  054046         ,  STA  ,AREA
004027  020167         ,  LDB  ,H         INITIALIZE SLICE COUNTER
004030  034042         ,  LDX  ,TAREA     INIT TRANSITION POINTER

                         ****    PART 3 = WAIT FOR HARDWARE TO GENERATE TRANSITIONS
                         ****             AND TO INPUT INTO COMPUTER MEMORY VIA DMA
004031  101072         ,  SEN  ,072,*+5   WAIT FOR ALL TRANSITIONS TO BE INPUT
004032  004036 R
004033  005000         ,  NOP  ,
004034  001000         ,  JMP  ,*-3       LOOP IF NOT ALL IN YET
004035  004031 R

                         ****    PART 4 = ANALYZE TRANSITIONS BY INTEGRATION
                         ****             AFTER COMPUTING AREA TO LEFT OF CHARACTER
                         ****             THEN COMPARE IT AGAINST KNOWN VALUES TO
                         ****             SEE WHICH CHARACTER IT IS
004036  015000   SP1   ,  LDA  ,0,1       TEST FIRST TRANSITION TO SEE THAT
004037  001010         ,  JAZ  ,SP3       WAS AT LEAST ONE SEGMENT
004040  004046 R
                 *                        IGNORE THE SLICE IF THERE WAS NO SEG
004041  015001   SP2   ,  LDA  ,1,1       GET FIRST TRANSITION
004042  006150         ,  ANAI ,07700     MASK OUT ALL BUT LEFT BOUNDRY
004043  007700
004044  124030         ,  ADD  ,AREA      ADD TO AREA (INTEGRATE)
004045  054027         ,  STA  ,AREA      STORE AREA AGAIN
004046  005041   SP3   ,  TXA  ,          INCR TRANSITION POINTER BY 8
004047  006120         ,  ADDI ,8         (I.E. POINT TO FIRST TRANS FOR NEXT
004050  000010
004051  005014         ,  TAX  ,          SLICE)
004052  005322         ,  DBR  ,          DECREMENT SLICE COUNT
004053  001026         ,  JBNZ ,SP1       LOOP IF MORE SLICES TO INTEGRATE
004054  004036 R
004055  014017   SP4   ,  LDA  ,AREA      TEST AREA FOR WHICH CHARACTER IT IS
004056  004346         ,  LSRA ,6         NORMALIZE AREA TO RIGHT
004057  005012         ,  TAB  ,
004060  144010         ,  SUB  ,D1        TEST FOR ZERO
004061  001004         ,  JAN  ,STR0
004062  013731
004063  005021         ,  TBA  ,
004064  144005         ,  SUB  ,D2        TEST FOR LETTER OH
004065  001002         ,  JAP  ,STRO
004066  013735
004067  001000         ,  JMP  ,NREC      TREAT CHAR AS NON-REC IF NOT SURE WH
004070  015241
004071  000025   D1    ,  DATA ,025
004072  000045   D2    ,  DATA ,045
004073  010000   TAREA ,  DATA ,010000
004074  011700   HTAD  ,  DATA ,011700
004075           AREA  ,  BSS  ,1

        000166   W     ,  EQU  ,0166
        000167   H     ,  EQU  ,0167
        000173   W1    ,  EQU  ,0173
        000174   W2    ,  EQU  ,0174
```

```
        000721      LE      ,  EQU   ,0721
        013731      STRØ    ,  EQU   ,013731
        013735      STRO    ,  EQU   ,013735
        013750      SP08    ,  EQU   ,013750
        015241      NREC    ,  EQU   ,015241


                    *****
                    *
                    *          BASIC SEPERATOR PACKAGE FOR ANY FONT
                    *          ADAPTED FOR RCA N-2
                    *
                    *          CHARACTER SET INCLUDES 0-9 * $ .
                    *
                    *****

                    *          NEEDED EQUIVALENCE CARDS

        000167      H       ,  EQU   ,0167
        000173      W1      ,  EQU   ,0173       FIRST CHARACTER DESIGNATE WORD -CD1*
        000174      W2      ,  EQU   ,0174
        000175      W3      ,  EQU   ,0175
        000717      BREF    ,  EQU   ,0717
        015233      STOR    ,  EQU   ,015233
        015241      NREC    ,  EQU   ,015241
        015630      JA      ,  EQU   ,015630     JUMP ADDRESS TABLE STARTING ADDRESS
        015727      CONT    ,  EQU   ,015727     CONVERSION TABLE STARTING ADDRESS

                    *          SEPERATOR JUMP ADDRESS TABLE

015630                      ,  ORG   ,JA
015630  014031 R            ,  DATA  ,ZERO
015631  113730 R            ,  DATA  ,(EXIT)*
015632  014046 R            ,  DATA  ,TWO
015633  014057 R            ,  DATA  ,THREE
015634  014066 R            ,  DATA  ,FOUR
015635  014073 R            ,  DATA  ,FIVE
015636  014102 R            ,  DATA  ,SIX
015637  014113 R            ,  DATA  ,SEVEN
015640  014120 R            ,  DATA  ,EIGHT
015641  014131 R            ,  DATA  ,NINE
015642  014136 R            ,  DATA  ,AST
015643  113730 R            ,  DATA  ,(EXIT)*
015644  113730 R            ,  DATA  ,(EXIT)*
015645  113730 R            ,  DATA  ,(EXIT)*
015646  113730 R            ,  DATA  ,(EXIT)*
015647  113730 R            ,  DATA  ,(EXIT)*
015650  113730 R            ,  DATA  ,(EXIT)*
015651  113730 R            ,  DATA  ,(EXIT)*
015652  113730 R            ,  DATA  ,(EXIT)*
015653  113730 R            ,  DATA  ,(EXIT)*
015654  113730 R            ,  DATA  ,(EXIT)*
015655  113730 R            ,  DATA  ,(EXIT)*
015656  113730 R            ,  DATA  ,(EXIT)*
015657  113730 R            ,  DATA  ,(EXIT)*
015660  113730 R            ,  DATA  ,(EXIT)*
015661  113730 R            ,  DATA  ,(EXIT)*
015662  113730 R            ,  DATA  ,(EXIT)*


                  *        CHARACTER CONVERSION TABLE FROM INTERNAL TO EXTE...

015727                      ,  ORG   ,CONT
015727  000260              ,  DATA  ,0260       ZERO
015730  000261              ,  DATA  ,0261       ONE
015731  000262              ,  DATA  ,0262       TWO
015732  000263              ,  DATA  ,0263       THREE
015733  000264              ,  DATA  ,0264       FOUR
015734  000265              ,  DATA  ,0265       FIVE
```

```
015735  000266       ,  DATA  ,0266     SIX
015736  000267       ,  DATA  ,0267     SEVEN
015737  000270       ,  DATA  ,0270     EIGHT
015740  000271       ,  DATA  ,0271     NINE
015741  000252       ,  DATA  ,'*'
015742  000244       ,  DATA  ,'$'
015743  000256       ,  DATA  ,'.'
015744  000275       ,  DATA  ,0275
015745  000276       ,  DATA  ,0276
015746  000277       ,  DATA  ,0277



013730               ,  ORG   ,013730

             *          EXIT POINTS TO NREC OR MLPL DEPENDING ON WHICH MODE
             *          IS BEING RUN.  IN LEARN MODE  IT IS MLPL.
             *          IN EDIT MODE IT IS NREC WHICH WILL GO TO CHAR INSRT

013730  015241  EXIT ,  DATA  ,NREC

             *          ROUTINES TO STORE SEPERATED CHARACTERS

013731  006030  STR0 ,  LDXI  ,'0'
013732  000260
013733  001000       ,  JMP   ,STOR
013734  015233
013735  006030  STR1 ,  LDXI  ,'1'
013736  000261
013737  001000       ,  JMP   ,STOR
013740  015233
013741  006030  STR2 ,  LDXI  ,'2'
013742  000262
013743  001000       ,  JMP   ,STOR
013744  015233
013745  006030  STR3 ,  LDXI  ,'3'
013746  000263
013747  001000       ,  JMP   ,STOR
013750  015233
013751  006030  STR4 ,  LDXI  ,'4'
013752  000264
013753  001000       ,  JMP   ,STOR
013754  015233
013755  006030  STR5 ,  LDXI  ,'5'
013756  000265
013757  001000       ,  JMP   ,STOR
013760  015233
013761  006030  STR6 ,  LDXI  ,'6'
013762  000266
013763  001000       ,  JMP   ,STOR
013764  015233
013765  006030  STR7 ,  LDXI  ,'7'
013766  000267
013767  001000       ,  JMP   ,STOR
013770  015233
013771  006030  STR8 ,  LDXI  ,'8'
013772  000270
013773  001000       ,  JMP   ,STOR
013774  015233
013775  006030  STR9 ,  LDXI  ,'9'
013776  000271
013777  001000       ,  JMP   ,STOR
014000  015233
014001  006030  STR: ,  LDXI  ,':'
014002  000272
014003  001000       ,  JMP   ,STOR
014004  015233
```

```
014005  006030   STR;   ,  LDXI  ,';'
014006  000273
014007  001000          ,  JMP   ,STOR
014010  015233
014011  006030   STR<   ,  LDXI  ,'<'
014012  000274
014013  001000          ,  JMP   ,STOR
014014  015233
014015  006030   STREQ  ,  LDXI  ,'='
014016  000275
014017  001000          ,  JMP   ,STOR
014020  015233
014021  006030   STR>   ,  LDXI  ,'>'
014022  000276
014023  001000          ,  JMP   ,STOR
014024  015233
014025  006030   STR?   ,  LDXI  ,'?'
014026  000277
014027  001000          ,  JMP   ,STOR
014030  015233


                 *****
                 *
                 *         SEPERATOR ROUTINES
                 *
                 *****


014031  010173    ZERO  ,  LDA   ,W1
014032  006411          ,  BT    ,9,STR9
014033  013775 R
014034  006407          ,  BT    ,7,STR7
014035  013765 R
014036  006412          ,  BT    ,10,STR;
014037  014001 R
014040  006406          ,  BT    ,6,STR6
014041  013761 R
014042  006410          ,  BT    ,8,SEP08
014043  014143 R
014044  001000          ,  JMP*  ,EXIT
014045  113730 R
014046  010173    TWO   ,  LDA   ,W1
014047  006403          ,  BT    ,3,STR3
014050  013745 R
014051  006410          ,  BT    ,8,STR2
014052  013741 R
014053  006412          ,  BT    ,10,STR;
014054  014001 R
014055  001000          ,  JMP*  ,EXIT
014056  113730 R
014057  010173    THREE ,  LDA   ,W1
014060  006411          ,  BT    ,9,SEP39
014061  014243 R
014062  006410          ,  BT    ,8,STR3
014063  013745 R
014064  001000          ,  JMP*  ,EXIT
014065  113730 R
014066  010173    FOUR  ,  LDA   ,W1
014067  006410          ,  BT    ,8,STR4
014070  013751 R
014071  001000          ,  JMP*  ,EXIT
014072  113730 R
014073  010173    FIVE  ,  LDA   ,W1
014074  006406          ,  BT    ,6,STR6
014075  013761 R
014076  006413          ,  BT    ,11,STR5
014077  013755 R
014100  001000          ,  JMP*  ,EXIT
014101  113730 R
014102  010173    SIX   ,  LDA   ,W1
```

```
014103  006410           ,  BT    ,8,STR6
014104  013761 R
014105  006412           ,  BT    ,10,STR6
014106  013761 R
014107  006413           ,  BT    ,11,STR6

014110  013761 R
014111  001000           ,  JMP*  ,EXIT
014112  113730 R
014113  010173   SEVEN   ,  LDA   ,W1
014114  006413           ,  BT    ,11,STR7
014115  013765 R
014116  001000           ,  JMP*  ,EXIT
014117  113730 R
014120  010173   EIGHT   ,  LDA   ,W1
014121  006411           ,  BT    ,9,STR9
014122  013775 R
014123  006412           ,  BT    ,10,STR;
014124  014001 R
014125  006413           ,  BT    ,11,STR;
014126  014005 R
014127  001000           ,  JMP*  ,EXIT
014130  113730 R
014131  010173   NINE    ,  LDA   ,W1
014132  006412           ,  BT    ,10,STR;
014133  014001 R
014134  001000           ,  JMP*  ,EXIT
014135  113730 R
014136  010173   AST     ,  LDA   ,W1
014137  006413           ,  BT    ,11,STR;
014140  014005 R
014141  001000           ,  JMP*  ,EXIT
014142  113730 R

                 *********
                 *
                 *ZERO-EIGHT SEPARATOR ROUTINE
                 *
                 *********

014143  010167   SEP08   ,  LDA   ,H
014144  004301           ,  ASRA  ,1
014145  006140           ,  SUBI  ,3
014146  000003
014147  001004           ,  JAN*  ,EXIT
014150  113730 R
014151  005014           ,  TAX   ,
014152  120717           ,  ADD   ,BREF
014153  005012           ,  TAB   ,
014154  005041           ,  TXA   ,
014155  124211           ,  ADD   ,HTAD
014156  005014           ,  TAX   ,
014157  006010           ,  LDAI  ,6
014160  000006
014161  054206           ,  STA   ,CNTR
014162  014000           ,  LDA   ,*+1
014163  054205           ,  STA   ,MGAP
014164  015000   ZLOP    ,  LDA   ,0,1
014165  154204           ,  ANA   ,NMSK
014166  144204           ,  SUB   ,SEG2
014167  001010           ,  JAZ   ,ZSG2
014170  014200 R
014171  124201           ,  ADD   ,SEG2
014172  001010           ,  JAZ   ,ZSG1
014173  014220 R
014174  005144           ,  IXR   ,
014175  005122           ,  IBR   ,
014176  001000           ,  JMP   ,ZLOP
014177  014164 R
```

```
014200  002000    ZSG2   ,  JMPM ,GGAP
014201  014317 R
014202  144166           ,  SUB  ,MGAP
014203  001002           ,  JAP  ,ZRTU
014204  014207 R
014205  124163           ,  ADD  ,MGAP
014206  054162           ,  STA  ,MGAP
014207  005144    ZRTU   ,  IXR  ,
014210  005122           ,  IBR  ,
014211  014156           ,  LDA  ,CNTR
014212  005311           ,  DAR  ,
014213  054154           ,  STA  ,CNTR
014214  001010           ,  JAZ  ,ZGTS
014215  014230 R
014216  001000           ,  JMP  ,ZLOP
014217  014164 R
014220  015000    ZSG1   ,  LDA  ,0,1
014221  154152           ,  ANA  ,SMSK
014222  006140           ,  SUBI ,0200
014223  000200
014224  001002           ,  JAP  ,STR6
014225  013771 R
014226  001000           ,  JMP  ,ZRTU
014227  014207 R
014230  014140    ZGTS   ,  LDA  ,MGAP
014231  006140           ,  SUBI ,6
014232  000006
014233  001002           ,  JAP  ,STR0
014234  013731 R
014235  006120           ,  ADDI ,2
014236  000002
014237  001002           ,  JAP* ,EXIT
014240  113730 R
014241  001000           ,  JMP  ,STR8
014242  013771 R

                  **********
                  *
                  *THREE-NINE SEPARATOR ROUTINE
                  *
                  **********

014243  005001    SEP39  ,  TZA  ,
014244  054132           ,  STA  ,LSUM
014245  006010           ,  LDAI ,6
014246  000006
014247  054120           ,  STA  ,CNTR
014250  010167           ,  LDA  ,H
014251  004301           ,  ASRA ,1
014252  005014           ,  TAX  ,
014253  120717           ,  ADD  ,BREF
014254  005012           ,  TAB  ,
014255  005041           ,  TXA  ,
014256  124110           ,  ADD  ,HTAD
014257  005014           ,  TAX  ,
014260  015000    LOP3   ,  LDA  ,0,1
014261  001010           ,  JAZ  ,STR3
014262  013745 R
014263  100073           ,  EXC  ,073
014264  103274           ,  OBR  ,074
014265  100673           ,  EXC  ,0673
014266  100474           ,  EXC  ,0474
014267  101172    SEN3   ,  SEN  ,0172,*+5
014270  014274 R
014271  005000           ,  NOP  ,
014272  001000           ,  JMP  ,SEN3
014273  014267 R
```

```
014274  102572          ,  CIA   ,072
014275  002000          ,  JMPM  ,CLTR
014276  014355 R
014277  124077          ,  ADD   ,LSUM
014300  054076          ,  STA   ,LSUM
014301  005144          ,  IXR   ,
014302  005122          ,  IBR   ,
014303  014064          ,  LDA   ,CNTR
014304  005311          ,  DAR   ,
014305  054062          ,  STA   ,CNTR
014306  001016          ,  JANZ  ,LOP3
014307  014260 R
014310  014066          ,  LDA   ,LSUM
014311  006140          ,  SUBI  ,14
014312  000016
014313  001002          ,  JAP   ,STR3
014314  013745 R
014315  001000          ,  JMP   ,STR9
014316  013775 R

014317  000000   GGAP   ,  ENTR  ,            ROUTINE TO GET GAP
014320  100073          ,  EXC   ,073
014321  103274          ,  OBR   ,074

014322  100673          ,  EXC   ,0673
014323  100474          ,  EXC   ,0474
014324  101172   GSEN   ,  SEN   ,0172,*+5
014325  014331 R
014326  005000          ,  NOP   ,
014327  001000          ,  JMP   ,GSEN
014330  014324 R
014331  102572          ,  CIA   ,072
014332  101172   GSN1   ,  SEN   ,0172,*+5
014333  014337 R
014334  005000          ,  NOP   ,
014335  001000          ,  JMP   ,GSN1
014336  014332 R
014337  102572          ,  CIA   ,072
014340  054034          ,  STA   ,TMP
014341  101172   GSN2   ,  SEN   ,0172,*+5
014342  014346 R
014343  005000          ,  NOP   ,
014344  001000          ,  JMP   ,GSN2
014345  014341 R
014346  102572          ,  CIA   ,072
014347  144025          ,  SUB   ,TMP
014350  002000          ,  JMPM  ,CLTR
014351  014355 R
014352  001000          ,  JMP*  ,GGAP
014353  114317 R
014354  101072          ,  SEN   ,072,*
014355  014354 R
014355           CLTR   ,  BES   ,0
014356  101172          ,  SEN   ,0172,IN
014357  014363 R
014360  005000          ,  NOP   ,
014361  001000          ,  JMP   ,CLTR-1
014362  014354 R
014363  102072   IN     ,  IME   ,072,CRAP
014364  014376 R
014365  001000          ,  JMP   ,CLTR-1
014366  014354 R

014367  011700   HTAD   ,  DATA  ,011700
014370  000000   CNTR   ,  DATA  ,0
014371  000000   MGAP   ,  DATA  ,0
014372  030000   NMSK   ,  DATA  ,030000
014373  010000   SEG2   ,  DATA  ,010000
014374  001760   SMSK   ,  DATA  ,01760
014375  000000   TMP    ,  DATA  ,0
014376  000000   CRAP   ,  DATA  ,0
014377  000000   LSUM   ,  DATA  ,0
```

647-1001 1 of 4 or 5 35p

64?-1001
part 1 of 4or 5

```
**********************************************************************

          *         REC-LEARN COMPONENT * 3
          *         VERSION 0 ASSEMBLED ON JANUARY 5, 1973
          *         ADAPTED FOR INDIRECT AID POINTERS 1/4/73
          *         ADAPTED FOR NEW SYSTEM 2/5/73

**********************************************************************

          *         NEEDED EQUIVALENCE CARDS ARE

000162    NHS   ,  EQU  ,0162
000163    NVS   ,  EQU  ,0163
000164    OCPT  ,  EQU  ,0164
000170    SC    ,  EQU  ,0170
000172    HSC   ,  EQU  ,0172
000173    W1    ,  EQU  ,0173
000174    W2    ,  EQU  ,0174
000175    W3    ,  EQU  ,0175
000176    NHOS  ,  EQU  ,0176
000177    HOCP  ,  EQU  ,0177
000200    NVOS  ,  EQU  ,0200
000220    TBA1  ,  EQU  ,0220
000273    LDX3  ,  EQU  ,0273
000274    LDX7  ,  EQU  ,0274
000277    C300  ,  EQU  ,0277
000600    FLAG  ,  EQU  ,0600
000601    C1    ,  EQU  ,0601
000602    C2    ,  EQU  ,0602
000603    C3    ,  EQU  ,0603
000604    C4    ,  EQU  ,0604
000605    C5    ,  EQU  ,0605
000606    C6    ,  EQU  ,0606
000607    C7    ,  EQU  ,0607
000610    C8    ,  EQU  ,0610
000611    C9    ,  EQU  ,0611
000613    C12   ,  EQU  ,0613
000614    C14   ,  EQU  ,0614
000615    C16   ,  EQU  ,0615
000621    C240  ,  EQU  ,0621
000623    CNFU  ,  EQU  ,0623
000624    C260  ,  EQU  ,0624
000700    CNT1  ,  EQU  ,0700
000716    TREF  ,  EQU  ,0716
000717    BREF  ,  EQU  ,0717

001200    STRT  ,  EQU  ,01200
006310    BB    ,  EQU  ,06310
006440    VIDEO ,  EQU  ,06440

014600    EX    ,  EQU  ,014600
015171    DCDE  ,  EQU  ,015171
015566    HTSA  ,  EQU  ,015566


015567    VTSA  ,  EQU  ,015567
015571    OCTH  ,  EQU  ,015571
015601    OCTV  ,  EQU  ,015601
**********************************************************************
```

```
                        *       LEARN LOW CORE BOTH TTY AND VIDEO

                        *       INDIRECT POINTERS TO AID LOCATIONS
                        *       REFERENCED BY LEARN

000630                        , ORG   ,0630

000630  016000     AIDA       , DATA  ,016000
000631  016334     OCTA       , DATA  ,016334
000632  017135     RCHA       , DATA  ,017135
000633  017155     OCHA       , DATA  ,017155
000634  017230     CRLA       , DATA  ,017230

        100630 R   AID        , EQU   ,(AIDA)*
        100631 R   OCT        , EQU   ,(OCTA)*
        100632 R   RCH        , EQU   ,(RCHA)*
        100633 R   OCH        , EQU   ,(OCHA)*
        100634 R   CRLF       , EQU   ,(CRLA)*

000635  000032     C26        , DATA  ,26
000636  000254     C254       , DATA  ,','
000637  000256     C256       , DATA  ,'.'
000640  000277     C277       , DATA  ,0277     QUESTION MARK
000641  000301     C301       , DATA  ,0301
000642  000320     C320       , DATA  ,0320
000643  006310     BBB        , DATA  ,BB
000644  000000     PTR        , DATA  ,0
000645             MPNT       , BSS   ,1


                   *  ADAPTIVE ANALYTIC RECOGNITION ROUTINE
                   *     LEARN SUBROUTINE  - RUN FROM TTY

005000                        , ORG   ,05000

005000  103066     LRN        , OME   ,066,EDDE DISARM FEED
005001  006155 R
005002  001200                , JSS2  ,LRNP     GO IF PROCESS LEARN MODE
005003  005035 R
005004  005004                , TZX   ,         ENCODE DESIGNATOR
005005  017700                , LDA*  ,CNT1     FOR LEARN CHARACTER
005006  140624                , SUB   ,C260
005007  001004                , JAN   ,AID      IF CHAR < 260 OR > 337 GO TO AID
005010  100630 R
005011  140615                , SUB   ,C16
005012  001004                , JAN   ,LRNE
005013  005024 R
005014  005144                , IXR   ,
005015  140615                , SUB   ,C16
005016  001004                , JAN   ,LRNE
005017  005024 R
005020  140615                , SUB   ,C16
005021  001002                , JAP   ,AID
005022  100630 R
005023  005144                , IXR   ,
005024  006120     LRNE       , ADDI  ,06420    COMPUTE BIT TEST INST
005025  006420
005026  054002                , STA   ,*+3      STORE BIT TEST INSTRUCTION
005027  006015                , LDAE  ,W1,1     CHECK IF LEARNED
005030  000173
005031  006400                , BT    ,0,LOUT   IF SO THEN EXIT
005032  006152 R
005033  001000                , JMP   ,OPER       ELSE GO TO OPERATOR
005034  005046 R
005035  010173     LRNP       , LDA   ,W1       IF INTERSECTION THEN EXIT
005036  110174                , ORA   ,W2         ELSE GO TO OPERATOR
005037  110175                , ORA   ,W3
005040  001010                , JAZ   ,OPER
005041  005046 R
005042  001406                , JS3N  ,DCDE     IF INTERSECT + PRINTING GO DECODE
005043  015171
005044  001000                , JMP   ,LOUT     IF INTERSECT + NO PRINT THEN EXIT
005045  006152 R
```

```
005046  010600    OPER   ,  LDA  ,FLAG      IF BIT 0 =1 RUN FROM TTY ELSE KEY
005047  006440           ,  BT   ,040,VIDEO
005050  006440
005051  002000    OPTT   ,  JMPM ,TCDE      GO PRINT CODES ON TTY
005052  005240 R
005053  002000    OPQEST,   JMPM ,TLRN
005054  005131 R
005055  002000    OPAG   ,  JMPM ,RCH       GO GET OPTION
005056  100632 R
005057  140641           ,  SUB  ,C301      IF CHARACTER NOT ALPHABETIC THEN GO
005060  001004           ,  JAN  ,TBAD        TO TTY BAD ROUTINE
005061  005072 R
005062  140635           ,  SUB  ,C26       ALSO GO TO TTY BAD ROUTINE IF OPTIO
005063  001002           ,  JAP  ,TBAD        NOT IMPLEMENTED
005064  005072 R
005065  006120           ,  ADDI ,(TTBL+032)*     COMPUTE ADDRESS IN JMP TABLE
005066  105131 R
005067  054001           ,  STA  ,*+2
005070  001000           ,  JMP* ,0         JUMP INDIRECTLY THRU TABLE
005071  100000
005072  010640    TBAD   ,  LDA  ,C277
005073  002000           ,  JMPM ,OCH       PRINT ?
005074  100633 R
005075  001000           ,  JMP  ,OPQEST
005076  005053 R

005077  005203 R  TTBL   ,  DATA ,TAID
005100  005205 R         ,  DATA ,TBRK
005101  005072 R         ,  DATA ,TBAD
005102  005072 R         ,  DATA ,TBAD
005103  005072 R         ,  DATA ,TBAD
005104  005072 R         ,  DATA ,TBAD
005105  005072 R         ,  DATA ,TBAD
005106  005072 R         ,  DATA ,TBAD
005107  005211 R         ,  DATA ,TIMG
005110  005072 R         ,  DATA ,TBAD
005111  005072 R         ,  DATA ,TBAD
005112  005072 R         ,  DATA ,TBAD
005113  005072 R         ,  DATA ,TBAD
005114  006152 R         ,  DATA ,LOUT
005115  005072 R         ,  DATA ,TBAD
005116  005215 R         ,  DATA ,TPRO
005117  005072 R         ,  DATA ,TBAD
005120  014601           ,  DATA ,EX+1
005121  005072 R         ,  DATA ,TBAD
005122  005051 R         ,  DATA ,OPTT
005123  005072 R         ,  DATA ,TBAD
005124  005072 R         ,  DATA ,TBAD
005125  005072 R         ,  DATA ,TBAD
005126  005072 R         ,  DATA ,TBAD
005127  005653 R         ,  DATA ,LERN
005130  001200           ,  DATA ,STRT


005131  000000    TLRN   ,  ENTR ,          ROUTINE TO PRINT 'LEARN?' + CHARACT
005132  006030           ,  LDXI ,LRNT
005133  005143 R
005134  020611           ,  LDB  ,C9
005135  017700           ,  LDA* ,CNT1
005136  054013           ,  STA  ,LRNT+7
005137  002000           ,  JMPM ,PRLS      GO PRINT 'LEARN? '
005140  005342 R
005141  001000           ,  JMP* ,TLRN
005142  105131 R

005143  000314    LRNT   ,  DATA ,'L'
005144  000305           ,  DATA ,'E'
005145  000301           ,  DATA ,'A'
005146  000322           ,  DATA ,'R'
005147  000316           ,  DATA ,'N'
005150  000277           ,  DATA ,'?'
005151  000240           ,  DATA ,' '
005152  000000           ,  DATA ,
```

```
005153  000240               , DATA ,' '

005154  006030     ERROR   , LDXI ,ERLS
005155  005165 R
005156  020614             , LDB  ,C14
005157  002000             , JMPM ,PRLS     GO PRINT 'NO TABLE'
005160  005342 R
005161  010623             , LDA  ,CNFU
005162  057700             , STA* ,CNT1
005163  001000             , JMP  ,OPER     START OVER
005164  005046 R

005165  000305     ERLS    , DATA ,'E'
005166  000322             , DATA ,'R'
005167  000322             , DATA ,'R'
005170  000317             , DATA ,'O'
005171  000322             , DATA ,'R'
005172  000240             , DATA ,' '
005173  000316             , DATA ,'N'
005174  000317             , DATA ,'O'
005175  000240             , DATA ,' '
005176  000324             , DATA ,'T'
005177  000301             , DATA ,'A'
005200  000302             , DATA ,'B'
005201  000314             , DATA ,'L'
005202  000305             , DATA ,'E'

005203  001000     TAID    , JMP  ,AID
005204  100630 R

005205  002000     TBRK    , JMPM ,BRKD
005206  005465 R
005207  001000             , JMP  ,OPQEST
005210  005053 R

005211  002000     TIMG    , JMPM ,IMGE     GO PRINT VIDEO BUFFER
005212  005376 R
005213  001000             , JMP  ,OPGEST   GO GET NEXT OPTION
005214  005053 R

005215  006030     TPRO    , LDXI ,PROC
005216  005227 R
005217  020611             , LDB  ,C9
005220  002000             , JMPM ,PRLS     GO PRINT 'PROC LRN='
005221  005342 R
005222  002000             , JMPM ,RCH      GO GET CHARACTER TO LEARN
005223  100632 R
005224  057700             , STA* ,CNT1
005225  001000             , JMP  ,LRN+2
005226  005002 R

005227  000320     PROC    , DATA ,'P'
005230  000322             , DATA ,'R'
005231  000317             , DATA ,'O'
005232  000303             , DATA ,'C'
005233  000240             , DATA ,' '
005234  000314             , DATA ,'L'
005235  000322             , DATA ,'R'
005236  000316             , DATA ,'N'
005237  000275             , DATA ,'='

                   *        TCDE IS A ROUTINE TO TYPE SEQUENCE AND
                   *        ORIENTATION CODES ON THE TELETYPE

005240  000000     TCDE    , ENTR ,
005241  030172             , LDX  ,HSC      GET CODE
005242  005002             , TZB  ,         ZERO B FOR BUFFER INDEX
005243  002000             , JMPM ,Y        GO SET UP TTY BUFFER
005244  005312 R
```

```
005245  005322           ,  DBR   ,
005246  002000           ,  JMPM  ,SP4      FOUR SPACES
005247  005356 R
005250  030170           ,  LDX   ,SC
005251  002000           ,  JMPM  ,Y
005252  005312 R
005253  005322           ,  DBR   ,
005254  030643           ,  LDX   ,BBB
005255  002000           ,  JMPM  ,PRLS     GO PRINT GEOMETRY CODES
005256  005342 R
005257  005002           ,  TZB   ,
005260  030176           ,  LDX   ,NHOS
005261  001040           ,  JXZ   ,TSP8
005262  005271 R
005263  030177           ,  LDX   ,HOCP
005264  005344           ,  DXR   ,
005265  002000           ,  JMPM  ,Y
005266  005312 R
005267  001000           ,  JMP   ,TSP4
005270  005273 R
005271  002000   TSP8    ,  JMPM  ,SP4
005272  005356 R
005273  002000   TSP4    ,  JMPM  ,SP4
005274  005356 R
005275  030200           ,  LDX   ,NVOS
005276  001040           ,  JXZ   ,TCD2
005277  005304 R
005300  030164           ,  LDX   ,OCPT
005301  005344           ,  DXR   ,
005302  002000           ,  JMPM  ,Y
005303  005312 R
005304  005322   TCD2    ,  DBR   ,
005305  030643           ,  LDX   ,BBB
005306  002000           ,  JMPM  ,PRLS
005307  005342 R
005310  001000           ,  JMP*  ,TCDE
005311  105240 R


005312  000000   Y       ,  ENTR  ,         ROUTINE TO FILL BUFFEWITH REC CODES
005313  015000           ,  LDA   ,0,1
005314  001004           ,  JAN*  ,Y
005315  105312 R
005316  004343           ,  LSRA  ,3
005317  001010           ,  JAZ   ,Y2       IF FST CHAR=0 IGNORE IT
005320  005325 R
005321  120624           ,  ADD   ,C260     CONVERT TO ASCII
005322  006056           ,  STAE  ,BB,2
005323  006310
005324  005122           ,  IBR   ,
005325  015000   Y2      ,  LDA   ,0,1
005326  150607           ,  ANA   ,C7
005327  120624           ,  ADD   ,C260     CONVERT TO ASCII
005330  006056           ,  STAE  ,BB,2
005331  006310
005332  005122           ,  IBR   ,
005333  010636           ,  LDA   ,C254     A COMMA
005334  006056           ,  STAE  ,BB,2
005335  006310
005336  005122           ,  IBR   ,
005337  005344           ,  DXR   ,
005340  001000           ,  JMP   ,Y+1
005341  005313 R
005342  000000   PRLS    ,  ENTR  ,         PRINT LIST SUBROUTINE
005343  002000           ,  JMPM  ,CRLF
005344  100634 R
005345  015000           ,  LDA   ,0,1
005346  002000           ,  JMPM  ,OCH
005347  100633 R
005350  005144           ,  IXR   ,
005351  005322           ,  DBR   ,
005352  001026           ,  JBNZ  ,PRLS+3
005353  005345 R
```

```
005354  001000         ,  JMP*  ,PRLS
005355  105342 R
005356  000000   SP4   ,  ENTR  ,
005357  010621         ,  LDA   ,C240
005360  006056         ,  STAE  ,BB,2
005361  006310
005362  005122         ,  IBR   ,
005363  006056         ,  STAE  ,BB,2
005364  006310
005365  005122         ,  IBR   ,
005366  006056         ,  STAE  ,BB,2
005367  006310
005370  005122         ,  IBR   ,
005371  006056         ,  STAE  ,BB,2
005372  006310
005373  005122         ,  IBR   ,
005374  001000         ,  JMP*  ,SP4
005375  105356 R
```

```
**************************************************************************************

************          *  ROUTINE TO PRINT RECOGNITION SCRATCH (IMAGE)          *******

**************************************************************************************
```

```
005376  000000   IMGE  ,  ENTR  ,
005377  010716         ,  LDA   ,TREF       TOP OF SILH
005400  054042         ,  STA   ,ILIN       LINE NUMBER
005401  140717         ,  SUB   ,BREF       COMPUTE WORD COUNT
005402  005211         ,  CPA   ,           FORM NEG NUMBER
005403  005311         ,  DAR   ,
005404  006150         ,  ANAI  ,077777     MASK OUT SIGN BIT
005405  077777
005406  054033         ,  STA   ,ICNT
005407  002000   IMG1  ,  JMPM  ,CRLF
005410  100634 R
005411  100073         ,  EXC   ,073        CLEAR REC DATA REG
005412  103074         ,  OME   ,074,ILIN     SET VAC
005413  005443 R
005414  100673         ,  EXC   ,0673       SPM TO DR
005415  030604         ,  LDX   ,C4         COUNT OF 4 TO XR
005416  102574         ,  CIA   ,074        UNLOAD INTERCEPT ONE
005417  004254         ,  LRLA  ,014        SHIFT BITS TO HIGH ORDER
005420  002000         ,  JMPM  ,IMG2       GO PRINT IMAGE
005421  005444 R
005422  030615         ,  LDX   ,C16        COUNT OF 16 TO X
005423  102573         ,  CIA   ,073        UNLOAD INTERCEPT
005424  002000         ,  JMPM  ,IMG2       GO PRINT IMAGE
005425  005444 R
005426  014014         ,  LDA   ,ILIN
005427  002000         ,  JMPM  ,OCT        GO OUTPUT LINE NUMBER
005430  100631 R
005431  014011         ,  LDA   ,ILIN
005432  005311         ,  DAR   ,           DECREMENT LINE NUMBER
005433  054007         ,  STA   ,ILIN
005434  007400         ,  ROF   ,
005435  044004         ,  INR   ,ICNT       COUNT NUMBER OF LINES
005436  001001         ,  JOF*  ,IMGE       EXIT *** EXIT
005437  105376 R
005440  001000         ,  JMP   ,IMG1       GO GET NEXT LINE OF PRINT
005441  005407 R
005442  000000   ICNT  ,  PZE   ,0          WORD COUNT
005443  000000   ILIN  ,  PZE   ,0          LINE NUMBER
```

```
005444  000000     IMG2   ,  ENTR  ,
005445  020277            ,  LDB   ,C300     PUT AT SIGN IN BR
005446  001004            ,  JAN   ,*+3      REPLACE AT SIGN WITH PERIOD
005447  005451 R
005450  020637            ,  LDB   ,C256
005451  004241            ,  LRLA  ,01       SHIFT NEW BIT INTO SIGN
005452  054011            ,  STA   ,ITEM     SAVE WORD
005453  005021            ,  TBA   ,
005454  002000            ,  JMPM  ,OCH
005455  100633 R
005456  005344
005457  001040            ,  DXR   ,         COUNT BITS IN WORD
005460  105444 R          ,  JXZ*  ,IMG2     GO IF WORD IS EXHAUSTED
005461  014002            ,  LDA   ,ITEM     RESTORE BINARY IN A
005462  001000            ,  JMP   ,IMG2+1
005463  005445 R
005464  000000     ITEM   ,  PZE   ,0        TEMP FOR BINARY


005465  000000     BRKD   ,  ENTR  ,
005466  002000            ,  JMPM  ,CRLF
005467  100634 R
005470  006010            ,  LDAI  ,'H'
005471  000310
005472  006037            ,  LDXE  ,HTSA
005473  015566
005474  005144            ,  IXR   ,
005475  002000            ,  JMPM  ,WSDW     GO PRINT SDW BREAKDOWN
005476  005537 R
005477  002000            ,  JMPM  ,CRLF
005500  100634 R
005501  006010            ,  LDAI  ,'V'
005502  000326
005503  006037            ,  LDXE  ,VTSA
005504  015567
005505  002000            ,  JMPM  ,WSDW     GO PRINT
005506  005537 R
005507  001000            ,  JMP*  ,BRKD
005510  105465 R

                   * SP3     IS A ROUTINE TO PUT 3 SPACES INTO TTY BUFFER
                   *         AND INCREMENTS POINTER
005511  000000     SP3    ,  ENTR  ,
005512  010621            ,  LDA   ,C240
005513  006056            ,  STAE  ,BB,2
005514  006310
005515  005122            ,  IBR   ,
005516  006056            ,  STAE  ,BB,2
005517  006310
005520  005122
005521  006056            ,  IBR   ,
005522  006310            ,  STAE  ,BB,2
005523  005122            ,  IBR   ,
005524  001000            ,  JMP*  ,SP3      EXIT
005525  105511 R

                   * BFIL IS A ROUTINE TO  CONVERT AR TO ASCII CODE
                   *         PLACE IT IN TTY BUFFER AND THEN SPACE OVER
                   *         THREE CHARACTERS
                   *         REGISTER VALUES UPON ENTRANCE ARE
                   *               BR = TTY BUFFER POINTER
005526  000000     BFIL   ,  ENTR  ,
005527  120624            ,  ADD   ,C260
005530  006056            ,  STAE  ,BB,2
005531  006310
005532  005122            ,  IBR   ,
005533  002000            ,  JMPM  ,SP3
005534  005511 R
005535  001000
005536  105526 R          ,  JMP*  ,BFIL
```

```
                     * WSDW IS A ROUTINE  TO BE USED TO PRINT  SDW'S
                     *         IT WILL PRINT MEMORK LOCATIONS STARTING AT
                     *         THE LOCATION POINTED TO BY THE XR UNTIL
                     *         A LOCATION WITH THE VALUE OF -1 IS REACHED
                     *
                     *         REGISTER VALUES UPON ENTRANCE ARE
                     *               AR = ASCII CODE OF WHICH SDW TABLE(H,V)
                     *               XR = ADDR OF FIST SDW LOCATION
005537  000000       WSDW   ,  ENTR  ,
005540  002000              ,  JMPM  ,OCH
005541  100633 R
005542  070644              ,  STX   ,PTR       SAVE LOACTION PTR
005543  002000       LOOP   ,  JMPM  ,CRLF
005544  100634 R
005545  017644              ,  LDA*  ,PTR       GET AN SDW
005546  040644              ,  INR   ,PTR
005547  005112              ,  INCR  ,012       TEST FOR SDW=-1
005550  001020              ,  JBZ*  ,WSDW       EXIT IF END OF TABLE
005551  105537 R
005552  054076              ,  STA   ,WORK      TEMP SAVE SDW
005553  002000              ,  JMPM  ,OCT
005554  100631 R
005555  005002              ,  TZB   ,
005556  002000              ,  JMPM  ,SP3
005557  005511 R
005560  014070              ,  LDA   ,WORK      GET SDW AGAIN
005561  001010              ,  JAZ   ,LOOP
005562  005543 R
005563  002000              ,  JMPM  ,PSDW      GO BREAKDOWN SDW INTO PARTS
005564  005575 R
005565  005322              ,  DBR   ,
005566  030643              ,  LDX   ,BBB
005567  006010              ,  LDAI  ,LOOP
005570  005543 R
005571  006057              ,  STAE  ,PRLS
005572  005342 R
005573  001000              ,  JMP   ,PRLS+3
005574  005345 R

                     * PSDW    IS A ROUTINE TO TO BREAK AN SDW INTO ITS
                     *         6 PARTS AND PLACE EACH PART INTO TTY BUFFER
                     *         REGISTER VALUES UPON ENTRANCE ARE
                     *               AR = SDW
                     *               BR = TTY BUFFER POINTER

005575  000000       PSDW   ,  ENTR  ,
005576  004242              ,  LRLA  ,2         SIZE CODE
005577  054052              ,  STA   ,WRK2
005600  150603              ,  ANA   ,C3
005601  002000              ,  JMPM  ,BFIL      TO BUFFER
005602  005526 R
005603  014046              ,  LDA   ,WRK2
005604  004242              ,  LRLA  ,2         NUM OF SEGMENTS
005605  054044              ,  STA   ,WRK2
005606  150603              ,  ANA   ,C3
005607  005111              ,  IAR   ,
005610  002000              ,  JMPM  ,BFIL      TO BUFFER
005611  005526 R
005612  014037              ,  LDA   ,WRK2
005613  004242              ,  LRLA  ,2         ORIENTATION
005614  054035              ,  STA   ,WRK2
005615  150603              ,  ANA   ,C3
005616  002000              ,  JMPM  ,BFIL      TO BUFFER
005617  005526 R
005620  014031              ,  LDA   ,WRK2
005621  004243              ,  LRLA  ,3         ABSOLUTE SIZ
005622  054027              ,  STA   ,WRK2
005623  150607              ,  ANA   ,C7
005624  120624              ,  ADD   ,C260
```

```
005625  006056            ,  STAE  ,BB,2
005626  006310
005627  005122            ,  IBR   ,
005630  014021            ,  LDA   ,WRK2
005631  004243            ,  LRLA  ,3
005632  054017            ,  STA   ,WRK2
005633  150607            ,  ANA   ,C7
005634  002000            ,  JMPM  ,BFIL       TO BUFFER
005635  005526 R
005636  014012            ,  LDA   ,WORK       SLICE CODE
005637  004341            ,  LSRA  ,1
005640  150607            ,  ANA   ,C7
005641  002000            ,  JMPM  ,BFIL       TO BUFFER
005642  005526 R
005643  014005            ,  LDA   ,WORK       REPEAT BIT
005644  150601            ,  ANA   ,C1
005645  002000            ,  JMPM  ,BFIL       TO BUFFER
005646  005526 R
005647  001000            ,  JMP*  ,PSOW       EXIT
005650  105575 R
005651  000000    WORK    ,  DATA  ,0
005652  000000    WRK2    ,  DATA  ,0


005653  017700    LERN    ,  LDA*  ,CNT1
005654  006020            ,  LDBI  ,TBA1
005655  000220
005656  140624            ,  SUB   ,C260
005657  001004            ,  JAN   ,ERROR
005660  005154 R
005661  140615            ,  SUB   ,C16
005662  001004            ,  JAN   ,WRD1
005663  005671 R
005664  140615            ,  SUB   ,C16
005665  001004            ,  JAN   ,WRD1-1
005666  005670 R
005667  005122            ,  IBR   ,
005670  005122            ,  IBR   ,
005671  005021    WRD1    ,  TBA   ,
005672  006140            ,  SUBI  ,TBA1-B-1
005673  172040 R
005674  005014            ,  TAX   ,
005675  015000            ,  LDA   ,0,1
005676  127700            ,  ADD*  ,CNT1
005677  054014            ,  STA   ,LSHF
005700  026000            ,  LDB   ,0,2
N 005701  001020          ,  JBZ   ,ERROR      IF NO TABLE FOR CHARCTER THEN ERR RT
005702  005154 R
005703  016000            ,  LDA   ,0,2
005704  054017            ,  STA   ,RH+1
005705  016001            ,  LDA   ,1,2
005706  054073            ,  STA   ,RV+1
005707  016002            ,  LDA   ,2,2
005710  054151            ,  STA   ,ROH+1
005711  016003            ,  LDA   ,3,2
005712  054206            ,  STA   ,ROV+1
005713  005101            ,  INCR  ,01
005714  004240    LSHF    ,  LRLA  ,0
005715  054240            ,  STA   ,T
005716  010162    LHOR    ,  LDA   ,NHS
005717  005014            ,  TAX   ,
005720  140610            ,  SUB   ,C8
005721  003002            ,  XAP   ,LDX7
005722  000274
005723  006025    RH      ,  LDBE  ,0,1
005724  000000
005725  006035            ,  LDXE  ,JH-1,1
005726  006163 R
005727  006705            ,  IJMP  ,0,1
005730  000000
005731  030107    H7L     ,  LDX   ,0107
005732  005064            ,  DATA  ,05064
```

```
005733  015110          , LDA   ,0110,1
005734  114221          , ORA   ,T
005735  055110          , STA   ,0110,1
005736  030106   H6L    , LDX   ,0106
005737  005064          , DATA  ,05064
005740  015074          , LDA   ,074,1
005741  114214          , ORA   ,T
005742  055074          , STA   ,074,1
005743  030105   H5L    , LDX   ,0105
005744  005064          , DATA  ,05064
005745  015060          , LDA   ,060,1
005746  114207          , ORA   ,T
005747  055060          , STA   ,060,1
005750  030104   H4L    , LDX   ,0104
005751  005064          , DATA  ,05064
005752  015044          , LDA   ,044,1
005753  114202          , ORA   ,T
005754  055044          , STA   ,044,1
005755  030103   H3L    , LDX   ,0103
005756  005064          , DATA  ,05064
005757  015030          , LDA   ,030,1
005760  114175          , ORA   ,T
005761  055030          , STA   ,030,1
005762  030102   H2L    , LDX   ,0102
005763  005064          , DATA  ,05064
005764  015014          , LDA   ,014,1
005765  114170          , ORA   ,T
005766  055014          , STA   ,014,1
005767  030101   H1L    , LDX   ,0101
005770  005064          , DATA  ,05064
005771  015000          , LDA   ,0,1
005772  114163          , ORA   ,T
005773  055000          , STA   ,0,1
005774  010163   LVFR   , LDA   ,NVS
005775  005014          , TAX   ,
005776  140610          , SUB   ,C8
005777  003002          , XAP   ,LDX7
006000  000274
006001  006025   RV     , LDBE  ,0,1
006002  000000
006003  006035          , LDXE  ,JV-1,1
006004  006172 R
006005  006705          , IJMP  ,0,1
006006  000020
006007  030137   V7L    , LDX   ,0137
006010  005064          , DATA  ,05064
006011  015110          , LDA   ,0110,1
006012  114143          , ORA   ,T
006013  055110          , STA   ,0110,1
006014  030136   V6L    , LDX   ,0136
006015  005064          , DATA  ,05064
006016  015074          , LDA   ,074,1
006017  114136          , ORA   ,T
006020  055074          , STA   ,074,1
006021  030135   V5L    , LDX   ,0135
006022  005064          , DATA  ,05064
006023  015060          , LDA   ,060,1
006024  114131          , ORA   ,T
006025  055060          , STA   ,060,1
006026  030134   V4L    , LDX   ,0134
006027  005064          , DATA  ,05064
006030  015044          , LDA   ,044,1
006031  114124          , ORA   ,T
006032  055044          , STA   ,044,1
006033  030133   V3L    , LDX   ,0133
006034  005064          , DATA  ,05064
006035  015030          , LDA   ,030,1
006036  114117          , ORA   ,T
006037  055030          , STA   ,030,1
006040  030132   V2L    , LDX   ,0132
```

```
006041  005064          ,  DATA  ,05064
006042  015014          ,  LDA   ,014,1
006043  114112          ,  ORA   ,T
006044  055014          ,  STA   ,014,1
006045  030131   V1L    ,  LDX   ,0131
006046  005064          ,  DATA  ,05064
006047  015000          ,  LDA   ,0,1
006050  114105          ,  ORA   ,T
006051  055000          ,  STA   ,0,1
006052  030176   LORH   ,  LDX   ,NHOS
006053  001040          ,  JXZ   ,LORV
006054  006111 R
006055  005041          ,  TXA   ,
006056  140603          ,  SUB   ,C3
006057  003002          ,  XAP   ,LDX3
006060  000273
006061  006025   ROH    ,  LDBE  ,0,1
006062  000000
006063  006035          ,  LDXE  ,JLOH-1,1
006064  006201 R
006065  006705          ,  IJMP  ,0,1
006066  000000
006067  006037   HO3L   ,  LDXE  ,OCTH+2
006070  015573
006071  005064          ,  DATA  ,05064
006072  015022          ,  LDA   ,022,1
006073  114062          ,  ORA   ,T
006074  055022          ,  STA   ,022,1
006075  006037   HO2L   ,  LDXE  ,OCTH+1
006076  015572
006077  005064          ,  DATA  ,05064
006100  015011          ,  LDA   ,011,1
006101  114054          ,  ORA   ,T
006102  055011          ,  STA   ,011,1
006103  006037   HO1L   ,  LDXE  ,OCTH
006104  015571
006105  005064          ,  DATA  ,05064
006106  015000          ,  LDA   ,0,1
006107  114046          ,  ORA   ,T
006110  055000          ,  STA   ,0,1
006111  030200   LORV   ,  LDX   ,NVOS
006112  001040          ,  JXZ   ,LOUT
006113  006152 R
006114  005041          ,  TXA   ,

006115  140603          ,  SUB   ,C3
006116  003002          ,  XAP   ,LDX3
006117  000273
006120  006025   ROV    ,  LDBE  ,0,1
006121  000000
006122  006035          ,  LDXE  ,JLOV-1,1
006123  006204 R
006124  006705          ,  IJMP  ,0,1
006125  000000
006126  006037   VO3L   ,  LDXE  ,OCTV+2
006127  015603
006130  005064          ,  DATA  ,05064
006131  015022          ,  LDA   ,022,1
006132  114023          ,  ORA   ,T
006133  055022          ,  STA   ,022,1
006134  006037   VO2L   ,  LDXE  ,OCTV+1
006135  015602
006136  005064          ,  DATA  ,05064
006137  015011          ,  LDA   ,011,1
006140  114015          ,  ORA   ,T
006141  055011          ,  STA   ,011,1
006142  006037   VO1L   ,  LDXE  ,OCTV
006143  015601
006144  005064          ,  DATA  ,05064
006145  015000          ,  LDA   ,0,1
006146  114007          ,  ORA   ,T
006147  055000          ,  STA   ,0,1
```

```
006150  001600          ,  JIF  ,0600,EX+1  IF SS2 + SS3 SET THEN GO RE REC
006151  014601
                  *                          CHARACTER FOR BUFFER REPLACEMENT
006152  040700    LOUT  ,  INR  ,CNT1
006153  001000          ,  JMP* ,EX          RETURN TO EXECUTIVE   JS3N* EX
006154  114600
006155  000002    FDDE  ,  DATA ,2
006156  000000    T     ,  DATA ,0
006157  006160 R  B     ,  DATA ,B+1
006160  003760          ,  DATA ,03760,03740,03720,
006161  003740
006162  003720
006163  000000

006164  005767 R  JH    ,  DATA ,(H1L)
006165  005762 R        ,  DATA ,(H2L)
006166  005755 R        ,  DATA ,(H3L)
006167  005750 R        ,  DATA ,(H4L)
006170  005743 R        ,  DATA ,(H5L)
006171  005736 R        ,  DATA ,(H6L)
006172  005731 R        ,  DATA ,(H7L)
006173  006045 R  JV    ,  DATA ,(V1L)
006174  006040 R        ,  DATA ,(V2L)
006175  006033 R        ,  DATA ,(V3L)
006176  006026 R        ,  DATA ,(V4L)
006177  006021 R        ,  DATA ,(V5L)
006200  006014 R        ,  DATA ,(V6L)
006201  006007 R        ,  DATA ,(V7L)
006202  006103 R  JLOH  ,  DATA ,(H01L)
006203  006075 R        ,  DATA ,(H02L)
006204  006067 R        ,  DATA ,(H03L)
006205  006142 R  JLOV  ,  DATA ,(V01L)
006206  006134 R        ,  DATA ,(V02L)
006207  006126 R        ,  DATA ,(V03L)

                  ******************************************************************

                  *  MLPL  ROUTINE TO PRINT MULTIPLY RECOGNIZED CHARACTERS

                  *        IF BIT 3 OF FLAG = 1 THEN THE RECOGNITION CODES
                  *        FOR THE CHARACTER IN QUESTION ARE PRINTED ON TTY.
                  *        IF SENSE SWITCH 3 IS SET THEN THE CHARACTER CODES
                  *        ARE PRINTED ONLY WHEN BIT 3 IS SET

                  ******************************************************************

006210  010600    MLPL  ,  LDA  ,FLAG      IF BIT 3 OF FLAG =1 THEN PRINT CODES
006211  006443          ,  BT   ,043,MLP2  OF MULTIPLING CHARACTERS
006212  006233 R
006213  002000          ,  JMPM ,TCDE
006214  005240 R
006215  001406          ,  JS3N ,MLP2      IF PRINT NOT SUPPRESSED GO PLACE
006216  006233 R
                  *                        ASCII CODES IN BUFFER NORMALLY ELSE
006217  010643          ,  LDA  ,BBB       PRINT THEM IMMEDIATELY
006220  050645          ,  STA  ,MPNT
006221  002000          ,  JMPM ,MLLP
006222  006245 R
006223  010645          ,  LDA  ,MPNT
006224  140643          ,  SUB  ,BBB       COMPUTE CHARACTER COUNT
006225  005012          ,  TAB  ,
006226  030643          ,  LDX  ,BBB
006227  002000          ,  JMPM ,PRLS      GO PRINT THEM
006230  005342 R
006231  001000          ,  JMP* ,EX
006232  114600

006233  001400    MLP2  ,  JSS3*,EX        EXIT IF PRINT SUPPRESEED
006234  114600
006235  010700          ,  LDA  ,CNT1
```

```
006236  050645           , STA   ,MPNT
006237  002000           , JMPM  ,MLLP
006240  006245 R
006241  010645           , LDA   ,MPNT
006242  050700           , STA   ,CNT1
006243  001000           , JMP*  ,EX         EXIT
006244  114600
006245  000000  MLLP     , ENTRY,            ROUTINE TO FILL A BUFFER WITH ASCII
                *                            CODES OF CHARACTERS THAT ARE MULTIPL
006246  006030           , LDXI  ,'('
006247  000250
006250  077645           , STX*  ,MPNT
006251  040645           , INR   ,MPNT
006252  010173           , LDA   ,W1
006253  030624           , LDX   ,C260       IF BITS SET IN FIRST COIW THEN
006254  002016           , JANZM,MLOP        PRINT ASCII FOR CORRESPONDING BITS
006255  006301 R
006256  010174           , LDA   ,W2
006257  030277           , LDX   ,C300       IF BITS SET IN SECOND COIW

006260  002016           , JANZM,MLOP        PRINT ASCII FOR CORRESPONDING BITS
006261  006301 R
006262  010175           , LDA   ,W3
006263  030642           , LDX   ,C320       IF BITS SET IN THIRD COIW
006264  002016           , JANZM,MLOP        PRINT ASCII FOR CORRESPONDING BITS
006265  006301 R
006266  002016           , JANZM,MLOP        PRINT ASCII FOR CORRESPONDING BITS
006267  006301 R
006270  006030           , LDXI  ,')'
006271  000251
006272  077645           , STX*  ,MPNT
006273  040645           , INR   ,MPNT
006274  001000           , JMP*  ,MLLP
006275  106245 R

006276  004341  ML02     , LSRA  ,1          SHIFT AR 1 BIT TO RIGHT
006277  005144           , IXR   ,           INCR ASCII CODE
006300  001010           , JAZ   ,*          EXIT IF NO MORE BITS SET
006301  006300 R
006301          MLOP     , BES   ,0
006302  006442           , BT    ,040,ML02   IF BIT =0 THEN GO SHIFT FOR NEXT
006303  006276 R
006304  077645           , STX*  ,MPNT       ELSE STORE ASCII FOR SET BIT
006305  040645           , INR   ,MPNT
006306  001000           , JMP   ,ML02       THEN GO SHIFT BIT OUT
006307  006276 R
```

What is claimed is:

1. A character recognition system comprising:

a. means for scanning a character and forming an image therefrom, b. means for analyzing said image in a plurality of linear slices and developing information signals indicative of the existence of character segments in each linear slice, c. means responsive to said information signals for generating transition signals which are a function of the positions of all character segment bounds, with respect to the position of a reference point, within each linear slice, d. means responsive to said transition signals for measuring the number of character segments, and the lengths and positions of character segments within each slice, and means for generating measurement signals indicative thereof, and e. codifying means responsive to said measurement signals for devloping codified information representative of the character geometry within each slice.

2. A character recognition system as set forth in claim 1 wherein said information signals, said transition signals, and said measurement signals are all digital signals.

3. A character recognition system as set forth in claim 2 wherein said plurality of linear slices includes a plurality of orthogonal slices.

4. A character recognition system as set forth in claim 3 wherein said means for analyzing said image and developing information signals comprises:

a. a scratch pad memory for forming a video image of said character including a plurality of horizontal and vertical video positions, b. counting means for developing a count of the number of said horizontal and vertical positions, and c. indicating means for generating a signal indicative of the presence or absence of the character at each of said video positions.

5. A character recognition system as set forth in claim 4 wherein said means for generating transition signals comprises:

a. gate means for generating an output signal in response to a change in said signal from said indicating means, and b. register means responsive to said gate means output signal for receiving and storing the count from said counting means.

6. A character recognition system as set forth in claim 1 wherein said measuring means includes means for identifying the largest segment within each slice.

7. A character recognition system comprising:

a. means for scanning a character and developing information signals therefrom, indicative of the existence of character segments within each of a plurality of linear slices of said character, b. means responsive to said information signals for generating transition signals indicative of the location of all character segment bounds, with respect to a reference point, within each linear slice, c. means responsive to said transition signals for generating measurement signals indicative of the number of character segments within each slice, and d. codifying means responsive to said measurement signals for developing codified information representative of the character geometry within each slice, said codifying means including:

1. means for generating slice description codes which describe each linear slice in terms of numerically coded classes directly related to the number, length, and position of character segments within each linear slice, 2. means responsive to said slice description codes for generating net numeric slice codes which are a function of said numerically coded classes, and 3. comparison means for comparing successive net numeric slice codes to determine the existence of identical net numeric codes for adjacent slices.

8. A character recognition system as set forth in claim 7 wherein said comparison means includes a register for storing a net numeric code and a comparator for comparing the stored numeric code with the numeric code immediately succeeding the stored numeric code and for generating one signal if said numeric codes are identical and a second signal if said numeric codes are different.

9. A character recognition system as set forth in claim 7 wherein said information signals, said transition signals, and said measurement signals are all digital signals.

10. A character recognition system as set forth in claim 9 wherein said plurality of linear slices includes a plurality of orthogonal slices.

11. A character recognition system as set forth in claim 7 wherein said means for generating slice description codes includes means responsive to said measurement signals for coding an entire linear slice as large, if any segment contained therein is greater than a predetermined value and for coding an entire linear slice as small, if any segment contained therein is less than a predetermined value.

* * * * *